US011753698B2

(12) United States Patent
Mennell et al.

(10) Patent No.: US 11,753,698 B2
(45) Date of Patent: *Sep. 12, 2023

(54) BIO-REDUCTION OF METAL ORES INTEGRATED WITH BIOMASS PYROLYSIS

(71) Applicant: Carbon Technology Holdings, LLC, Oakdale, MN (US)

(72) Inventors: James A. Mennell, Brighton, UT (US); Daren Daugaard, Newburg, MO (US); Dustin Slack, Gwinn, MI (US)

(73) Assignee: Carbon Technology Holdings, LLC, Oakdale, MN (US)

( * ) Notice: Subject to any disclaimer, the term of this patent is extended or adjusted under 35 U.S.C. 154(b) by 66 days.

This patent is subject to a terminal disclaimer.

(21) Appl. No.: 17/485,362

(22) Filed: Sep. 25, 2021

(65) Prior Publication Data

US 2022/0098701 A1 Mar. 31, 2022

Related U.S. Application Data

(60) Provisional application No. 63/083,223, filed on Sep. 25, 2020.

(51) Int. Cl.
*C22B 1/24* (2006.01)
*C22B 5/12* (2006.01)
(Continued)

(52) U.S. Cl.
CPC .......... *C22B 1/2406* (2013.01); *C10B 53/02* (2013.01); *C21B 5/008* (2013.01); *C21B 13/004* (2013.01);
(Continued)

(58) Field of Classification Search
CPC .......... C22B 1/2406; C22B 1/005; C22B 5/12
See application file for complete search history.

(56) References Cited

U.S. PATENT DOCUMENTS 1,609,097 A 11/1926 Stafford
1,662,357 A 3/1928 Barton et al.
(Continued)

FOREIGN PATENT DOCUMENTS

CA 2740225 5/2010
CN 101693848 A 4/2010
(Continued)

OTHER PUBLICATIONS

Andi Supangat et al., "Method for producing activated carbon from combustion of e.g. bamboo, involves naturally removing and cooling furnace material which is separate module of furnace fuel, but closing exhaust holes, when burning process is not sufficient," ID 20121099A (publication date: Mar. 1, 2012).
(Continued)

*Primary Examiner* — Scott R Kastler
(74) *Attorney, Agent, or Firm* — Perkins Coie LLP

(57) ABSTRACT

Some variations provide a composition for reducing a metal ore, the composition comprising a carbon-metal ore particulate, wherein the carbon-metal ore particulate comprises at least about 0.1 wt % to at most about 50 wt % fixed carbon on a moisture-free and ash-free basis, and wherein the carbon is at least 50% renewable carbon as determined from a measurement of the $^{14}C/^{12}C$ isotopic ratio. Some variations provide a process for reducing a metal ore, comprising: providing a biomass feedstock; pyrolyzing the feedstock to generate a biogenic reagent comprising carbon and a pyrolysis off-gas comprising hydrogen or carbon monoxide; obtaining a metal ore comprising a metal oxide; combining the carbon with the metal ore, to generate a carbon-metal ore particulate; optionally pelletizing the carbon-metal ore particulate; and utilizing the pyrolysis off-gas to chemically reduce the metal oxide to elemental metal, such as iron. The
(Continued)

disclosed technologies are environmentally superior to conventional processes based on coal.

24 Claims, 6 Drawing Sheets

(51) Int. Cl.
    *C10B 53/02*     (2006.01)
    *C21B 5/00*     (2006.01)
    *C22B 1/00*     (2006.01)
    *C21B 13/00*     (2006.01)
    *C22B 15/00*     (2006.01)
    *C22B 23/02*     (2006.01)

(52) U.S. Cl.
    CPC ................ *C22B 1/005* (2013.01); *C22B 5/12* (2013.01); *C22B 15/0021* (2013.01); *C22B 23/02* (2013.01)

(56) References Cited

U.S. PATENT DOCUMENTS

| | | | |
|---|---|---|---|
| 2,289,917 A | 7/1942 | Lambiotte |
| 2,448,223 A | 8/1948 | Lantz |
| 2,475,767 A | 7/1949 | Williams et al. |
| 2,577,730 A | 12/1951 | Benedict et al. |
| 3,088,983 A | 5/1963 | Rosenthal |
| 3,235,374 A | 2/1966 | Mahony |
| 3,290,894 A | 12/1966 | Tsao |
| 3,298,928 A | 1/1967 | Esterer |
| 3,650,711 A | 3/1972 | Unick et al. |
| 3,852,048 A | 12/1974 | Pyle |
| 3,853,498 A | 12/1974 | Bailie |
| 3,928,023 A | 12/1975 | Claflin |
| 4,002,565 A | 1/1977 | Farrell et al. |
| 4,011,129 A | 3/1977 | Tomlinson |
| 4,015,951 A | 4/1977 | Gunnetman |
| 4,026,678 A | 5/1977 | Livingston |
| 4,082,694 A | 4/1978 | Wennerberg |
| 4,102,653 A | 7/1978 | Simmons et al. |
| 4,149,994 A | 4/1979 | Murty |
| 4,152,119 A | 5/1979 | Schulz |
| 4,158,643 A | 6/1979 | Sinha |
| 4,201,831 A | 5/1980 | Slusarczuk et al. |
| 4,210,423 A | 7/1980 | Yan |
| 4,236,897 A | 12/1980 | Johnston |
| 4,246,024 A | 1/1981 | Price-Falcon et al. |
| 4,248,839 A | 2/1981 | Toomey |
| 4,308,033 A | 12/1981 | Gunnennan |
| 4,310,334 A | 1/1982 | Waldron |
| 4,317,703 A | 3/1982 | Bowen et al. |
| 4,324,561 A | 4/1982 | Dean et al. |
| 4,385,905 A | 5/1983 | Tucker |
| 4,395,265 A | 7/1983 | Reilly et al. |
| 4,398,917 A | 8/1983 | Reilly |
| 4,405,331 A | 9/1983 | Blaustein et al. |
| 4,494,962 A | 1/1985 | Christie et al. |
| 4,500,327 A | 2/1985 | Nishino |
| 4,529,407 A | 7/1985 | Johnston et al. |
| 4,532,227 A | 7/1985 | Suggitt |
| 4,553,978 A | 11/1985 | Yvan |
| 4,561,860 A | 12/1985 | Gulley et al. |
| 4,632,731 A | 12/1986 | Bodle et al. |
| 4,652,433 A | 3/1987 | Ashworth et al. |
| 4,679,268 A | 7/1987 | Gurries et al. |
| 4,810,255 A | 3/1989 | Fay, III et al. |
| 4,810,446 A | 3/1989 | Sylvest |
| 4,828,573 A | 5/1989 | Jelks |
| 4,834,777 A | 5/1989 | Endebrock |
| 4,855,276 A | 8/1989 | Osborne et al. |
| 4,886,519 A | 12/1989 | Hayes et al. |
| 4,891,459 A | 1/1990 | Knight et al. |
| 4,935,099 A | 6/1990 | Weiss et al. |
| 5,132,259 A | 7/1992 | Curnutt |
| 5,141,526 A | 8/1992 | Chu |
| 5,153,242 A | 10/1992 | Timm et al. |
| 5,167,797 A | 12/1992 | Ou |
| 5,187,141 A | 2/1993 | Jha et al. |
| 5,231,063 A | 7/1993 | Fukumoto et al. |
| 5,248,413 A | 9/1993 | Stencel et al. |
| 5,336,835 A | 8/1994 | McNamara |
| 5,338,441 A | 8/1994 | LeViness |
| 5,342,418 A | 8/1994 | Jesse |
| 5,346,876 A | 9/1994 | Ichimura et al. |
| 5,352,252 A | 10/1994 | Tolmie |
| 5,403,548 A | 4/1995 | Aibe et al. |
| 5,431,702 A | 7/1995 | Schulz |
| 5,458,803 A | 10/1995 | Oehr |
| 5,513,755 A | 5/1996 | Heavilon et al. |
| 5,584,970 A | 12/1996 | Schmalfeld et al. |
| 5,643,342 A | 7/1997 | Andrews |
| 5,725,738 A | 3/1998 | Brioni et al. |
| 5,910,440 A | 6/1999 | Grossman et al. |
| 5,916,826 A | 6/1999 | White |
| 5,976,373 A | 11/1999 | Trocciola et al. |
| 5,980,595 A | 11/1999 | Andrews |
| 6,039,774 A | 3/2000 | McMullen et al. |
| 6,057,262 A | 5/2000 | Derbyshire et al. |
| 6,114,280 A | 9/2000 | Stephens |
| 6,342,129 B1 | 1/2002 | Vaughn et al. |
| 6,395,926 B1 | 5/2002 | Holtzapple et al. |
| 6,402,813 B2 | 6/2002 | Monereau et al. |
| 6,447,437 B1 | 9/2002 | Lee et al. |
| 6,506,223 B2 | 1/2003 | White |
| 6,524,354 B2 | 2/2003 | Sinha et al. |
| 6,698,724 B1 | 3/2004 | Traeger et al. |
| 6,712,606 B2 | 3/2004 | Hagstrom et al. |
| 6,719,816 B2 | 4/2004 | Barford |
| 6,797,034 B2 | 9/2004 | Sugitatsu et al. |
| 6,818,027 B2 | 11/2004 | Murcia |
| 6,843,831 B2 | 1/2005 | Kleut et al. |
| 6,901,868 B2 | 6/2005 | Hornung et al. |
| 7,241,321 B2 | 7/2007 | Murcia |
| 7,282,072 B2 | 10/2007 | Taulbee |
| 7,314,002 B2 | 1/2008 | Dupuis |
| 7,326,263 B2 | 2/2008 | Andersen |
| 7,332,002 B2 | 2/2008 | Johnson et al. |
| 7,354,566 B2 | 4/2008 | Okada et al. |
| 7,357,903 B2 | 4/2008 | Zhou et al. |
| 7,378,372 B2 | 5/2008 | Sylvester |
| 7,404,262 B2 | 7/2008 | Jurkovich et al. |
| 7,435,286 B2 | 10/2008 | Olson et al. |
| 7,438,785 B2 | 10/2008 | Meier et al. |
| 7,455,704 B2 | 11/2008 | Garwood |
| 7,468,170 B2 | 12/2008 | Comrie |
| 7,691,182 B1 | 4/2010 | Muradov |
| 7,708,806 B2 | 5/2010 | Wright et al. |
| 7,749,359 B2 | 7/2010 | Flottvik |
| 7,785,379 B2 | 8/2010 | Drisedelle et al. |
| 7,799,544 B2 | 9/2010 | Schorken et al. |
| 7,811,339 B2 | 10/2010 | Werner |
| 7,879,136 B2 | 2/2011 | Mazyck |
| 7,905,990 B2 | 3/2011 | Freel |
| 7,931,783 B2 | 4/2011 | Dam-Johansen |
| 7,932,065 B2 | 4/2011 | Medoff |
| 7,942,942 B2 | 5/2011 | Paoluccio |
| 7,943,014 B2 | 5/2011 | Berruti et al. |
| 7,960,325 B2 | 6/2011 | Kluko |
| 7,981,835 B2 | 7/2011 | Srinivasachar et al. |
| 8,048,528 B2 | 11/2011 | Matviya |
| 8,080,088 B1 | 12/2011 | Srinivasachar |
| 8,105,400 B2 | 1/2012 | Bergman |
| 8,150,776 B2 | 4/2012 | Comrie |
| 8,237,006 B2 | 8/2012 | Stone et al. |
| 8,308,911 B2 | 11/2012 | Cheiky |
| 8,309,052 B2 | 11/2012 | Jones |
| 8,328,887 B2 | 12/2012 | Yang et al. |
| 8,361,186 B1 | 1/2013 | Shearer et al. |
| 8,383,071 B2 | 2/2013 | Dillon et al. |
| 8,404,384 B2 | 3/2013 | Feaver et al. |
| 8,404,909 B2 | 3/2013 | Jadhav |
| 8,425,633 B2 | 4/2013 | Banasiak |
| 8,436,120 B2 | 5/2013 | Piskorz et al. |

(56) References Cited

U.S. PATENT DOCUMENTS

| | | |
|---|---|---|
| 8,449,724 B2 | 5/2013 | Stromberg et al. |
| 8,476,480 B1 | 7/2013 | Brown et al. |
| 8,519,205 B2 | 8/2013 | Frey |
| 8,541,637 B2 | 9/2013 | Babicki et al. |
| 8,563,467 B2 | 10/2013 | Hashisho et al. |
| 8,637,055 B2 | 1/2014 | Maor |
| 8,669,404 B2 | 3/2014 | Shulenberger et al. |
| 8,685,136 B2 | 4/2014 | Metius et al. |
| 8,801,936 B2 | 8/2014 | Grass et al. |
| 8,920,525 B2 | 12/2014 | Despen et al. |
| 8,920,609 B2 | 12/2014 | Steele et al. |
| 8,926,932 B2 | 1/2015 | Pfeifer et al. |
| 8,993,478 B2 | 3/2015 | Fujii et al. |
| 8,999,885 B2 | 4/2015 | Majmudar et al. |
| 9,108,186 B2 | 8/2015 | Satterfield |
| 9,121,606 B2 | 9/2015 | Srinivasachar |
| 9,281,135 B2 | 3/2016 | Soneda et al. |
| 9,388,046 B2 | 7/2016 | Mennell et al. |
| 9,388,355 B2 | 7/2016 | Mennell et al. |
| 9,475,031 B2 | 10/2016 | Mennell et al. |
| 9,527,780 B2 | 12/2016 | Wilson et al. |
| 9,724,667 B2 | 8/2017 | Mennell et al. |
| 9,725,371 B2 | 8/2017 | Shearer et al. |
| 9,752,090 B2 | 9/2017 | Despen et al. |
| 9,845,440 B2 | 12/2017 | Mennell et al. |
| 10,332,226 B2 | 6/2019 | Block et al. |
| 10,611,977 B2 | 4/2020 | Mennell et al. |
| 10,982,161 B2 | 4/2021 | Mennell et al. |
| 10,995,274 B2 | 5/2021 | Marsh |
| 11,091,716 B2 | 8/2021 | Despen et al. |
| 11,286,440 B2 | 3/2022 | Mennell et al. |
| 2002/0048144 A1 | 4/2002 | Sugo et al. |
| 2003/0154858 A1 | 8/2003 | Kleut et al. |
| 2003/0221363 A1 | 12/2003 | Reed |
| 2004/0045215 A1 | 3/2004 | Guilfoyle |
| 2004/0178052 A1 | 9/2004 | Antal |
| 2005/0095183 A1 | 5/2005 | Rehmat et al. |
| 2005/0258093 A1 | 11/2005 | Cueman et al. |
| 2005/0274068 A1 | 12/2005 | Morton et al. |
| 2005/0279696 A1 | 12/2005 | Bahm et al. |
| 2006/0048646 A1 | 3/2006 | Olson et al. |
| 2006/0120934 A1 | 6/2006 | Lanier et al. |
| 2006/0280669 A1 | 12/2006 | Jones |
| 2007/0006526 A1 | 1/2007 | Cullen |
| 2007/0034126 A1 | 2/2007 | Chen et al. |
| 2007/0125228 A1 | 6/2007 | Alizadeh-Khiavi et al. |
| 2007/0220805 A1 | 9/2007 | Leveson et al. |
| 2007/0261295 A1 | 11/2007 | Tolmie |
| 2008/0281673 A1 | 11/2008 | Davis et al. |
| 2009/0031616 A1 | 2/2009 | Agblevor |
| 2009/0056205 A1 | 3/2009 | Gauthier et al. |
| 2009/0151251 A1 | 6/2009 | Manzer et al. |
| 2009/0188160 A1 | 7/2009 | Liu |
| 2009/0205546 A1 | 8/2009 | Kluko |
| 2009/0314185 A1 | 12/2009 | Whellock |
| 2010/0139155 A1 | 6/2010 | Mennell et al. |
| 2010/0228062 A1 | 9/2010 | Babicki et al. |
| 2010/0273899 A1 | 10/2010 | Winter |
| 2010/0300866 A1 | 12/2010 | van Aardt et al. |
| 2011/0002086 A1 | 1/2011 | Feaver et al. |
| 2011/0011721 A1 | 1/2011 | Champagne |
| 2011/0071022 A1 | 3/2011 | Bandosz et al. |
| 2011/0099887 A1 | 5/2011 | Stinson et al. |
| 2011/0099890 A1 | 5/2011 | Bohlig et al. |
| 2011/0219679 A1 | 9/2011 | Budarin et al. |
| 2011/0287999 A1 | 11/2011 | Mahaffey et al. |
| 2011/0296745 A1 | 12/2011 | Hilten et al. |
| 2012/0021123 A1 | 1/2012 | Leveson et al. |
| 2012/0023809 A1 | 2/2012 | Koch et al. |
| 2012/0125064 A1 | 5/2012 | Joseph et al. |
| 2012/0172216 A1 | 7/2012 | Böhringer et al. |
| 2012/0174475 A1 | 7/2012 | Mennell et al. |
| 2012/0174476 A1 | 7/2012 | Mennell et al. |
| 2012/0282465 A1 | 11/2012 | Kadam et al. |
| 2012/0285080 A1 | 11/2012 | Despen et al. |
| 2012/0286211 A1 | 11/2012 | Cheiky et al. |
| 2012/0289752 A1 | 11/2012 | Gosselink et al. |
| 2013/0022771 A1 | 1/2013 | Malet et al. |
| 2013/0145684 A1 | 6/2013 | Mennell et al. |
| 2013/0152461 A1 | 6/2013 | Mennell et al. |
| 2013/0295628 A1 | 11/2013 | Retsina et al. |
| 2013/0326935 A1 | 12/2013 | Kimball |
| 2014/0075832 A1 | 3/2014 | Mennell et al. |
| 2014/0075834 A1 | 3/2014 | Mennell et al. |
| 2014/0332363 A1 | 11/2014 | Durand et al. |
| 2014/0338576 A1 | 11/2014 | Mennell et al. |
| 2015/0114908 A1 | 4/2015 | Traxler et al. |
| 2015/0126362 A1 | 5/2015 | Despen et al. |
| 2015/0144831 A1 | 5/2015 | Mennell et al. |
| 2015/0196896 A1 | 7/2015 | Mennell et al. |
| 2016/0068759 A1 | 3/2016 | Ellens et al. |
| 2016/0114308 A1 | 4/2016 | Despen et al. |
| 2016/0145519 A1 | 5/2016 | Walter |
| 2016/0244686 A1 | 8/2016 | Dickinson |
| 2016/0280554 A1 | 9/2016 | Despen et al. |
| 2016/0304787 A1 | 10/2016 | Aelion et al. |
| 2017/0137294 A1 | 5/2017 | Marker et al. |
| 2017/0145444 A1 | 5/2017 | Hill et al. |
| 2017/0152440 A1 | 6/2017 | Wilson et al. |
| 2017/0197192 A1 | 7/2017 | Malyala et al. |
| 2017/0321139 A1 | 11/2017 | Despen et al. |
| 2018/0119040 A1 | 5/2018 | Waanders et al. |
| 2018/0127672 A1 | 5/2018 | Mennell et al. |
| 2018/0208852 A1 | 7/2018 | Marsh |
| 2018/0327329 A1 | 11/2018 | Bontchev et al. |
| 2019/0002323 A1 | 1/2019 | Benedek et al. |
| 2019/0264121 A1 | 8/2019 | China |
| 2020/0056098 A1 | 2/2020 | Seidner |
| 2020/0140901 A1 | 5/2020 | Foody et al. |
| 2020/0255660 A1 | 8/2020 | McGolden |
| 2020/0318018 A1 | 10/2020 | Germanaud et al. |
| 2020/0381732 A1 | 12/2020 | Wagner et al. |
| 2021/0155481 A1 | 5/2021 | Kim et al. |
| 2021/0220801 A1 | 7/2021 | Mennell et al. |
| 2022/0098700 A1* | 3/2022 | Mennell ............... C22B 1/242 |
| 2022/0098701 A1* | 3/2022 | Mennell ............... C10J 3/62 |
| 2022/0228080 A1 | 7/2022 | Mennell et al. |
| 2022/0228082 A1 | 7/2022 | Mennell et al. |
| 2022/0267869 A1 | 8/2022 | Mennell et al. |
| 2022/0340818 A1 | 10/2022 | Mennell et al. |
| 2022/0396529 A1 | 12/2022 | Mennell et al. |
| 2023/0015387 A1 | 1/2023 | Slack et al. |
| 2023/0020752 A1 | 1/2023 | Slack et al. |

FOREIGN PATENT DOCUMENTS

| | | |
|---|---|---|
| CN | 101805626 A | 8/2010 |
| CN | 110438335 | 8/2020 |
| DE | 202009010612 | 10/2009 |
| EP | 0930091 | 7/1999 |
| GB | 1412407 | 11/1975 |
| GB | 2460064 | 11/2009 |
| JP | S47-013408 | 4/1972 |
| JP | S54135666 | 10/1972 |
| JP | S55136116 | 10/1980 |
| JP | S60-238144 | 11/1985 |
| JP | H0564789 | 3/1993 |
| JP | 06-88077 | 3/1994 |
| JP | 10-208985 | 8/1998 |
| JP | 2000157832 | 6/2000 |
| JP | 2000-212568 | 8/2000 |
| JP | 2000-265186 | 9/2000 |
| JP | 2001-300497 | 10/2001 |
| JP | 2002-211911 | 7/2002 |
| JP | 2002-226865 | 8/2002 |
| JP | 2002-255796 | 9/2002 |
| JP | 2002-289683 | 10/2002 |
| JP | 2003-038941 | 2/2003 |
| JP | 2003-213273 | 7/2003 |
| JP | 2003-238136 | 8/2003 |
| JP | 2003-251398 | 9/2003 |
| JP | 2003-286021 | 10/2003 |
| JP | 2004-912 | 1/2004 |
| JP | 2004534641 | 11/2004 |

(56) References Cited

FOREIGN PATENT DOCUMENTS

| | | |
|---|---|---|
| JP | 2005-263547 | 9/2005 |
| JP | 2005230810 | 9/2005 |
| JP | 2005-298602 | 10/2005 |
| JP | 2006263513 | 10/2006 |
| JP | 2006-315899 | 11/2006 |
| JP | 2008-037931 | 2/2008 |
| JP | 2008-222901 | 9/2008 |
| JP | 2009-125070 | 6/2009 |
| JP | 2010-194502 | 9/2010 |
| JP | 2010-202298 | 9/2010 |
| JP | 2010-222474 | 10/2010 |
| JP | 2011516263 | 5/2011 |
| JP | 2011161330 | 8/2011 |
| JP | 2011-230038 | 11/2011 |
| JP | 2011-240329 | 12/2011 |
| JP | 2006-96615 | 12/2012 |
| JP | 2013082588 | 5/2013 |
| RU | 2729810 | 8/2020 |
| TW | 501939 | 9/2002 |
| WO | WO 1990/01529 | 2/1990 |
| WO | WO 2000/071936 | 11/2000 |
| WO | WO 2002/069351 | 9/2002 |
| WO | WO 2005/049530 | 6/2005 |
| WO | WO 2006/122405 | 11/2006 |
| WO | WO 2007/147244 | 12/2007 |
| WO | WO 2008/022461 | 2/2008 |
| WO | WO 2008/076944 | 6/2008 |
| WO | WO 2008/144416 | 11/2008 |
| WO | WO 2009/018469 | 2/2009 |
| WO | WO 2009/105441 | 8/2009 |
| WO | WO 2010/110470 | 9/2010 |
| WO | WO 2010/128055 | 11/2010 |
| WO | WO 2010/132970 | 11/2010 |
| WO | WO 2011/045473 | 4/2011 |
| WO | WO 2011/053668 | 5/2011 |
| WO | WO 2011/065484 | 6/2011 |
| WO | WO 2011/081086 | 7/2011 |
| WO | WO 2011/119961 | 9/2011 |
| WO | WO 2011/162727 | 12/2011 |
| WO | WO 2012/142486 | 10/2012 |
| WO | WO 2012/142488 | 10/2012 |
| WO | WO 2012/142489 | 10/2012 |
| WO | WO 2012/142491 | 10/2012 |
| WO | WO 2013/169803 | 11/2013 |
| WO | WO 2013/169806 | 11/2013 |
| WO | WO 2013/169811 | 11/2013 |
| WO | WO 2013/172705 | 11/2013 |
| WO | WO 2013/187940 | 12/2013 |
| WO | WO 2015/061701 | 4/2015 |
| WO | WO 2015/109206 | 7/2015 |
| WO | WO 2015/127460 | 8/2015 |
| WO | WO 2016/065357 | 4/2016 |
| WO | WO 2017/002096 | 1/2017 |
| WO | WO 2020/219635 | 10/2020 |

OTHER PUBLICATIONS

Antal et al., "The Art, Science and Technology of Charcoal Production," Ind. Eng. Chem. Res., 42:1619-1640 (publication date: Mar. 14, 2003).
Ayanda et al., "Activated Carbon-Fly Ash-Nanometal Oxide Composite Materials: Preparation, Characterization, and Tributyltin Removal Efficiency," Journal of Chemistry. vol. 2013 (2013).
Baldock, "Chemical composition and bioavailability of thermally altered *Pinus resinosa* (Red pine) wood," Org. Geochem., vol. 33(9), pp. 1093-1109 (publication date: Sep. 2002).
Brodowski, "Morphological and Chemical Properties of Black Carbon in Physical Soil Fractions as Revealed by Scanning Electron Microscopy and Energy-Dispersive X-ray Spectroscopy," Geoderma, vol. 128, pp. 116-129 (publication date: Sep. 2005).
Cheng et al., "Oxidatin of black carbon by biotic and abiotic processes," Organic Geochemistry 37:1477-1488 (publication date: Nov. 2006).

Demirbas, "Effects of Temperature and Particle Size on Bio-Char Yield from Pyrolysis of Agricultural Residues," J. Anal. Appl. Pyrolysis, vol. 72, pp. 243-248 (publication date: Nov. 2004).
Di Felice et al., "Biomass Gasification with Catalytic Tar Reforming: A Model Study into Activity Enhancement of Calcium—and Magnesium-Oxide-Based Catalytic Materials by Incorporation of Iron," Energy Fuels vol. 24, pp. 4034-4045 (publication date: Jun. 25, 2010).
Du, "Some Thoughts on the Chemical Compositions of Fly Ash: ICAR's 17th Annual Symposium. The University of Texas at Austin," (2009).
Edgehill et al. "Adsorption Characteristics of Carbonized Bark for Phenol and Pentachlorophenol," (publication date: Mar. 26, 1999).
Freese et al. "Powdered Activated Carbon: Can This Be Effectively Assessed in the Laboratory," (publication date: May 28-Jun. 1, 2000).
Gupta et al., "Utilisation of bagasse fly ash (a sugar industry waste) for the removal of copper and zinc from wasterwater," Separation and Purification Technology Journal. vol. 18, Issue 2, pp. 131-140 (publication date: Mar. 2000).
Hamer, "Interactive Priming of Black Carbon and Glucose Mineralisation," Org. Geochem., vol. 35, Issue 7, pp. 823-830 (publication date: Jul. 2004).
Hardman et al., "Studies of Spontaneous Combustion in Beds of Activated Carbon," Fuel, IPC Science and Technology Press, vol. 59, No. 3, pp. 151-156 (publication date: Mar. 1980).
Horst-Günter Brocksiepe et al., "Charcoal," Ullmann, 8:93-98 (epublication date: Jun. 15, 2000).
Hung, "The Production of Activated Carbon from Coconut Shells Using Pyrolysis and Fluidized Bed Reactors. A Thesis Submitted to the Honors College," The University of Arizona, May 2012, [retrieved on May 4, 2015] [retrieved from the internet] <URL: http://arizona/openrepository.com/arizona/bitstream/10150/243968/1/azuetdmr_2012_0079_sip1_m.pdf> Abstract, pp. 8, 9, 12, 31-33.
Hwang et al., "Characterization of char derived from various types of solid wastes from the standpoint of fuel recovery and pretreatment before landfilling," Waste Management 27(9):1155-1166 (epublication date: Aug. 22, 2006).
Iqbaldin et al., "Properties of coconut shell activated carbon," Journ. Tropical Forest Science, 25(4):497-503 (publication date: Oct. 2013).
Jha et al., "Sorption properties of the activated carbon-zeolite composite prepared from coal fly ash for Ni(2+), Cu(2+), Cd(2+) and Pb(2+)," Journal of Hazardous Materials. vol. 160, Issue 1 pp. 148-153 (publication date: Dec. 15, 2008, epublication date: Mar. 6, 2008).
Khan et al., "Removal of trace elements from Thar coal to minimize its hazardous effect on the environment," Journal of Himalayan Earth Sciences 49(1):50-57 (2016).
Kuzyakov, "Black Carbon Decomposition and Incorporation into Soil Microbial Biomass Estimated by 14C Labeling," Soil Bio & Biochem., vol. 4, pp. 210-219 (publication date: Feb. 2009).
Lakdawala et al., "The effect of low cost material Bagasse Fly ash to the removal of COD Contributing component of combined waste water of Sugar Industry," Scholars Research Library (publication date: Apr. 2012).
Lehmann, "Bio-energy in the black," Front. Ecol. Enviorn., vol. 5(7), pp. 381-387 (publication date: Sep. 1, 2007).
Mackay, "The Dependence of Char and Carbon Yield on Lignocellulosic Precursor Composition," Carbon, col. 20(2), pp. 87-94 (1982).
Martin et al., "Gasification and Production of Biochar from Wastewater Grown Algae," Water New Zealand Annual Conference, Sep. 22-24, 2010, XP055337229, Retrieved from the Internet: URL: https://www.waternz.org.nz/Attachment?Action=Download &Attachment_id=1127 [retrieved on Jan. 20, 2017].
Novack, "Impact of Biochar Amendment on Fertility of a Southeastern Coastal Plain Soil," Soil Sci., vol. 174(2), pp. 105-112 (publication date: Feb. 2009).
PCT/US2009/069133 International Search Report and Written Opinion dated Jul. 26, 2011.
PCT/US2009/069403 International Search Report and Written Opinion dated Jul. 26, 2011.

(56) References Cited

OTHER PUBLICATIONS

PCT/US2012/033624 International Search Report dated Sep. 17, 2012.
PCT/US2012/033627 International Search Report dated Jul. 13, 2012.
PCT/US2012/033628 International Search Report dated Jul. 6, 2012.
PCT/US2012/033630 International Search Report dated Aug. 21, 2012.
PCT/US2012/033630 Written Opinion dated Aug. 21, 2012.
PCT/US2013/039981 International Search Report dated Oct. 22, 2013.
PCT/US2013/039986 International Search Report dated Oct. 26, 2013.
PCT/US2013/039991 International Search Report dated Dec. 16, 2013.
PCT/US2014/062202 International Search Report and Written Opinion dated Feb. 3, 2015.
PCT/US2015/011787 International Search Report dated Jun. 11, 2015.
PCT/US2015/017351 International Search Report dated May 15, 2015.
PCT/US2015/57370 International Search Report dated Jan. 8, 2016.
Purnomo et al., "Preparation and characterization of activated carbon from bagasse fly ash," Journal of Analytical and Applied Pyrolysis. vol. 91, Issue 1, pp. 257-262 (publication date: May 2011).
Saravanakumar et al., "Experimental investigations of long stick wood gasification in a bottom lit updraft fixed bed gasifier," Fuel Processing Technology, 88(6):617-622 (publication date: Jun. 2007).
Shinogi et al., "Pyrolysis of plant, animal and human waste: physical and chemical characterization of the pyrolytic products," Bioresource Technology 90:241-247 (publication date: Dec. 2003).
Tay et al., "Preparation and characterization of activated carbon from waste biomass," Journal of Hazardous Materials ND 165(1-3):481-485 (publication date: Jun. 15, 2009).
Ueda, Shigeru et al., "Improvement of Reactivity of Carbon Iron Ore Composite with Biomass Char for Blast Furnace," ISIJ International (2009) 49(10):1505-1512.
Yan et al., "Thermal Pretreatment of Lignocellulosic Biomass," Environmental Progress and Sustainable Energy, vol. 28, No. 3, pp. 435-440 (epublication date: Aug. 5, 2009).
Biermann et al., "Carbon Allocation in Multi-Product Steel Mills That Co-process Biogenic and Fossil Feedstocks and Adopt Carbon Capture Utilization and Storage Technologies," Frontiers in Chemical Engineering (publication date: Dec. 9, 2020).
Bronson, Benjamin, "The Effects of Feedstock Pre-treatment on the Fluidized Bed Gasification of Biomass," Thesis submitted to the Faculty of Graduate and Postdoctoral Studies in partial fulfilmment of the requirements for M.A.Sc. In Chemical Engineering, University of Ottawa (2014).
Cleveland, Cutler J. and Morris, Christopher. Dictionary of Energy (Expanded Edition)—passive solar cooling (pp. 373). Elsevier. (2009).
De Mattos Carneiro-Junior et al., "Valorization of Prosopis juliflora Woody Biomass in Northeast Brazilian through Dry Torrefaction," Energies, Energies Jun. 11, 2021, 14, 3465.
Demirbas et al., "Estimating the Calorific Values of Lignocellulosic Fuels," Energy Exploration & Exploitation 22(2):135-143 (publication date: Apr. 1, 2004).
Gonzalez et al., "Pyrolysis of various biomass residues and char utilization for the production of activated carbons," J. Anal. Appl. Pyrolysis, 85:134-141 (epublication date: Dec. 3, 2008).
Gudka et al., A review of the mitigation of deposition and emission problems during biomass combustion through washing pre-treatment, Journal of the Energy Institute (Published May 2016), vol. 89, Issue 2, May 2016, pp. 159-171.
International Search Report and Written Opinion dated Apr. 1, 2022 for International Application No. PCT/US2022/013151.
International Search Report and Written Opinion dated Apr. 1, 2022 for International Application No. PCT/US2022/013156.
International Search Report and Written Opinion dated Feb. 8, 2022 for International Application No. PCT/US2021/60071.
International Search Report and Written Opinion dated Feb. 8, 2022 for International Application No. PCT/US21/60053.
International Search Report and Written Opinion dated Jul. 15, 2022 for International Application No. PCT/US2022/026591.
International Search Report and Written Opinion dated Jul. 19, 2022 for International Application No. PCT/US2022/026597.
International Search Report and Written Opinion dated Mar. 20, 2023 for International Application No. PCT/US2022/049237.
International Search Report and Written Opinion dated Mar. 29, 2023 for International Application No. PCT/US2022/049240.
International Search Report and Written Opinion dated Nov. 17, 2022 for International Application No. PCT/US2022/039119.
International Search Report and Written Opinion dated Oct. 11, 2022 for International Application No. PCT/US2022/036282.
International Search Report and Written Opinion dated Oct. 11, 2022 for International Application No. PCT/US2022/036292.
International Search Report and Written Opinion dated Oct. 19, 2022 for International Application No. PCT/US2022/039116.
International Search Report and Written Opinion dated Oct. 6, 2022 for International Application No. PCT/US2022/036294.
Keiluweit et al., "Dynamic Molecular Structure of Plant Biomass-Derived Black Carbon (Biochar)," Environ. Sci. Technol. 44:1247-1253 (epublication date: Jan. 25, 2010).
Phasee et al., "An investigation on mechanical property of MSW-derived fuel pellet produced from hydronthermal treatement," Journal of Material Cycles and Waste Management, 20:2028-2040 (publication date: Jun. 15, 2018).
Phyllis Database Phyllis2—ECN Phyllis classification https://phylis.nl/Browse/Standart/ECN-Phyllis#pyrolisis (2015).
Ruksathamcharoen et al., "Effects of hydrothermal treatment and pelletizing temperature on the mechanical properties of empty fruit bunch pellets," Applied Energy, 113385 (epublication date: May 18, 2019).
Tanzer et al., "Can bioenergy with carbon capture and storage result in carbon negative steel?" 100:1-15, International Journal of Greenhouse Gas Control (publication date: Jul. 24, 2020) (Abstract onlv)
Warnecke, "Gasification of biomass: comparison of fixed bed and fluidized bed gasifier," Biomass & Bioenergy, 18:489-497 (2000).
Yang et al., "Harmonized comparison of virgin steel production using biomass with carbon capture and storage for negative emissions," 112:1-33, International Journal of Greenhouse Gas Control (publication date: Nov. 23, 2021).

* cited by examiner

BIO-REDUCTION OF METAL ORES INTEGRATED WITH BIOMASS PYROLYSIS

CROSS REFERENCE TO RELATED APPLICATIONS

This application claims the benefit of U.S. Provisional Patent Application No. 63/083,223 filed Sep. 25, 2020, which is incorporated herein by reference in its entirety.

INCORPORATION BY REFERENCE

All publications, patents, and patent applications mentioned in this specification are herein incorporated by reference to the same extent as if each individual publication, patent, or patent application was specifically and individually indicated to be incorporated by reference.

TECHNICAL FIELD

The present disclosure relates to processes, systems, and apparatus for the processing of metal ores to produce metals using carbon-containing reagents.

BACKGROUND

Biomass is a term used to describe biologically produced matter. The chemical energy contained in biomass is derived from solar energy using the natural process of photosynthesis. This is the process by which plants take in carbon dioxide and water from their surroundings and, using energy from sunlight, convert them into sugars, starches, cellulose, hemicellulose, and lignin. Of all the renewable energy sources, biomass is unique in that it is, effectively, stored solar energy. Furthermore, biomass is the only renewable source of carbon.

Carbonaceous materials for industrial use are commonly sourced from fossil resources, such as natural gas, petroleum, coal, and lignite, while renewable resources such as lignocellulosic biomass and various carbon-rich waste materials are of increasing interest.

There exist a variety of conversion technologies to convert biomass feedstocks into carbonaceous materials. Increased use of biomass based carbonaceous materials poses technical and economic challenges arising from feedstock variations, operational difficulties, and capital intensity.

There has been less focus on improving pyrolysis processes specifically for optimizing yield and quality of the solids as high-carbon reagents. Historically, slow pyrolysis of wood has been performed in large piles, in a simple batch process, with no emissions control. Traditional charcoal-making technologies are energy-inefficient as well as highly polluting. Clearly, there are economic and practical challenges to scaling up such a process for continuous commercial-scale production of high-quality carbon, while managing the energy balance and controlling emissions.

Metal processing is an enormously important industry on a global basis. For example, with respect to steel (alloys of iron), the global steel market size is expected to reach $1 trillion USD by 2025, according to *Steel Market Size, Share & Trends Analysis* 2018-2025, Grand View Research, Inc. (2017). Growing inclination of contractors towards sustainable, low-cost, and durable building materials is driving steel demand in industrial infrastructure and residential projects. In pre-engineered metal buildings with high structural integrity, steel plays an essential function in stability, design flexibility, and aesthetic appeal. Stringent regulations promoting green and energy-efficient buildings are also contributing to steel demand, especially in industrial structures.

About 70% of all steel is made from pig iron produced by reducing iron oxide in a blast furnace using coke or coal before reduction in an oxygen-blown converter. The use of non-renewable coal or coal-derived coke causes non-renewable carbon dioxide to be emitted into the atmosphere, in addition to depleting fossil resources.

Oxygenated iron ores are mined globally. Typically, iron ores are taken through a beneficiation process to grind and concentrate the iron fraction, then rolled into pellets (with binders) and heated in an induration furnace, burning coal for heat, to harden the pellets for shipment to a blast furnace where coke is used to reduce the oxygenated ore to metallic iron. The induration and coking processes create massive amounts of $CO_2$ and other pollutants.

Generally speaking, metals processing causes significant global net $CO_2$ emissions annually. For example, one of the biggest drawbacks of conventional blast furnaces is the inevitable carbon dioxide production as iron is reduced from iron oxides by carbon. Steelmaking is one of the largest industrial contributors of $CO_2$ emissions in the world today. There is a strong desire to make metal-making processes more environmentally friendly.

In view of the aforementioned needs, there is a commercial desire for improved processes and systems for converting metal ores to metals.

SUMMARY

Carbon-based reagents can be produced, in theory, from virtually any material containing carbon. It is preferable to utilize renewable biomass to produce carbon-based reagents because of the rising economic, environmental, and social costs associated with fossil resources.

Pyrolysis is a process for thermal conversion of solid materials in the complete absence of oxidizing agent (air or oxygen), or with such limited supply that oxidation does not occur to any appreciable extent. Depending on process conditions and additives, biomass pyrolysis can be adjusted to produce widely varying amounts of gas, liquid, and solid. Lower process temperatures and longer vapor residence times favor the production of solids. High temperatures and longer residence times increase the biomass conversion to syngas, while moderate temperatures and short vapor residence times are generally optimum for producing liquids. There is a need for technological advances in pyrolysis and related processes for converting biomass into high-quality syngas or to liquids as precursors to liquid fuels.

The present disclosure addresses the deficiencies in the field and relates to processes, systems, and apparatus for the processing of metal ores to produce metals using carbon-containing reagents.

Disclosed herein are processes for reducing a metal ore. The processes disclosed herein can comprise:
  providing a biomass feedstock;
  pyrolyzing the biomass feedstock, thereby generating a biogenic reagent and a pyrolysis off-gas, wherein the biogenic reagent comprises carbon, wherein the pyrolysis off-gas comprises hydrogen or carbon monoxide;
  obtaining a metal ore, wherein the metal ore comprises a metal oxide and the metal ore is in particulate form;
  combining the carbon with the metal ore, thereby generating a carbon-metal ore particulate; and chemically reducing the metal oxide, wherein the chemically reducing is achieved using the pyrolysis off-gas.

In some embodiments, the processes comprise pelletizing the carbon-metal ore particulate, thereby generating a carbon-metal ore pellet. In some embodiments, the metal oxide is comprised within the carbon-metal ore pellet.

In some embodiments, the biomass feedstock is softwood chips, hardwood chips, timber harvesting residues, tree branches, tree stumps, leaves, bark, sawdust, corn, corn stover, wheat, wheat straw, rice, rice straw, sugarcane, sugarcane bagasse, sugarcane straw, energy cane, sugar beets, sugar beet pulp, sunflowers, sorghum, canola, algae, miscanthus, alfalfa, switchgrass, fruits, fruit shells, fruit stalks, fruit peels, fruit pits, vegetables, vegetable shells, vegetable stalks, vegetable peels, vegetable pits, grape pumice, almond shells, pecan shells, coconut shells, coffee grounds, food waste, commercial waste, grass pellets, hay pellets, wood pellets, cardboard, paper, paper pulp, paper packaging, paper trimmings, food packaging, construction or demolition waste, lignin, animal manure, municipal solid waste, municipal sewage, or a combination thereof.

In some embodiments, the biogenic reagent comprises at least about 50 wt %, at least about 75 wt %, or at least about 90 wt % total carbon. The biogenic reagent can comprise about, at least about, or at most about 50, 55, 60, 65, 70, 75, 80, 85, 90, 95, or 99 wt % total carbon. The total carbon is fixed carbon plus non-fixed carbon, which is present in volatile matter.

In some embodiments, the biogenic reagent comprises at least about 50 wt %, at least about 75 wt %, or at least about 90 wt % fixed carbon. In some embodiments, the biogenic reagent comprises about, at least about, or at most about 50, 55, 60, 65, 70, 75, 80, 85, 90, 95, 96, 97, 98, 99, or 100 wt % fixed carbon.

The carbon (within the biogenic reagent) can be at least about 50 wt %, at least about 75%, or at least about 90 wt % fixed carbon, for example, with the remainder of the carbon being volatile carbon. In various embodiments, the carbon contains about, at least about, or at most about 50, 55, 60, 65, 70, 75, 80, 85, 90, 95, 96, 97, 98, 99, or 100 wt % fixed carbon.

In some embodiments, the metal ore is iron ore, copper ore, nickel ore, magnesium ore, manganese ore, aluminum ore, tin ore, zinc ore, cobalt ore, chromium ore, tungsten ore, molybdenum ore, or a combination thereof. In some embodiments, the metal ore is iron ore. In some embodiments, the iron ore is hematite, magnetite, limonite, taconite, or a combination thereof. In some embodiments, the metal ore is a beneficiated metal ore. In some embodiments, the metal ore is in particulate form and the particulate form is powdered form. In some embodiments, the carbon-metal ore particulate is a carbon-metal ore fine. In some embodiments, the carbon-metal ore particulate is a carbon-metal ore lump.

In some embodiments, the carbon-metal ore particulate comprises at least about 0.1 wt % to at most about 50 wt % carbon. In some embodiments, the carbon-metal ore particulate comprises at least about 1 wt % to at most about 10 wt % carbon. In some embodiments, such as those employed in relation to a typical blast furnace, the carbon-metal ore particulate comprises at least about 3 wt % to at most about 6 wt % carbon.

In some embodiments, the carbon-metal ore pellet comprises an additive. In some embodiments, the additive comprises a binder. Exemplary binders include inorganic bentonite clay, limestone, starch, cellulose, lignin, and acrylamides.

In some embodiments, the additive is selected from an acid, a base, or a salt or a derivative thereof. In some embodiments, the additive is a metal, a metal oxide, a metal hydroxide, a metal halide, or a combination or derivative thereof. For example, an additive can be selected from sodium hydroxide, potassium hydroxide, magnesium oxide, hydrogen bromide, hydrogen chloride, sodium silicate, potassium permanganate, magnesium, manganese, aluminum, nickel, chromium, silicon, boron, cerium, molybdenum, phosphorus, tungsten, vanadium, iron halide, iron chloride, iron bromide, dolomite, dolomitic lime, fluorite, fluorospar, bentonite, calcium oxide, lime, or a combination or a derivative thereof.

The additive can be added before, during, or after any one or more steps of the process, including into the feedstock itself at any time.

In some embodiments, the carbon-metal ore pellet consists essentially of the carbon and the metal ore.

In some embodiments, the chemically reducing directly utilizes the pyrolysis off-gas. In some embodiments, the chemically reducing indirectly utilizes the pyrolysis off-gas by first partially oxidizing the pyrolysis off-gas, thereby generating a reducing gas, and then chemically reducing, utilizing the reducing gas, the metal oxide within the carbon-metal ore particulate. In some embodiments, the chemically reducing indirectly utilizes the pyrolysis off-gas by first partially oxidizing the pyrolysis off-gas, thereby generating a reducing gas, and then chemically reducing, utilizing the reducing gas, the metal oxide within the carbon-metal ore pellet.

In some embodiments, the chemically reducing co-utilizes a reducing gas obtained from gasification, partial oxidation, or steam reforming of the biogenic reagent or a portion thereof.

In some embodiments, the processes further comprises obtaining, during the pyrolysis, heavy hydrocarbons. In some embodiments, the biogenic reagent comprises heavy hydrocarbons, and wherein the heavy hydrocarbons are converted to a reducing gas.

In some embodiments, the chemically reducing co-utilizes a reducing gas obtained from gasification, partial oxidation, or steam reforming of light hydrocarbons.

In some embodiments, the pyrolysis off-gas comprises light hydrocarbons. In some embodiments, the pyrolysis off-gas comprises at least 1 mol % hydrogen. In some embodiments, the pyrolysis off-gas comprises at least 10 mol % hydrogen. In some embodiments, the pyrolysis off-gas comprises at least 1 mol % carbon monoxide. In some embodiments, the pyrolysis off-gas comprises at least 10 mol % carbon monoxide.

In some embodiments, the chemically reducing is conducted in a metal ore furnace. In some embodiments, the chemically reducing is conducted upstream of a metal ore furnace. In some embodiments, the chemically reducing utilizes internal heat produced by combustion or partial oxidation of the carbon. In some embodiments, the chemically reducing utilizes external heat separately produced by combustion or partial oxidation of the carbon.

In some embodiments, the process is co-located at a metal ore mine. In some embodiments, the process is co-located at a metal ore processing plant. In some embodiments, the pyrolyzing and the chemically reducing are conducted at the same site.

Disclosed herein are processes for reducing a metal ore. Such processes as disclosed herein can comprise:

providing a biomass feedstock;

pyrolyzing the biomass feedstock, thereby generating a biogenic reagent and a pyrolysis off-gas, wherein the biogenic reagent comprises carbon, wherein the pyrolysis off-gas comprises hydrocarbons;

obtaining a metal ore, wherein the metal ore comprises a metal oxide and the metal ore is in particulate form;

combining the carbon with the metal ore, thereby generating a carbon-metal ore particulate;

partially oxidizing the pyrolysis off-gas, thereby generating a reducing gas and heat; and chemically reducing the metal oxide, wherein the chemically reducing is achieved utilizing the reducing gas generated from the partially oxidizing the pyrolysis off-gas;

wherein the pyrolyzing is achieved using the heat generated from partially oxidizing the pyrolysis off-gas.

In some embodiments, the process further comprises pelletizing the carbon-metal ore particulate, thereby generating a carbon-metal ore pellet. In some embodiments, the metal oxide is comprised within the carbon-metal ore pellet.

In some embodiments, the biomass feedstock is softwood chips, hardwood chips, timber harvesting residues, tree branches, tree stumps, leaves, bark, sawdust, corn, corn stover, wheat, wheat straw, rice, rice straw, sugarcane, sugarcane bagasse, sugarcane straw, energy cane, sugar beets, sugar beet pulp, sunflowers, sorghum, canola, algae, *miscanthus*, alfalfa, switchgrass, fruits, fruit shells, fruit stalks, fruit peels, fruit pits, vegetables, vegetable shells, vegetable stalks, vegetable peels, vegetable pits, grape pumice, almond shells, pecan shells, coconut shells, coffee grounds, food waste, commercial waste, grass pellets, hay pellets, wood pellets, cardboard, paper, paper pulp, paper packaging, paper trimmings, food packaging, construction or demolition waste, lignin, animal manure, municipal solid waste, municipal sewage, or a combination thereof.

In some embodiments, the biogenic reagent comprises at least 50 wt % carbon. In some embodiments, the biogenic reagent comprises at least 75 wt % carbon. In some embodiments, the biogenic reagent comprises at least 90 wt % carbon. In some embodiments, the biogenic reagent comprises at least 50 wt % fixed carbon. In some embodiments, the biogenic reagent comprises at least 75 wt % fixed carbon. In some embodiments, the biogenic reagent comprises at least 90 wt % fixed carbon.

In some embodiments, the metal ore is iron ore, copper ore, nickel ore, magnesium ore, manganese ore, aluminum ore, tin ore, zinc ore, cobalt ore, chromium ore, tungsten ore, molybdenum ore, or a combination thereof. In some embodiments, the metal ore is iron ore. In some embodiments, the iron ore is hematite, magnetite, limonite, taconite, or a combination thereof. In some embodiments, the metal ore is a beneficiated metal ore.

In some embodiments, the particulate form of the metal ore is a powdered form of the metal ore. In some embodiments, the carbon-metal ore particulates are carbon-metal ore fines. In some embodiments, the carbon-metal ore particulates are carbon-metal ore lumps.

In some embodiments, the carbon-metal ore particulates comprise at least about 0.1 wt % to most about 50 wt % carbon. In some embodiments, the carbon-metal ore particulates comprises at least about 1 wt % to at most about 10 wt % carbon.

In some embodiments, the carbon-metal ore pellets comprise an additive. In some embodiments, the additive comprises a binder.

In some embodiments, the carbon-metal ore pellets consist essentially of the carbon and the metal ore.

In some embodiments, the process further comprises obtaining, during the pyrolyzing, heavy hydrocarbons, and wherein the biogenic reagent comprises the heavy hydrocarbons.

In some embodiments, the chemically reducing co-utilizes a reducing gas obtained from gasification, partial oxidation, or steam reforming of light hydrocarbons.

In some embodiments, the process further comprises obtaining, during pyrolysis, the light hydrocarbons, and wherein the pyrolysis off-gas comprises the light hydrocarbons. In some embodiments, the pyrolysis off-gas comprises at least 1 mol % hydrogen. In some embodiments, the pyrolysis off-gas comprises at least 10 mol % hydrogen. In some embodiments, the pyrolysis off-gas comprises at least 1 mol % carbon monoxide. In some embodiments, the pyrolysis off-gas comprises at least 10 mol % carbon monoxide.

In some embodiments, the chemically reducing is conducted in a metal ore furnace. In some embodiments, the chemically reducing is conducted upstream of a metal ore furnace.

In some embodiments, the chemically reducing utilizes internal heat produced by combustion or partial oxidation of the carbon. In some embodiments, the chemically reducing utilizes external heat separately produced by combustion or partial oxidation of the carbon.

In some embodiments, the process is co-located at a metal ore mine. In some embodiments, the process is co-located at a metal ore processing plant. In some embodiments, the pyrolyzing and the chemically reducing are conducted at the same site.

Disclosed herein are additional processes for reducing a metal ore. Such processes comprise:

providing a biomass feedstock;

pyrolyzing the biomass feedstock, thereby generating a biogenic reagent, wherein the biogenic reagent comprises carbon;

obtaining a metal ore, wherein the metal ore comprises a metal oxide and the metal ore is in particulate form;

combining the carbon with the metal ore, thereby generating a carbon-metal ore particulate;

generating a reducing gas from gasification, partial oxidation, or steam reforming of the biogenic reagent; and chemically reducing, using the reducing gas, the metal oxide.

In some embodiments, the process further comprises pelletizing the carbon-metal ore particulate, thereby generating a carbon-metal ore pellet. In some embodiments, the metal oxide is comprised within the carbon-metal ore pellet.

In some embodiments, the biomass feedstock is softwood chips, hardwood chips, timber harvesting residues, tree branches, tree stumps, leaves, bark, sawdust, corn, corn stover, wheat, wheat straw, rice, rice straw, sugarcane, sugarcane bagasse, sugarcane straw, energy cane, sugar beets, sugar beet pulp, sunflowers, sorghum, canola, algae, *miscanthus*, alfalfa, switchgrass, fruits, fruit shells, fruit stalks, fruit peels, fruit pits, vegetables, vegetable shells, vegetable stalks, vegetable peels, vegetable pits, grape pumice, almond shells, pecan shells, coconut shells, coffee grounds, food waste, commercial waste, grass pellets, hay pellets, wood pellets, cardboard, paper, paper pulp, paper packaging, paper trimmings, food packaging, construction or demolition waste, lignin, animal manure, municipal solid waste, municipal sewage, or a combination thereof.

In some embodiments, the biogenic reagent comprises at least 50 wt % carbon. In some embodiments, the biogenic reagent comprises at least 75 wt % carbon. In some embodiments, the biogenic reagent comprises at least 90 wt % carbon. In some embodiments, the biogenic reagent comprises at least 50 wt % fixed carbon. In some embodiments, the biogenic reagent comprises at least 75 wt % fixed carbon. In some embodiments, the biogenic reagent comprises at least 90 wt % fixed carbon.

In some embodiments, the metal ore is iron ore, copper ore, nickel ore, magnesium ore, manganese ore, aluminum ore, tin ore, zinc ore, cobalt ore, chromium ore, tungsten ore, molybdenum ore, or a combination thereof. In some embodiments, the metal ore is iron ore. In some embodiments, the iron ore is hematite, magnetite, limonite, taconite, or a combination thereof. In some embodiments, the metal ore is a beneficiated metal ore. In some embodiments, the particulate form of the metal ore is a powdered form of the metal ore.

In some embodiments, the carbon-metal ore particulate is a carbon-metal ore fine. In some embodiments, the carbon-metal ore particulate is a carbon-metal ore lump.

In some embodiments, the carbon-metal ore particulate comprises at least about 0.1 wt % to at most about 50 wt % carbon. In some embodiments, the carbon-metal ore particulate comprises at least about 1 wt % to at most about 10 wt % carbon.

In some embodiments, the carbon-metal ore pellet comprises an additive. In some embodiments, the additive comprises a binder.

In some embodiments, the carbon-metal ore pellet consists essentially of the carbon and the metal ore.

In some embodiments, the biogenic reagent comprises heavy hydrocarbons obtained during the pyrolyzing. In some embodiments, the chemically reducing co-utilizes a second reducing gas obtained from gasification, partial oxidation, or steam reforming of light hydrocarbons. In some embodiments, the light hydrocarbons are obtained during the pyrolyzing In some embodiments, the reducing gas comprises at least 20 mol % hydrogen. In some embodiments, the reducing gas comprises at least 40 mol % hydrogen. In some embodiments, the reducing gas comprises at least 20 mol % carbon monoxide. In some embodiments, the reducing gas comprises at least 40 mol % carbon monoxide.

In some embodiments, the chemically reducing is conducted in a metal ore furnace. In some embodiments, the chemically reducing is conducted upstream of a metal ore furnace.

In some embodiments, the chemically reducing utilizes internal heat produced by combustion or partial oxidation of the carbon. In some embodiments, the chemically reducing utilizes external heat separately produced by combustion or partial oxidation of the carbon.

In some embodiments, the process is co-located at a metal ore mine. In some embodiments, the process is co-located at a metal ore processing plant. In some embodiments, the pyrolyzing and the chemically reducing are conducted at the same site.

Disclosed herein are processes for treating a metal ore. These processes can comprise:
  providing a biomass feedstock;
  pyrolyzing the biomass feedstock, thereby generating a biogenic reagent and a pyrolysis off-gas, wherein the biogenic reagent comprises carbon, wherein the pyrolysis off-gas comprises hydrogen or carbon monoxide;
  obtaining a metal ore, wherein the metal ore is in particulate form and comprises a metal oxide, metal sulfide, metal hydride, metal nitride, metal carbide, metal boride, metal phosphide, or a combination thereof;
  combining the carbon and the metal ore, thereby generating a carbon-metal ore particulate; and
  chemically producing, an elemental metal from the metal oxide, metal sulfide, metal hydride, metal nitride, metal carbide, metal boride, metal phosphide, or a combination thereof, wherein the chemically producing is achieved using the pyrolysis off-gas.

In some embodiments, the process further comprises pelletizing the carbon-metal ore particulate, thereby generating a carbon-metal ore pellet.

In some embodiments, the biomass feedstock is softwood chips, hardwood chips, timber harvesting residues, tree branches, tree stumps, leaves, bark, sawdust, corn, corn stover, wheat, wheat straw, rice, rice straw, sugarcane, sugarcane bagasse, sugarcane straw, energy cane, sugar beets, sugar beet pulp, sunflowers, sorghum, canola, algae, *miscanthus*, alfalfa, switchgrass, fruits, fruit shells, fruit stalks, fruit peels, fruit pits, vegetables, vegetable shells, vegetable stalks, vegetable peels, vegetable pits, grape pumice, almond shells, pecan shells, coconut shells, coffee grounds, food waste, commercial waste, grass pellets, hay pellets, wood pellets, cardboard, paper, paper pulp, paper packaging, paper trimmings, food packaging, construction or demolition waste, lignin, animal manure, municipal solid waste, municipal sewage, or a combination thereof.

In some embodiments, the biogenic reagent comprises at least 50 wt % carbon. In some embodiments, the biogenic reagent comprises at least 75 wt % carbon. In some embodiments, the biogenic reagent comprises at least 90 wt % carbon. In some embodiments, the biogenic reagent comprises at least 50 wt % fixed carbon. In some embodiments, the biogenic reagent comprises at least 75 wt % fixed carbon. In some embodiments, the biogenic reagent comprises at least 90 wt % fixed carbon.

In some embodiments, the metal ore is iron ore, copper ore, nickel ore, magnesium ore, manganese ore, aluminum ore, tin ore, zinc ore, cobalt ore, chromium ore, tungsten ore, molybdenum ore, or a combination thereof. In some embodiments, the metal ore is iron ore. In some embodiments, the iron ore is hematite, magnetite, limonite, taconite, or a combination thereof. In some embodiments, the metal ore is a beneficiated metal ore.

In some embodiments, the particulate form of the metal ore is a powdered form of the metal ore. In some embodiments, the carbon-metal ore particulate is a carbon-metal ore fine. In some embodiments, the carbon-metal ore particulate is carbon-metal ore lump.

In some embodiments, the carbon-metal ore particulate comprises at least about 0.1 wt % to at most about 50 wt % carbon. In some embodiments, the carbon-metal ore particulate comprises at least about 1 wt % to at most about 10 wt % carbon.

In some embodiments, the carbon-metal ore pellet comprises an additive. In some embodiments, the additive comprises a binder.

In some embodiments, the carbon-metal ore pellet consists essentially of the carbon and the metal ore.

In some embodiments, the chemically producing directly utilizes the pyrolysis off-gas. In some embodiments, the chemically producing indirectly utilizes the pyrolysis off-gas by first partially oxidizing the pyrolysis off-gas, thereby generating a reducing gas, and then utilizing the reducing gas to chemically produce an elemental metal from the metal oxide, metal sulfide, metal hydride, metal nitride, metal carbide, metal boride, metal phosphide, or a combination thereof.

In some embodiments, the chemically producing co-utilizes a reducing gas obtained from gasification, partial oxidation, or steam reforming of the biogenic reagent.

In some embodiments, the biogenic reagent comprises heavy hydrocarbons obtained during the pyrolyzing, and wherein the heavy hydrocarbons are converted to at least some of the reducing gas.

In some embodiments, the chemically producing co-utilizes a reducing gas obtained from gasification, partial oxidation, or steam reforming of light hydrocarbons.

In some embodiments, the light hydrocarbons are obtained during the pyrolysis as a part of the pyrolysis off-gas.

In some embodiments, the pyrolysis off-gas comprises at least 1 mol % hydrogen. In some embodiments, the pyrolysis off-gas comprises at least 10 mol % hydrogen. In some embodiments, the pyrolysis off-gas comprises at least 1 mol % carbon monoxide. In some embodiments, wherein the pyrolysis off-gas comprises at least 10 mol % carbon monoxide.

In some embodiments, the chemically producing is conducted in a metal ore furnace. In some embodiments, the chemically producing is conducted upstream of a metal ore furnace.

In some embodiments, the chemically producing utilizes internal heat produced by combustion or partial oxidation of the carbon. In some embodiments, the chemically producing utilizes external heat separately produced by combustion or partial oxidation of the carbon.

In some embodiments, the process is co-located at a metal ore mine. In some embodiments, the process is co-located at a metal ore processing plant. In some embodiments, the pyrolyzing and the chemically producing are conducted at the same site.

Disclosed herein are methods of optimizing the reduction of a metal oxide. These methods can comprise:
pyrolyzing biomass, thereby generating carbon and a pyrolysis off-gas;
oxidizing the pyrolysis off-gas with oxygen at intentionally less than the combustion-stoichiometric amount of the oxygen, thereby generating heat and carbon monoxide; and
reducing the metal oxide, wherein the reducing is achieved using the heat and the carbon monoxide.

In some embodiments, the oxidizing the pyrolysis off-gas generates hydrogen; and wherein the hydrogen is also utilized to reduce the metal oxide. In some embodiments, the carbon is directly utilized to reduce the metal oxide. In some embodiments, the carbon is indirectly utilized to reduce the metal oxide via conversion of the carbon to additional carbon monoxide, followed by reaction of the additional carbon monoxide with the metal oxide.

Disclosed herein are additional methods of optimizing the reduction of a metal oxide. Such methods can comprise:
pyrolyzing biomass, thereby generating carbon and a pyrolysis off-gas;
oxidizing the pyrolysis off-gas with oxygen at intentionally less than the combustion-stoichiometric amount of the oxygen, thereby generating heat and hydrogen; and
reducing the metal oxide, wherein the reducing is achieved using the heat and the hydrogen.

In some embodiments, the oxidizing the pyrolysis off-gas generates carbon monoxide; and wherein the carbon monoxide is also utilized to reduce the metal oxide. In some embodiments, the carbon is directly utilized to reduce the metal oxide. In some embodiments, the carbon is indirectly utilized to reduce the metal oxide via conversion of the carbon to additional carbon monoxide, followed by reaction of the additional carbon monoxide with the metal oxide.

Disclosed herein are processes for producing carbon-metal ore pellets. The processes disclosed herein can comprise:
providing a biomass feedstock;
pyrolyzing the biomass feedstock, thereby generating a biogenic reagent, wherein the biogenic reagent comprises carbon;
obtaining a metal ore, wherein the metal ore comprises a metal oxide, wherein the metal ore is in particulate form;
combining the carbon with the metal ore, thereby generating a carbon-metal ore particulate; and
pelletizing the carbon-metal ore particulate, thereby generating a carbon-metal ore pellet;
wherein the biogenic reagent comprises at least 50 wt % fixed carbon; and
wherein the carbon-metal ore particulate comprises at least about 0.1 wt % to at most about 50 wt % total carbon.

In some embodiments, the biomass feedstock is selected from softwood chips, hardwood chips, timber harvesting residues, tree branches, tree stumps, leaves, bark, sawdust, corn, corn stover, wheat, wheat straw, rice, rice straw, sugarcane, sugarcane bagasse, sugarcane straw, energy cane, sugar beets, sugar beet pulp, sunflowers, sorghum, canola, algae, *miscanthus*, alfalfa, switchgrass, fruits, fruit shells, fruit stalks, fruit peels, fruit pits, vegetables, vegetable shells, vegetable stalks, vegetable peels, vegetable pits, grape pumice, almond shells, pecan shells, coconut shells, coffee grounds, food waste, commercial waste, grass pellets, hay pellets, wood pellets, cardboard, paper, paper pulp, paper packaging, paper trimmings, food packaging, construction or demolition waste, lignin, animal manure, municipal solid waste, municipal sewage, or a combination thereof.

In some embodiments, the biogenic reagent comprises at least 60 wt % total carbon. In some embodiments, the biogenic reagent comprises at least 75 wt % total carbon. In some embodiments, the biogenic reagent comprises at least 90 wt % total carbon. In some embodiments, wherein the biogenic reagent comprises at least 55 wt % fixed carbon. In some embodiments, wherein the biogenic reagent comprises at least 75 wt % fixed carbon. In some embodiments, the biogenic reagent comprises at least 90 wt % fixed carbon.

In some embodiments, the metal ore is selected from iron ore, copper ore, nickel ore, magnesium ore, manganese ore, aluminum ore, tin ore, zinc ore, cobalt ore, chromium ore, tungsten ore, molybdenum ore, or a combination thereof. In some embodiments, the metal ore is iron ore. In some embodiments, the iron ore is selected from the hematite, magnetite, limonite, taconite, or a combination thereof.

In some embodiments, wherein the metal ore is a beneficiated metal ore.

In some embodiments, the particulate form of the metal ore is a powdered form of the metal ore.

In some embodiments, the carbon-metal ore particulate is a carbon-metal ore fine.

In some embodiments, the carbon-metal ore particulate is a carbon-metal ore lump.

In some embodiments, the carbon-metal ore particulate comprises at least about 0.5 wt % to at most about 25 wt % total carbon. In some embodiments, the carbon-metal ore particulate comprises at least about 1 wt % to at most about 10 wt % total carbon.

In some embodiments, the carbon-metal ore pellet comprises an additive.

In some embodiments, the additive comprises a binder.

In some embodiments, the carbon-metal ore pellet consists essentially of the carbon and the metal ore.

Disclosed herein are processes for producing metal nuggets. The processes disclosed herein can comprise:
providing a biomass feedstock;
pyrolyzing the biomass feedstock, thereby generating a biogenic reagent and a pyrolysis off-gas, wherein the biogenic reagent comprises carbon, wherein the pyrolysis off-gas comprises hydrogen or carbon monoxide;
obtaining a metal ore, wherein the metal ore comprises a metal oxide, wherein the metal ore is in particulate form;
combining the carbon with the metal ore, thereby generating a carbon-metal ore particulate;
pelletizing the carbon-metal ore particulate, thereby generating a carbon-metal ore pellet;
chemically reducing the metal oxide, thereby generating a metal nugget, wherein the chemically reducing is achieved using the pyrolysis off-gas; and
recovering the metal nugget, wherein the metal nugget comprises a metal, wherein the metal is a reduced form of the metal oxide.

In some embodiments, the metal nugget consists essentially of the metal and the carbon.

In some embodiments, the biomass feedstock is selected from softwood chips, hardwood chips, timber harvesting residues, tree branches, tree stumps, leaves, bark, sawdust, corn, corn stover, wheat, wheat straw, rice, rice straw, sugarcane, sugarcane bagasse, sugarcane straw, energy cane, sugar beets, sugar beet pulp, sunflowers, sorghum, canola, algae, *miscanthus*, alfalfa, switchgrass, fruits, fruit shells, fruit stalks, fruit peels, fruit pits, vegetables, vegetable shells, vegetable stalks, vegetable peels, vegetable pits, grape pumice, almond shells, pecan shells, coconut shells, coffee grounds, food waste, commercial waste, grass pellets, hay pellets, wood pellets, cardboard, paper, paper pulp, paper packaging, paper trimmings, food packaging, construction or demolition waste, lignin, animal manure, municipal solid waste, municipal sewage, or a combination thereof.

In some embodiments, the biogenic reagent comprises at least 50 wt % carbon. In some embodiments, the biogenic reagent comprises at least 75 wt % carbon. In some embodiments, the biogenic reagent comprises at least 90 wt % carbon. In some embodiments, the biogenic reagent comprises at least 50 wt % fixed carbon. In some embodiments, the biogenic reagent comprises at least 75 wt % fixed carbon. In some embodiments, the biogenic reagent comprises at least 90 wt % fixed carbon.

In some embodiments, the metal ore is selected from iron ore, copper ore, nickel ore, magnesium ore, manganese ore, aluminum ore, tin ore, zinc ore, cobalt ore, chromium ore, tungsten ore, molybdenum ore, or a combination thereof. In some embodiments, the metal ore is iron ore. In some embodiments, the iron ore is selected from hematite, magnetite, limonite, taconite, or a combination thereof. In some embodiments, the metal ore is a beneficiated metal ore.

In some embodiments, the particulate form of the metal ore is a powdered form of the metal ore. In some embodiments, the carbon-metal ore particulate is a carbon-metal ore fine.

In some embodiments, the carbon-metal ore particulate is a carbon-metal ore lump.

In some embodiments, the carbon-metal ore particulate comprises at least about 0.1 wt % to at most about 50 wt % carbon. In some embodiments, the carbon-metal ore particulate comprises at least about 1 wt % to at most about 10 wt % carbon.

In some embodiments, the carbon-metal ore pellet comprises an additive. In some embodiments, the additive comprises a binder.

In some embodiments, the carbon-metal ore pellet consists essentially of the carbon and the metal ore.

In some embodiments, the chemically reducing directly utilizes the pyrolysis off-gas. In some embodiments, the chemically reducing indirectly utilizes the pyrolysis off-gas by first partially oxidizing the pyrolysis off-gas, thereby generating a reducing gas, and then utilizing the reducing gas to chemically reduce the metal oxide within the carbon-metal ore particulate or within the carbon-metal ore pellet.

In some embodiments, the chemically reducing co-utilizes a reducing gas obtained from gasification, partial oxidation, or steam reforming of the biogenic reagent. In some embodiments, the chemically reducing co-utilizes a reducing gas, wherein the biogenic reagent comprises heavy hydrocarbons obtained during the pyrolyzing, and wherein the heavy hydrocarbons are converted to the reducing gas. In some embodiments, the chemically reducing co-utilizes a reducing gas obtained from gasification, partial oxidation, or steam reforming of light hydrocarbons. In some embodiments, the light hydrocarbons are obtained during the pyrolyzing as a portion of the pyrolysis off-gas.

In some embodiments, the pyrolysis off-gas comprises at least 1 mol % hydrogen. In some embodiments, the pyrolysis off-gas comprises at least 10 mol % hydrogen. In some embodiments, the pyrolysis off-gas comprises at least 1 mol % carbon monoxide. In some embodiments, the pyrolysis off-gas comprises at least 10 mol % carbon monoxide.

In some embodiments, the chemically reducing is conducted in a metal ore furnace. In some embodiments, the chemically reducing is conducted upstream of a metal ore furnace.

In some embodiments, the chemically reducing utilizes internal heat produced by combustion or partial oxidation of the carbon. In some embodiments, the chemically reducing utilizes external heat separately produced by combustion or partial oxidation of the carbon.

In some embodiments, the process is co-located at a metal ore mine. In some embodiments, the process is co-located at a metal ore processing plant. In some embodiments, the pyrolyzing and the chemically reducing are conducted at the same site.

Disclosed herein are processes for producing a metal from a metal ore. The processes disclosed herein can comprise:
providing a biomass feedstock;
pyrolyzing the biomass feedstock, thereby generating a biogenic reagent, wherein the biogenic reagent comprises carbon;
obtaining a metal ore, wherein the metal ore comprises a metal oxide, wherein the metal ore is in particulate form;
combining the carbon with the metal ore, thereby generating a carbon-metal ore particulate;
pelletizing the carbon-metal ore particulate, thereby generating a carbon-metal ore pellet;
introducing the carbon-metal ore pellet into a chemical-reduction furnace;
introducing air or oxygen into the chemical-reduction furnace, thereby oxidizing the carbon comprised within the carbon-metal ore particulate, thereby generating heat and carbon monoxide;

chemically reducing the metal oxide within the carbon-metal ore pellets, thereby generating a metal, wherein the chemically reducing is achieved using the carbon monoxide within the chemical-reduction furnace; and recovering the metal.

In some embodiments, the biogenic reagent is co-fed directly into the chemical-reduction furnace.

In some embodiments, the biomass feedstock is selected from softwood chips, hardwood chips, timber harvesting residues, tree branches, tree stumps, leaves, bark, sawdust, corn, corn stover, wheat, wheat straw, rice, rice straw, sugarcane, sugarcane bagasse, sugarcane straw, energy cane, sugar beets, sugar beet pulp, sunflowers, sorghum, canola, algae, miscanthus, alfalfa, switchgrass, fruits, fruit shells, fruit stalks, fruit peels, fruit pits, vegetables, vegetable shells, vegetable stalks, vegetable peels, vegetable pits, grape pumice, almond shells, pecan shells, coconut shells, coffee grounds, food waste, commercial waste, grass pellets, hay pellets, wood pellets, cardboard, paper, paper pulp, paper packaging, paper trimmings, food packaging, construction or demolition waste, lignin, animal manure, municipal solid waste, municipal sewage, or a combination thereof.

In some embodiments, the biogenic reagent comprises at least 50 wt % carbon. In some embodiments, the biogenic reagent comprises at least 75 wt % carbon. In some embodiments, the biogenic reagent comprises at least 90 wt % carbon. In some embodiments, the biogenic reagent comprises at least 50 wt % fixed carbon. In some embodiments, the biogenic reagent comprises at least 75 wt % fixed carbon. In some embodiments, the biogenic reagent comprises at least 90 wt % fixed carbon.

In some embodiments, the metal ore is selected from iron ore, copper ore, nickel ore, magnesium ore, manganese ore, aluminum ore, tin ore, zinc ore, cobalt ore, chromium ore, tungsten ore, molybdenum ore, or a combination thereof. In some embodiments, the metal ore is iron ore. In some embodiments, the iron ore is selected from hematite, magnetite, limonite, taconite, or a combination thereof. In some embodiments, the metal ore is a beneficiated metal ore.

In some embodiments, the particulate form of the metal ore is a powdered form of the metal ore. In some embodiments, the carbon-metal ore particulate is a carbon-metal ore fine.

In some embodiments, the carbon-metal ore particulate is a carbon-metal ore lumps.

In some embodiments, the carbon-metal ore particulate comprises at least about 0.1 wt % to at most about 50 wt % carbon. In some embodiments, the carbon-metal ore particulate comprises at least about 1 wt % to at most about 10 wt % carbon.

In some embodiments, the carbon-metal ore pellet comprises an additive. In some embodiments, the additive comprises a binder.

In some embodiments, the carbon-metal ore pellet consists essentially of the carbon and the metal ore.

In some embodiments, the metal is selected from iron, copper, nickel, magnesium, manganese, aluminum, tin, zinc, cobalt, chromium, tungsten, molybdenum, or a combination thereof.

Disclosed herein are composition for reducing a metal ore. The compositions disclosed herein can comprise a carbon-metal ore particulate, wherein the carbon-metal ore particulate comprises at least about 0.1 wt % to at most about 50 wt % fixed carbon on a moisture-free and ash-free basis; and wherein the fixed carbon is at least about 50% renewable carbon as determined from a measurement of the $^{14}C/^{12}C$ isotopic ratio of the carbon.

In some embodiments, the measurement of the $^{14}C/^{12}C$ isotopic ratio of the fixed carbon utilizes ASTM D6866.

In some embodiments, the metal ore is selected from iron ore, copper ore, nickel ore, magnesium ore, manganese ore, aluminum ore, tin ore, zinc ore, cobalt ore, chromium ore, tungsten ore, molybdenum ore, or a combination thereof. In some embodiments, the metal ore is iron ore. In some embodiments, the metal ore is a combination of copper ore and nickel ore.

In some embodiments, the composition is in the form of objects selected from fines, lumps, pellets, nuggets, or a combination thereof.

In some embodiments, the carbon-metal ore particulate comprises at least about 0.5 wt % to at most about 25 wt % fixed carbon on a moisture-free and ash-free basis. In some embodiments, the carbon-metal ore particulate comprises at least about 1 wt % to at most about 15 wt % fixed carbon on a moisture-free and ash-free basis. In some embodiments, the carbon-metal ore particulate comprises at least about 2 wt % to at most about 10 wt % fixed carbon on a moisture-free and ash-free basis. In some embodiments, the carbon-metal ore particulate comprises at least about 3 wt % to at most about 6 wt % fixed carbon on a moisture-free and ash-free basis.

In some embodiments, the fixed carbon is at least about 90% renewable carbon as determined from measuring the $^{14}C/^{12}C$ isotopic ratio of the carbon. In some embodiments, the fixed carbon is at least about 99% renewable carbon as determined from measuring the $^{14}C/^{12}C$ isotopic ratio of the carbon. In some embodiments, the fixed carbon is about 100% renewable carbon as determined from measuring the $^{14}C/^{12}C$ isotopic ratio of the carbon.

In some embodiments, the carbon-metal ore pellet comprises an additive. In some embodiments, comprises a binder.

In some embodiments, the carbon-metal ore pellet consists essentially of carbon and the metal ore.

In some embodiments, the fixed carbon is characterized by a BET surface area of at least 400 m²/g. In some embodiments, the fixed carbon is characterized by a BET surface area of at least 800 m²/g.

In some embodiments, the fixed carbon is characterized by a mesopore volume of at least 0.5 cm³/g. In some embodiments, the fixed carbon is characterized by a mesopore volume of at least 1 cm³/g.

DETAILED DESCRIPTION

Figure 1:
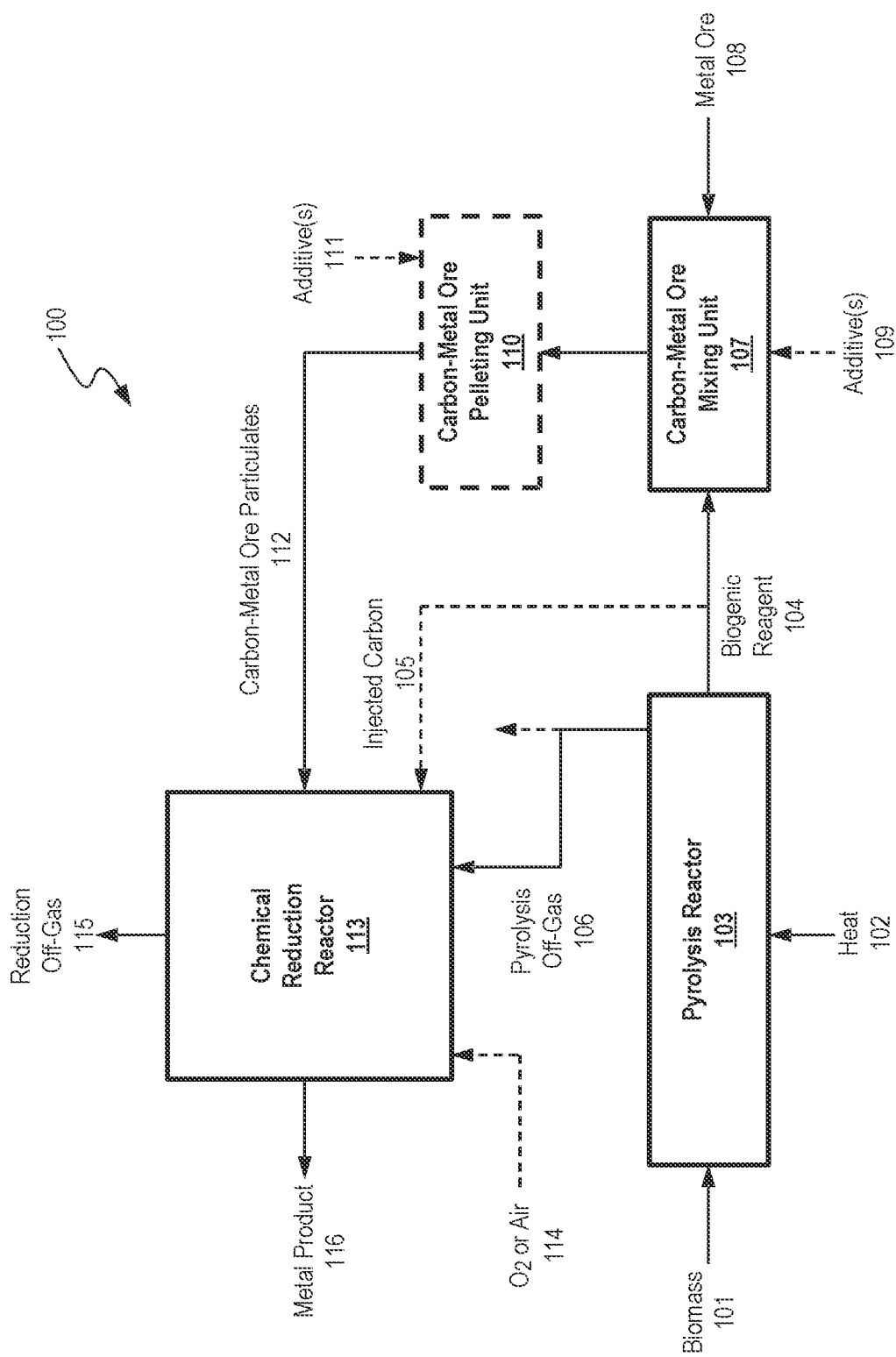
FIG. 1 is a simplified block-flow diagram of a process for converting a metal ore into a metal product utilizing a high-carbon biogenic reagent, in some embodiments.

This description will enable one skilled in the art to make and use the disclosed disclosure, and it describes several embodiments, adaptations, variations, alternatives, and uses of the disclosure. These and other embodiments, features, and advantages of the present disclosure will become more apparent to those skilled in the art when taken with reference to the following detailed description of the disclosure in conjunction with the accompanying drawings.

For purposes of an enabling technical disclosure, various explanations, hypotheses, theories, speculations, assumptions, and so on are disclosed. The present disclosure does not rely on any of these being in fact true. None of the explanations, hypotheses, theories, speculations, or assumptions in this detailed description shall be construed to limit the scope of the disclosure in any way.

Further, headings provided herein are for convenience only and do not interpret the scope or meaning of the claimed embodiments.

Definitions

As used herein, the singular forms "a," "an," and "the" include plural referents unless the context clearly dictates otherwise. For example, anywhere a product is produced, the process can be controlled so as to produce more than a singular product, such as where "a carbon-metal ore particulate," is produced, "a plurality of carbon-metal ore particulates" can be produced. This also applies to compositions comprising a single component. For example, where a composition comprises a carbon-metal ore particulate, the composition can comprise a plurality of carbon-metal ore particulates.

As used herein, the term "about" means ±20% of the indicated range, value, or structure, unless otherwise indicated.

As used herein, any concentration range, percentage range, ratio range, or integer range is to be understood to include the value of any integer within the recited range and, when appropriate, fractions thereof (such as one tenth and one-hundredth of an integer), unless otherwise indicated. Also, any number range recited herein is to be understood to include any integer within the recited range, unless otherwise indicated.

As used herein, "biogenic" is a material (whether a feedstock, product, or intermediate) that contains an element, such as carbon, that is renewable on time scales of months, years, or decades. Non-biogenic materials can be non-renewable, or can be renewable on time scales of centuries, thousands of years, millions of years, or even longer geologic time scales. For example, traditional fuel sources of coal and petroleum are non-renewable and non-biogenic.

There are three naturally occurring isotopes of carbon, $^{12}C$, $^{13}C$, and $^{14}C$. $^{12}C$ and $^{13}C$ are stable, occurring in a natural proportion of approximately 93:1. $^{14}C$ is produced by thermal neutrons from cosmic radiation in the upper atmosphere, and is transported down to earth to be absorbed by living biological material. Isotopically, $^{14}C$ constitutes a negligible part; but, since it is radioactive with a half-life of 5,700 years, it is radiometrically detectable. Dead tissue does not absorb $^{14}C$, so the amount of $^{14}C$ is one of the methods used for radiometric dating of biological material.

Plants take up $^{14}C$ by fixing atmospheric carbon through photosynthesis. Animals then take $^{14}C$ into their bodies when they consume plants or consume other animals that consume plants. Accordingly, living plants and animals have the same ratio of $^{14}C$ to $^{12}C$ as the atmospheric $CO_2$. Once an organism dies, it stops exchanging carbon with the atmosphere, and thus no longer takes up new $^{14}C$. Radioactive decay then gradually depletes the $^{14}C$ in the organism. This effect is the basis of radiocarbon dating.

Fossil fuels, such as coal, are made primarily of plant material that was deposited millions of years ago. This period of time equates to thousands of half-lives of $^{14}C$, so essentially all of the $^{14}C$ in fossil fuels has decayed. Fossil fuels also are depleted in $^{13}C$ relative to the atmosphere, because they were originally formed from living organisms. Therefore, the carbon from fossil fuels is depleted in both $^{13}C$ and $^{14}C$ compared to biogenic carbon.

This difference between the carbon isotopes of recently deceased organic matter, such as that from renewable resources, and the carbon isotopes of fossil fuels, such as coal, allows for a determination of the source of carbon in a composition. Specifically, whether the carbon in the composition was derived from a renewable resource or from a fossil fuel; in other words, whether a renewable resource or a fossil fuel was used in the production of the composition.

As used herein, the "combustion-stoichiometric amount of the oxygen" is the amount of oxygen, whether present in air, pure oxygen, or oxygen-enriched air, that completely oxidizes the carbon-comprising or hydrogen-comprising components to $CO_2$ or $H_2O$, respectively, without being in stoichiometric excess. When the pyrolysis off-gas is intentionally oxidized at less than stoichiometric for combustion, the oxygen utilized as a percentage of the combustion-stoichiometric amount of the oxygen can be at least about 10% to at most about 99%, at least about 25% to at most about 90%, or at least about 40% to at most about 80%. In various embodiments, this percentage is about, at least about, or at most about 15%, 20%, 25%, 30%, 35%, 40%, 45%, 50%, 55%, 60%, 65%, 70%, 75%, 80%, 85%, 90%, or 95%. These percentages are on a molar basis with oxygen in $O_2$ form.

As used herein, "comprising," which is synonymous with "including," "containing," or "characterized by," is inclusive or open-ended and does not exclude additional, unrecited elements or method steps. "Comprising" is a term of art used in claim language that indicates the named claim elements are essential, but other claim elements can be added and still form a construct within the scope of the disclosure.

As used herein, "consisting of" excludes any element, step, or ingredient not specified. When the phrase "consists of" appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis of the claimed subject matter.

As used herein, a "derivative" is a compound, molecule, or ion that is derived from another substance by a chemical reaction. The substance from which the derivative is derived is an additive. A derivative is also an additive.

As used herein, "high-carbon," as in "high-carbon biogenic reagent," indicates the biogenic reagent has high carbon content relative to the feedstock used to produce the high-carbon biogenic reagent. A high-carbon biogenic reagent can comprise at least about half its weight as carbon. For example, a high-carbon biogenic reagent can comprise at least 55, 60, 65, 70, 75, 80, 85, 90, 91, 92, 93, 94, 95, 96, 97, 98, or 99 wt % carbon.

As used herein, "high-carbon biogenic reagent" describes materials that can be produced by the disclosed processes and systems. Limitations as to carbon content, or any other concentrations, shall not be imputed from the term itself but rather only by reference to particular embodiments. For example, where a feedstock that comprises a low carbon content is subjected to the disclosed processes, the product is a high-carbon biogenic reagent that is highly enriched in carbon relative to the starting material (high yield of carbon), but nevertheless relatively low in carbon (low purity of carbon), including less than 50 wt % carbon.

As used herein, the terms "include," "have," and "comprise" are used synonymously, which terms and variants thereof are intended to be construed as non-limiting.

As used herein, "metal ore" is a metal-containing material in which a desired metal is not in pure, elemental form, but rather is present as a metal oxide, a metal sulfide, a metal nitride, a metal carbide, a metal boride, a metal phosphide, or another form of a metal.

Use of the word "or" in reference to a list of two or more items covers all of the following interpretations of the word: any of the items in the list, all of the items in the list, and any combination of the items in the list. Furthermore, the phrase "at least one of A, B, and C, etc." is intended in the sense that one having skill in the art would understand the convention (e.g., "a system having at least one of A, B, and C" would include, but not be limited to, systems that have A alone, B alone, C alone, A and B together, A and C together, B and C together, or A, B, and C together, etc.). In those instances where a convention analogous to "at least one of A, B, or C, etc." is used, in general, such a construction is intended in the sense that one having skill in the art would understand the convention (e.g., "a system having at least one of A, B, or C" would include, but not be limited to, systems that have A alone, B alone, C alone, A and B together, A and C together, B and C together, or A, B, and C together, etc.).

As used herein, "pellet" is synonymous with "briquette" and reference can be made to pellet, briquette, pellet/briquette, or similar terms, all being references to an agglomerated object rather than a loose powder. For convenience, the term "pellet" will generally be used. The pellet geometry is not limited to spherical or approximately spherical. The pellet geometry can be spherical (round or ball shape), cube (square), octagon, hexagon, honeycomb/beehive shape, oval shape, egg shape, column shape, bar shape, bread shape, pillow shape, random, or a combination thereof.

As used herein, "pyrolysis" is the thermal decomposition of a carbonaceous material. In pyrolysis, less oxygen is present than is required for complete combustion of the material, such as less than 10%, 5%, 1%, 0.5%, 0.1%, or 0.01% of the oxygen ($O_2$ molar basis) that is required for complete combustion. In some embodiments, pyrolysis is performed in the absence of oxygen.

As used herein, "reagent" is a material in its broadest sense. For example, a reagent can be a fuel, a chemical, a material, a compound, an additive, a blend component, or a solvent. A reagent is not necessarily a chemical reagent that causes or participates in a chemical reaction. However, a reagent can be a chemical reactant that can be consumed in a reaction. A reagent can be a chemical catalyst for a particular reaction. A reagent can cause or participate in adjusting a mechanical, physical, or hydrodynamic property of a material to which the reagent can be added. For example, a reagent can be introduced to a metal to impart certain strength properties to the metal. A reagent can be a substance of sufficient purity (which, in the current context, is typically carbon purity) for use in chemical analysis or physical testing.

As used herein, "total carbon" is fixed carbon plus non-fixed carbon that is present in volatile matter. In some embodiments, component weight percentages are on an absolute basis, which is assumed unless stated otherwise. In other embodiments, component weight percentages are on a moisture-free and ash-free basis.

As used herein, "zones" are regions of space within a single physical unit, physically separate units, or any combination thereof. For a continuous reactor, the demarcation of zones can relate to structure, such as the presence of flights within the reactor or distinct heating elements to provide heat to separate zones. Alternatively, or additionally, the demarcation of zones in a continuous reactor can relate to function, such as distinct temperatures, fluid flow patterns, solid flow patterns, or extent of reaction. In a single batch reactor, "zones" are operating regimes in time, rather than in space. There are not necessarily abrupt transitions from one zone to another zone. For example, the boundary between the preheating zone and pyrolysis zone can be somewhat arbitrary; some amount of pyrolysis can take place in a portion of the preheating zone, and some amount of "preheating" can continue to take place in the pyrolysis zone. The temperature profile in the reactor is typically continuous, including at zone boundaries within the reactor.

Processes

The principles of the present disclosure are especially suitable for co-location of a pyrolysis process at a metal mining or a metal ore processing facility. The technology herein reduces the need for fossil fuels in induration and coking, as well as the need for intermediate transport of the pellets to a blast furnace. An integrated process has economic and environmental advantages to the current processes used to convert iron ores to iron, including but not limited to taconite processing.

The processes disclosed herein are environmentally friendly technologies with reduced carbon footprint. When the starting feedstock is biomass, which contains biogenic or renewable carbon, the carbon produced from pyrolysis is biogenic. This can be shown from a measurement of the $^{14}C/^{12}C$ isotopic ratio of the carbon, using for example ASTM D6866.

In some embodiments, all carbon processed is renewable. In other embodiments, less than all carbon is renewable, since the starting metal oxide can comprise carbon. For example, taconite contains iron-bearing carbonates that contain non-biogenic carbon. Beneficiation, if employed, can remove non-biogenic carbon from metal ores.

Any biogenic carbon that is oxidized to carbon dioxide creates biogenic $CO_2$. This also can be shown from a measurement of the $^{14}C/^{12}C$ isotopic ratio of the carbon in a sample of the generated $CO_2$. This biogenic $CO_2$, which is derived from biomass, returns to the environment to be taken up again by growing biomass via photosynthesis. In this way, net $CO_2$ emissions are significantly reduced. In addition, the hydrogen content of the starting biomass substantially reduces the net $CO_2$ emissions of the process. This is due to the hydrogen in the biomass becoming $H_2$ in the pyrolysis off-gas or a partially oxidized form thereof. $H_2$ is capable of causing chemical reduction of metal oxides in much the same way as caused by CO, but rather than creating $CO_2$, $H_2$ oxidation creates $H_2O$, which is not considered a problematic greenhouse gas.

Another reason that the disclosed processes are environmentally superior to conventional technologies relates to the energy balance. Metal oxide reduction inherently requires energy because the overall chemical reaction is endothermic. Even the known approach of electrochemical conversion to split a metal oxide into the metal and oxygen, thereby avoiding any direct $CO_2$ production, requires large amounts of electricity that in turn is made usually from non-renewable sources. Conventional metal ore processing utilizes large amounts of coal to create the necessary heat (from coal combustion) as well as to provide carbon for the reduction chemistry. Some embodiments, by contrast, provide the necessary heat from pyrolysis off-gas, in an integrated bio-reduction process that utilizes carbon and hydrogen in an energy-efficient manner. Pollution from coal burning is thereby avoided.

Integrated bio-reduction of metal ores greatly reduces the environmental impacts, compared to the traditional use of fossil fuels such as coal. Conventional approaches are associated with a "carbon intensity" which is the net quantity of carbon dioxide generated per ton of metal ore processed. A "$CO_2$-equivalent carbon intensity" can also be defined, as the net quantity of carbon dioxide equivalent generated per ton of metal ore processed. The "carbon dioxide equivalent" or "$CO_2e$" signifies the amount of $CO_2$ which would have the equivalent global-warming impact. As an example, for iron ore processing, the average is 11.9 kg $CO_2$/ton (Tost et al., "Metal Mining's Environmental Pressures: A Review and Updated Estimates on $CO_2$ Emissions, Water Use, and Land Requirements", *Sustainability* 2018, 10, 2881, which is incorporated by reference). In various embodiments, the processes disclosed herein can be characterized by a reduction in the carbon intensity or $CO_2$-equivalent carbon intensity, compared to the prior art, about 50%, 60%, 70%, 80%, 90%, 95%, or 99%. In various embodiments, the processes disclosed herein can be characterized by a carbon intensity, or $CO_2$-equivalent carbon intensity, of about 10, 9, 8, 7, 6, 5, 4, 3, 2, 1, 0.5, 0.4, 0.3, 0.2, or 0.1 kg $CO_2$/ton, or less. In the processes and methods disclosed herein, most or all of the $CO_2$ generated is biogenic carbon dioxide, such that the effective carbon intensity is very low, zero, or even negative if there is a net sequestering of carbon in final products such as carbon steel.

The present inventors have surprisingly found that oxygen can be intentionally limited in combustion of pyrolysis off-gas, thereby generating more CO (as opposed to $CO_2$, as in complete combustion), which CO can then be used as a reducing agent. The generation of CO from partial oxidation provides some heat, but less heat as compared to conventional complete oxidation to $CO_2$. Various embodiments utilize the finding that the heat generated can be sufficient for carrying out the endothermic reduction of metal oxides, wherein the reduction chemically utilizes the CO produced from partial oxidation.

Based on the above, some variations provide a method of optimizing the reduction of a metal oxide, the method comprising pyrolyzing biomass to obtain carbon and a pyrolysis off-gas; oxidizing the pyrolysis off-gas with oxygen at intentionally less than the combustion-stoichiometric amount of the oxygen, thereby generating heat, carbon monoxide, and carbon dioxide; and utilizing the heat and the carbon monoxide to reduce the metal oxide. Typically, oxidizing the pyrolysis off-gas further generates hydrogen and water. The hydrogen can also be utilized to reduce the metal oxide.

In some embodiments, the carbon can be directly utilized to reduce the metal oxide, such as by reaction of the metal oxide with carbon to generate the metal (or a less-reduced form of the metal) and carbon monoxide or carbon dioxide. Alternatively, or additionally, the carbon can be indirectly utilized to reduce the metal oxide via conversion of the carbon to additional carbon monoxide, followed by reaction of the additional carbon monoxide with the metal oxide.

Some embodiments are predicated on a process to pyrolyze wood into biocarbon; mix the biocarbon as a reductant with powdered iron ores (or other metal ores) after beneficiation into pellets; and use of the off-gas from pyrolysis, which is high in hydrogen and CO, to reduce the pellets to elemental iron. High temperatures and medium residence times for pyrolysis of biomass (as described herein) results in a high-fixed carbon product suitable for blending with the pellets, and results in a gas stream with large volumes of CO and $H_2$. Some embodiments divert gases from the burners that create heat for pyrolysis to convert methane and other hydrocarbons into gas with more CO and $H_2$ for reduction reactions.

Some embodiments are premised on the production of pellets/briquettes comprising a metal oxide and biogenic carbon. These pellets/briquettes can be processed in a pyrolysis off-gas to remove oxygen from the metal oxide, within a metal ore furnace or upstream of a metal ore furnace.

Disclosed herein are processes for reducing a metal ore. FIG. 1 provides an exemplary illustration of such processes. The processes can comprise:
providing a biomass feedstock;
pyrolyzing the biomass feedstock, thereby generating a biogenic reagent and a pyrolysis off-gas, wherein the biogenic reagent comprises carbon, wherein the pyrolysis off-gas comprises hydrogen or carbon monoxide;
obtaining a metal ore, wherein the metal ore comprises a metal oxide and the metal ore is in particulate form;
combining the carbon with the metal ore, thereby generating a carbon-metal ore particulate; and
chemically reducing the metal oxide, wherein the chemically reducing is achieved using the pyrolysis off-gas.

FIG. 1 illustrates process 100 for reducing metal ore 108 utilizing biogenic reagent 104. Biomass feedstock 101 is fed into pyrolysis reactor 103. Biomass feedstock 101 is pyrolyzed in the presence of heat 102 and under conditions detailed further herein below. Pyrolysis of biomass feedstock 101 generates biogenic reagent 104 and pyrolysis off-gas 106. Biogenic reagent 104, comprising carbon, and metal ore 108 are fed into carbon-metal ore mixing unit 107 to produce carbon-metal ore particulates 112. Additive 109 can be added to carbon-metal ore mixing unit 107 to be combined with biogenic reagent 104 and metal ore 108. Where a pellet is to be utilized, the product of carbon-metal ore mixing unit 107 can be introduced to carbon-metal ore pelleting unit 110, thereby generating carbon-metal ore pellets. Additive 111 can be added to carbon-metal ore pelleting unit 110 to be incorporated into the carbon-metal ore pellet. Carbon-metal ore particulates 112, which can be in the form of a pellet, where a pellet has been produced using carbon-metal ore pelleting unit 110, and pyrolysis off-gas 106, from pyrolysis reactor 103, are introduced to chemical reduction reactor 113. In chemical reduction reactor 113, metal oxide, which is present in metal ore 108 of carbon-metal ore particulates 112, is reduced. Biogenic reagent 104 can be introduced as injected carbon 105 to chemical reduction reactor 113. $O_2$ or air 114 can also be introduced into chemical reduction reactor 113. The chemical reduction reaction in chemical reduction reactor 113 produces metal product 116 and reduction off-gas 115.

Figure 2:
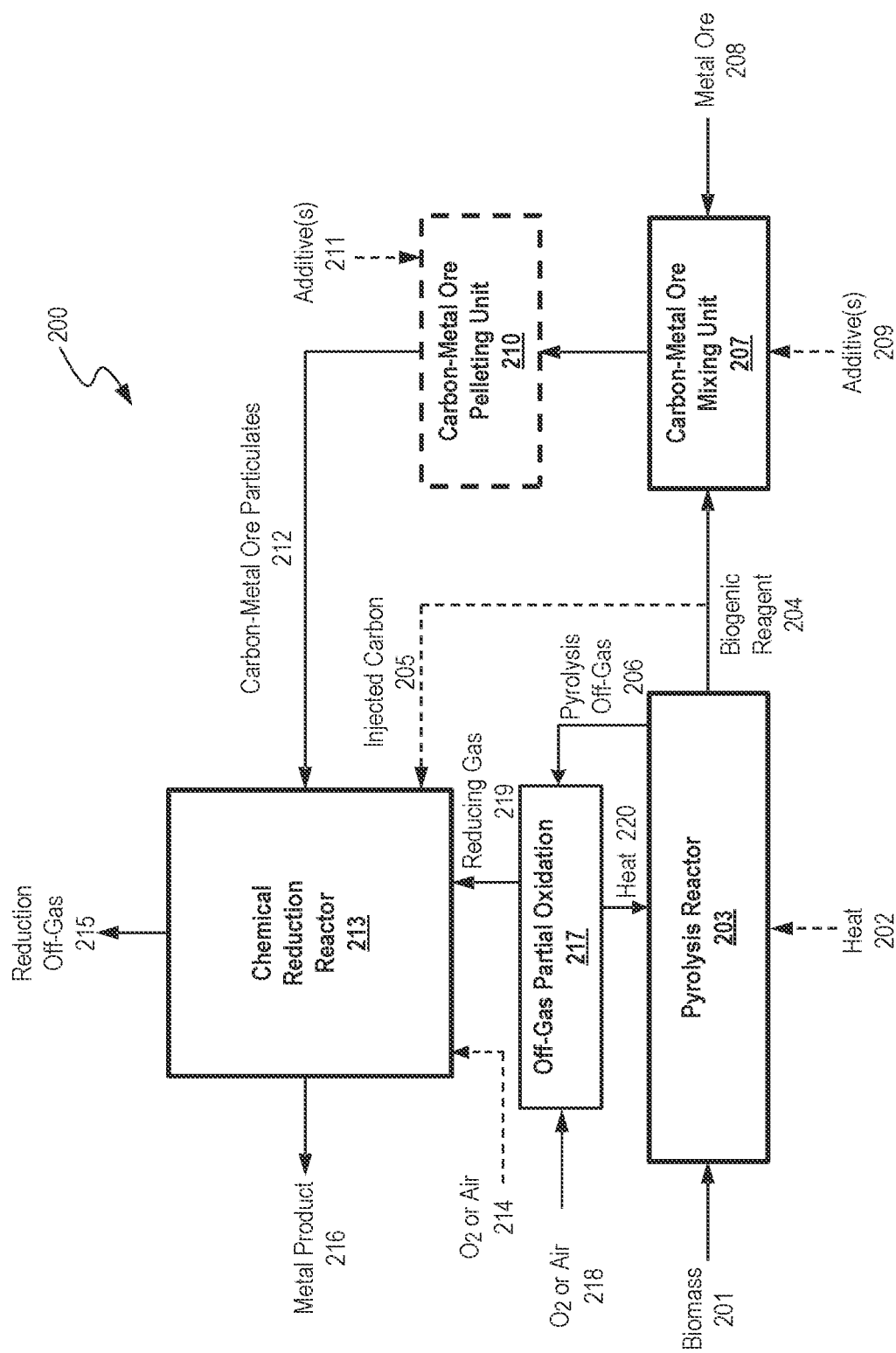
FIG. 2 is a simplified block-flow diagram of a process for converting a metal ore into a metal product utilizing a high-carbon biogenic reagent, in some embodiments.

Disclosed herein are additional processes for reducing a metal ore. FIG. 2 provides an exemplary illustration of such processes. The processes can comprise:

providing a biomass feedstock;

pyrolyzing the biomass feedstock, thereby generating a biogenic reagent and a pyrolysis off-gas, wherein the biogenic reagent comprises carbon, wherein the pyrolysis off-gas comprises hydrocarbons;

obtaining a metal ore, wherein the metal ore comprises a metal oxide and the metal ore is in particulate form;

combining the carbon with the metal ore, thereby generating a carbon-metal ore particulate;

partially oxidizing the pyrolysis off-gas, thereby generating a reducing gas and heat; and chemically reducing the metal oxide, wherein the chemically reducing is achieved using the reducing gas generated from the partially oxidizing the pyrolysis off-gas;

wherein the pyrolyzing is achieved using the heat generated from partially oxidizing the pyrolysis off-gas.

FIG. 2 illustrates process 200 for reducing metal ore 208 utilizing biogenic reagent 204. Biomass feedstock 201 is fed into pyrolysis reactor 203. Biomass feedstock 201 is pyrolyzed in the presence of heat 202 and under conditions detailed further herein below. Pyrolysis of biomass feedstock 201 generates biogenic reagent 204 and pyrolysis off-gas 206. Biogenic reagent 204, comprising carbon, and metal ore 208 are fed into carbon-metal ore mixing unit 207 to produce carbon-metal ore particulates 212. Additive 209 can be added to carbon-metal ore mixing unit 207 to be combined with biogenic reagent 204 and metal ore 208. Where a pellet is to be utilized, the product of carbon-metal ore mixing unit 207 can be introduced to carbon-metal ore pelleting unit 210, thereby generating carbon-metal ore pellets, such that carbon-metal ore particulates 212 that are introduced to chemical reduction reactor 213 are in the form of pellets. Additive 211 can be added to carbon-metal pelleting unit 210 to be incorporated into the carbon-metal ore pellet. Carbon-metal ore particulates 212 are introduced to chemical reduction reactor 213. Pyrolysis off-gas 206, from pyrolysis reactor 203, undergoes partial oxidation 217, during which $O_2$ or air 218 is introduced. Heat 220 from off-gas partial oxidation is introduced for pyrolysis in pyrolysis reactor 203. The product reducing gas 219 from off-gas partial oxidation 217 is introduced to chemical reduction reactor 213; $O_2$ or air 214 can also be introduced to chemical reduction reactor 213. Biogenic reagent 204 can bypass carbon-metal mixing unit 207 and be introduced as injected carbon 205 to chemical reduction reactor 213. $O_2$ or air 214 can also be introduced into chemical reduction reactor 213. The chemical reduction in chemical reduction reactor 213 produces metal product 216 and reduction off-gas 215.

Chemical reduction can co-utilize a reducing gas obtained from gasification, steam reforming, or partial oxidation 217 of light hydrocarbons. Chemical reduction occurs in chemical reduction reactor 213 and can be conducted in a metal ore furnace, such as a blast furnace, a direct reduced metal furnace, open-hearth furnace, or another type of furnace. Alternatively, or additionally, chemical reduction can be conducted upstream of a metal ore furnace. In some embodiments, chemical reduction utilizes internal heat produced by combustion or partial oxidation 217 of injected carbon 205. In such embodiments, chemical reduction utilizes external heat separately produced by combustion or partial oxidation 217 of injected carbon 205.

The process can be co-located at a metal ore mine, at a metal ore processing plant, or at a metal mine that is itself co-located with a metal ore processing plant.

Figure 3:
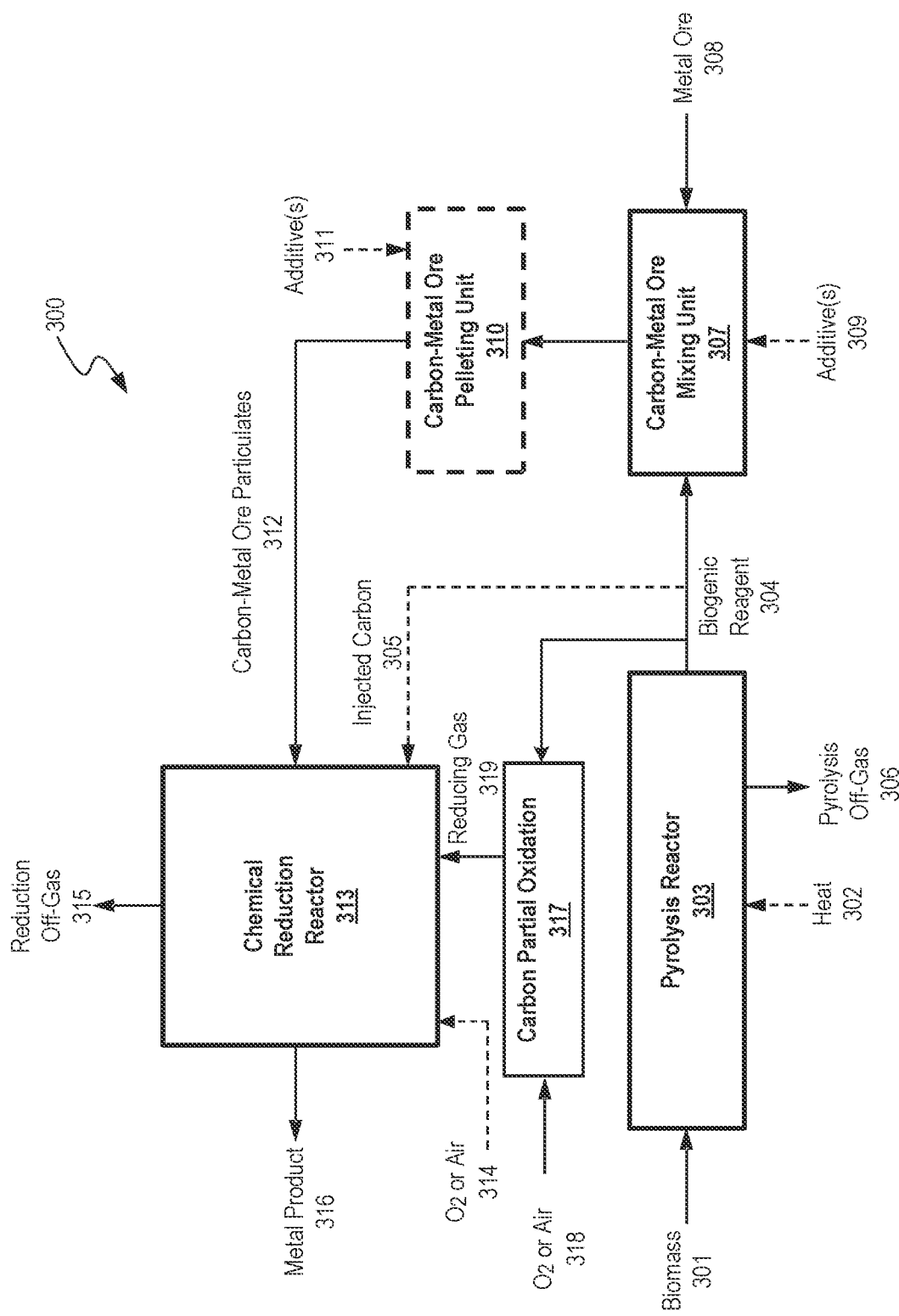
FIG. 3 is a simplified block-flow diagram of a process for converting a metal ore into a metal product utilizing a high-carbon biogenic reagent, in some embodiments.

Disclosed herein are further processes for reducing a metal ore. FIG. 3 provides an exemplary illustration of such processes. The processes can comprise:

providing a biomass feedstock;

pyrolyzing the biomass feedstock, thereby generating a biogenic reagent, wherein the biogenic reagent comprises carbon;

obtaining a metal ore, wherein the metal ore comprises a metal oxide, wherein the metal ore is in particulate form;

combining the carbon with the metal ore, thereby generating a carbon-metal ore particulate;

generating a reducing gas from gasification, partial oxidation, or steam reforming of the biogenic reagent; and chemically reducing the metal oxide, wherein the chemically reducing is achieved using the reducing gas.

FIG. 3 provides for illustration of process 300 for reducing metal ore 308 utilizing biogenic reagent 304. Biomass feedstock 301 is introduced to pyrolysis reactor 303, where pyrolysis, with optional external heat 302, produces pyrolysis off-gas 306 and biogenic reagent 304. Biogenic reagent 304, comprising carbon, and metal ore 308 are fed to carbon-metal ore mixing unit 307 to produce carbon-metal ore particulates 312. Additive 309 can be added to carbon-metal ore mixing unit 307 to be incorporated with biogenic reagent 304 and metal ore 308. Where a pellet is to be utilized, the product of carbon-metal ore mixing unit 307 can be introduced into carbon-metal ore pelletizing unit 310, such that carbon-metal ore particulates 312 that are introduced to the chemical reduction reactor 313 are in the form of pellets. Additive 311 can also be introduced to carbon-metal ore pelletizing unit to be incorporated into the pellet product. Carbon-metal ore particulates 312 and reducing gas 319 are fed into chemical reduction reactor 313, from which metal product 316 and reduction off-gas 315 are produced. $O_2$ or air 314 can also be introduced to chemical reduction reactor 313.

Chemical reduction in chemical reduction reactor 313 can co-utilize a second reducing gas obtained from gasification, steam reforming, or partial oxidation 317 of light hydrocarbons, such as light hydrocarbons present in the biogenic reagent 304 obtained during pyrolysis in pyrolysis reactor 303. Biogenic reagent 304 from pyrolysis reactor 303 takes part in carbon partial oxidation 317 with the introduction of $O_2$ or air 318. Reducing gas 319 is introduced into chemical reduction reactor 313. Biogenic reagent 304 can bypass carbon-metal ore mixing unit 307 to be introduced as injected carbon 305 to chemical reduction reactor 313.

Chemical reduction occurs in chemical reduction reactor 213 and can be conducted in a metal ore furnace, such as a blast furnace, a direct reduced metal furnace, open-hearth furnace, or another type of furnace. Alternatively, or additionally, chemically reducing can be conducted upstream of a metal ore furnace.

The process can be co-located at a metal ore mine, at a metal ore processing plant, or at a metal mine that is itself co-located with a metal ore processing plant.

Disclosed herein are processes for treating a metal ore. The processes can comprise:

providing a biomass feedstock;

pyrolyzing the biomass feedstock, thereby generating a biogenic reagent and a pyrolysis off-gas, wherein the biogenic reagent comprises carbon, where in the pyrolysis off-gas comprises hydrogen or carbon monoxide;

obtaining a metal ore, wherein the metal ore is in particulate form, wherein the metal ore comprises a metal oxide, metal sulfide, metal hydride, metal nitride, metal carbide, metal boride, metal phosphide, or a combination thereof;

combining the carbon with the metal ore, thereby generating a carbon-metal ore particulate; and chemically producing an elemental metal from the metal oxide, metal sulfide, metal hydride, metal nitride, metal carbide, metal boride, metal phosphide, or the combination thereof, wherein the chemically producing is achieved using the pyrolysis off-gas.

The processes can further comprise pelletizing the carbon-metal ore particulate, thereby generating a carbon-metal ore pellet.

The chemical reduction can directly utilize the pyrolysis off-gas. The chemical reduction can indirectly utilize the pyrolysis off-gas by first partially oxidizing the pyrolysis off-gas, thereby generating a reducing gas, and then utilizing the reducing gas to chemically produce an elemental metal from the metal oxide, metal sulfide, metal hydride, metal nitride, metal carbide, metal boride, metal phosphide, or a combination thereof.

When metal-containing species other than metal oxides are to be converted to metals, or to other metal-containing species, process conditions of temperature, pressure, reaction time, and composition of reactants will need to be designed to accomplish the desired chemistry. For example, in the case of metal hydrides, conversion to the corresponding metal plus carbon dioxide, water, or methane can be achieved. Typically, any metal ore has at least metal oxide, and process conditions that target reduction of metal oxide can be effective to convert other forms of metal. Alternatively, or additionally, when a metal ore contains significant quantities of other forms of metal, such as metal sulfides, an additional reaction step can be employed. One skilled in the art will be able to estimate, using routine experimentation, reaction conditions using the teachings of the present disclosure.

In some embodiments, chemical reduction co-utilizes a reducing gas obtained from gasification, partial oxidation, or steam reforming of the biogenic reagent or a portion thereof. For example, heavy hydrocarbons obtained during pyrolysis can be converted to at least some of the reducing gas.

Chemical reduction can co-utilize a reducing gas obtained from gasification, partial oxidation, or steam reforming of light hydrocarbons, such as light hydrocarbons obtained during the pyrolyzing as a part of the pyrolysis off-gas.

Chemical reduction can be conducted in a metal ore furnace, such as a blast furnace, a direct reduced metal furnace, open-hearth furnace, or another type of furnace. Alternatively, or additionally, the chemical reduction can be conducted upstream of a metal ore furnace.

The process can be co-located at a metal ore mine, at a metal ore processing plant, or at a metal mine that is itself co-located with a metal ore processing plant.

Figure 4:
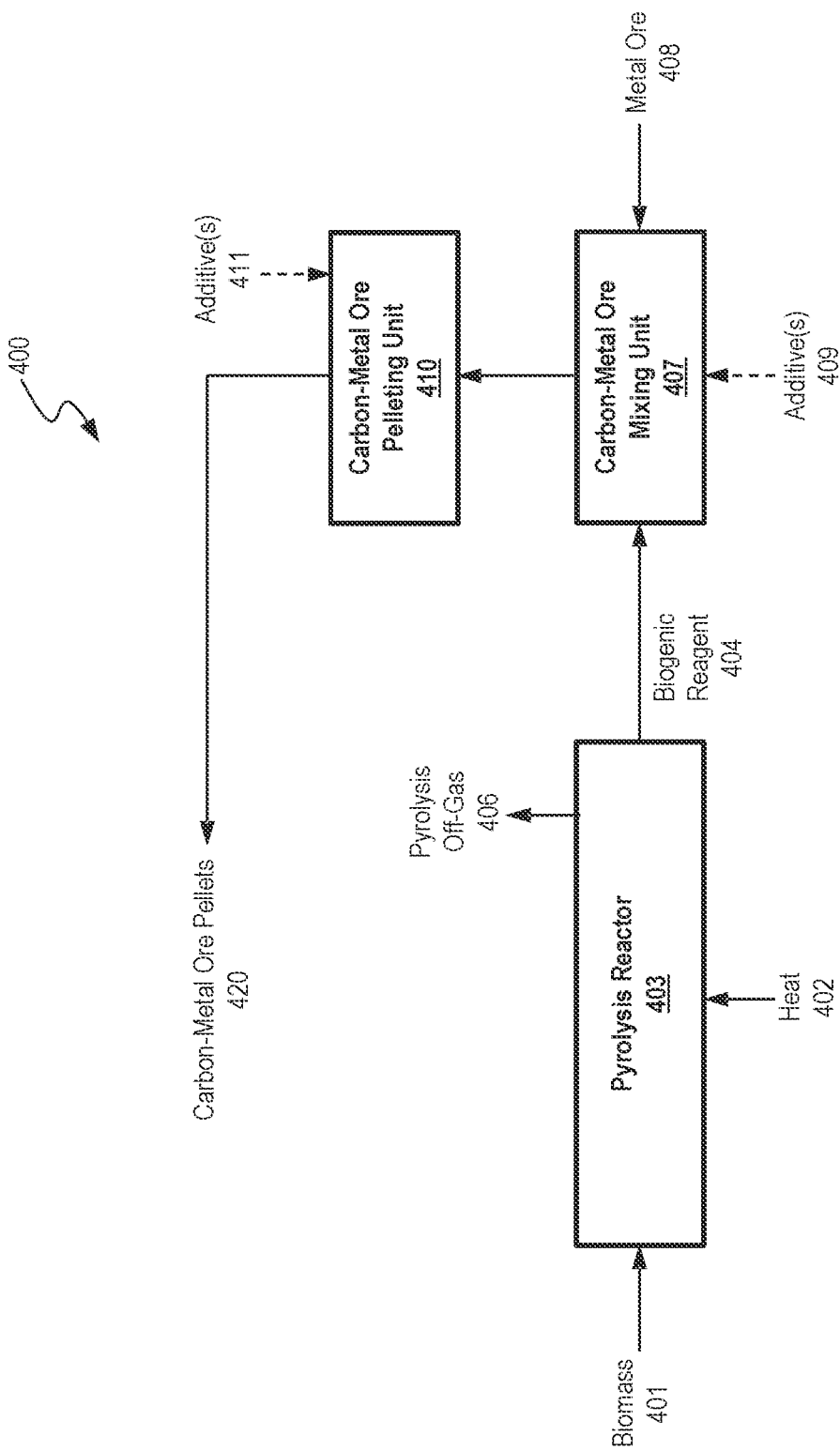
FIG. 4 is a simplified block-flow diagram of a process for producing carbon-metal ore pellets utilizing a high-carbon biogenic reagent, in some embodiments.

Disclosed herein are processes for producing carbon-metal ore pellets. FIG. 4 provides an exemplary illustration of such processes. The processes can comprise:

providing a biomass feedstock;

pyrolyzing the biomass feedstock, thereby generating a biogenic reagent, wherein the biogenic reagent comprises carbon;

obtaining a metal ore, wherein the metal ore comprises a metal oxide, wherein the metal ore is in particulate form;

combining the carbon with the metal ore, thereby generating a carbon-metal ore particulate; and pelletizing the carbon-metal ore particulates, thereby generating a carbon-metal ore pellet.

FIG. 4 provides for illustration of process 400 for producing carbon-metal ore pellets 420 utilizing biogenic reagent 404. Biomass feedstock 401 is introduced to pyrolysis reactor 403, where pyrolysis, with external heat 402, produces pyrolysis off-gas 406 and biogenic reagent 404. Biogenic reagent 404, comprising carbon, and metal ore 408 are fed to carbon-metal ore mixing unit 407 to produce carbon-metal ore particulates. Additive 409 can be added to carbon-metal ore mixing unit 407 to be incorporated with biogenic reagent 404 and metal ore 408. The carbon-metal ore particulates produced by carbon-metal ore mixing unit 407 are introduced into carbon-metal ore pelleting unit 410. From carbon-metal ore pelleting unit 410 are produced Carbon-metal ore pellets 420. Additive 411 can also be introduced to carbon-metal ore pelleting unit to be incorporated into carbon-metal ore pellets 420.

Disclosed herein are additional processes for producing carbon-metal ore pellets. The processes can comprise:

providing a biomass feedstock;

pyrolyzing the biomass feedstock, thereby generating a biogenic reagent, wherein the biogenic reagent comprises carbon;

obtaining a metal ore, wherein the metal ore comprises a metal oxide, wherein the metal ore is in particulate form;

combining the carbon with the metal ore, thereby generating a carbon-metal ore particulate; and pelletizing the carbon-metal ore particulate, thereby generating a carbon-metal ore pellet;

wherein the biogenic reagent comprises at least about 50 wt % fixed carbon; and wherein the carbon-metal ore particulate comprises at least about 0.1 wt % to at most about 50 wt % total carbon.

Figure 5:
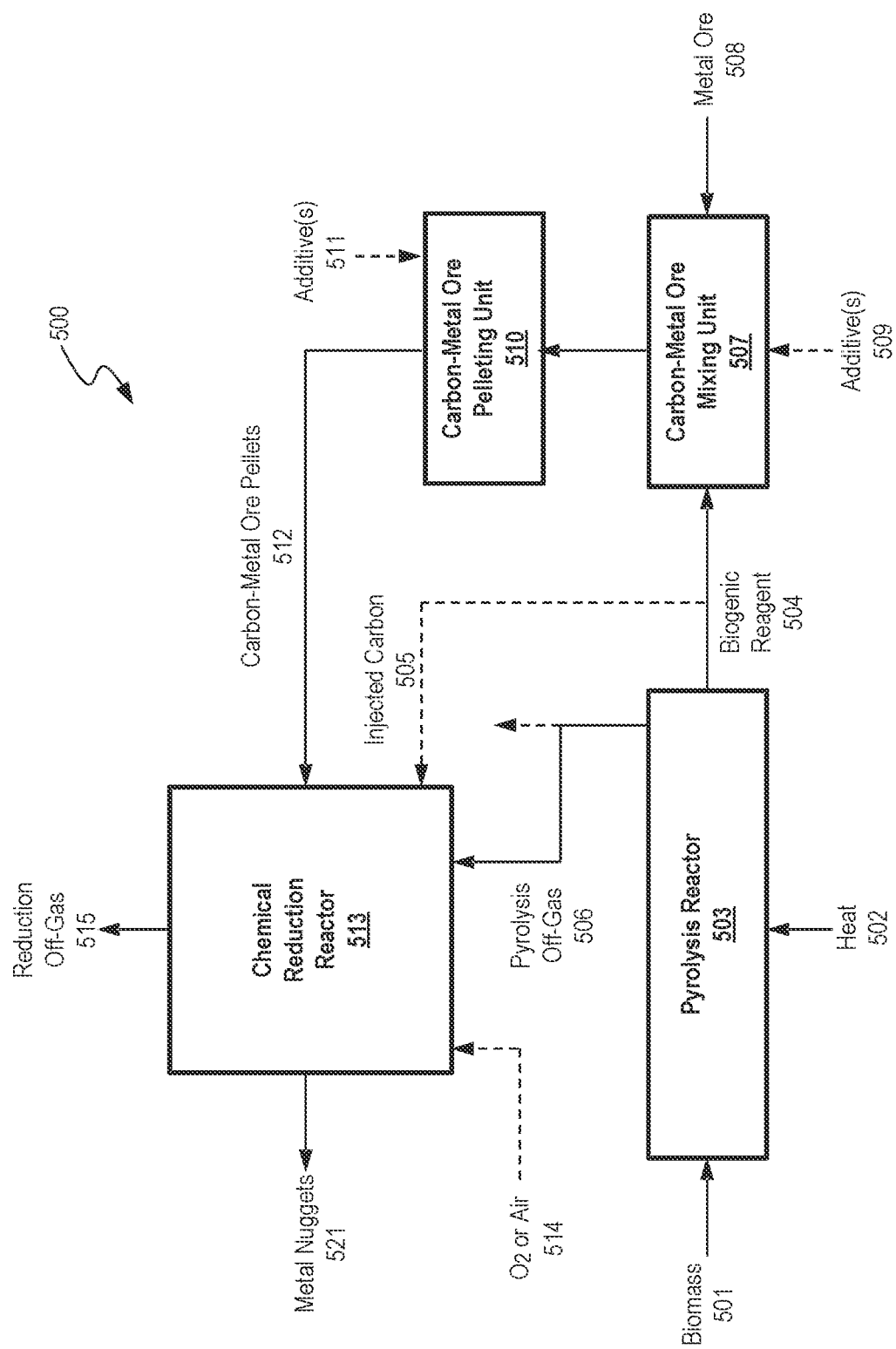
FIG. 5 a simplified block-flow diagram of a process for producing metal nuggets utilizing a high-carbon biogenic reagent, in some embodiments.

Disclosed herein are processes for producing metal nuggets. FIG. 5 provides an exemplary illustration of such processes. The processes can comprise:

providing a biomass feedstock;

pyrolyzing the biomass feedstock, thereby generating a biogenic reagent and pyrolysis off-gas, wherein the biogenic reagent comprises carbon, wherein the pyrolysis off-gas comprises hydrogen or carbon monoxide;

obtaining a metal ore, wherein the metal ore comprises a metal oxide, wherein the metal ore is in particulate form;

combining the carbon with the metal ore, thereby generating a carbon-metal ore particulate;

pelletizing the carbon-metal ore particulate, thereby generating a carbon-metal ore pellet;

chemically reducing the metal oxide, thereby generating a metal nugget, wherein the chemically reducing is achieved using the pyrolysis off-gas; and recovering the metal nugget, wherein the metal nugget comprises a metal that is a reduced form of the metal oxide, wherein the metal nuggets consist essentially of the metal and the carbon.

FIG. 5 illustrates process 500 for producing metal nuggets 521 utilizing biogenic reagent 504. Biomass feedstock 501 is fed into pyrolysis reactor 503. Biomass feedstock 501 is pyrolyzed in the presence of heat 502 and under conditions detailed further herein below. Pyrolysis of biomass feedstock 501 generates biogenic reagent 504 and pyrolysis off-gas 506. Biogenic reagent 504, comprising carbon, and metal ore 508 are fed into carbon-metal ore mixing unit 507 to produce carbon-metal ore particulates. Additive 509 can be added to carbon-metal ore mixing unit 507 to be combined with biogenic reagent 504 and metal ore 508. The carbon-metal ore particulates produced by carbon-metal ore mixing unit 507 are introduced to carbon-metal ore pelleting unit 510, thereby generating carbon-metal ore pellets 512. Additive 511 can be added to carbon-metal ore pelleting unit 510 to be incorporated into carbon-metal ore pellets 512. Carbon-metal ore pellets 512 and pyrolysis off-gas 506, from pyrolysis reactor 503, are introduced to chemical reduction reactor 513. In chemical reduction reactor 513, metal oxide, which is present in metal ore 508 of carbon-metal ore pellets 512, is reduced. Biogenic reagent 504 can be introduced as injected carbon 505 to chemical reduction reactor 513. $O_2$ or air 514 can also be introduced into chemical reduction reactor 513. The chemical reduction reaction in chemical reduction reactor 513 produces metal nuggets 521 and reduction off-gas 515.

Figure 6:
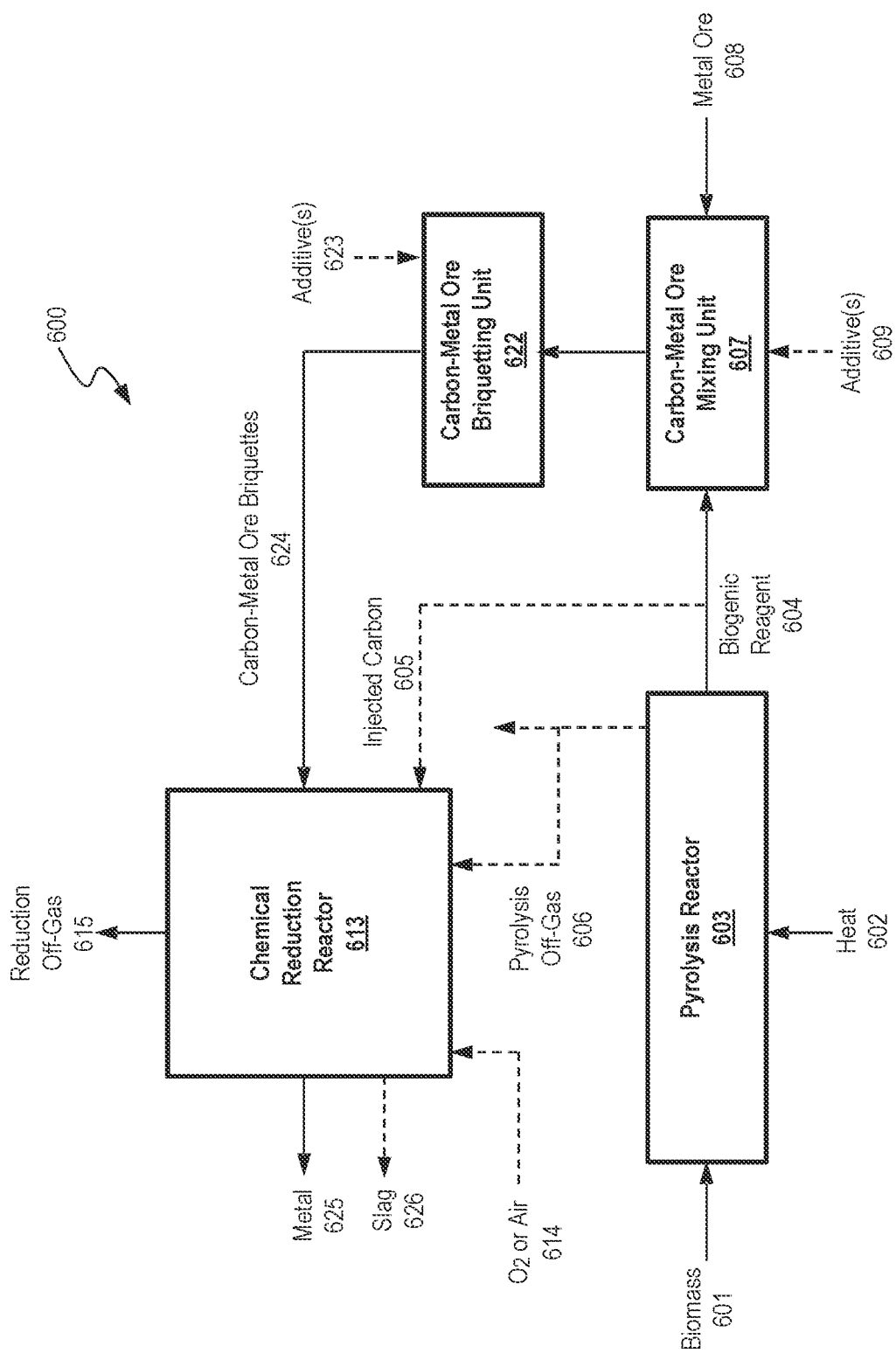
FIG. 6 is a simplified block-flow diagram of a process for converting a metal ore into a metal product utilizing a high-carbon biogenic reagent, in some embodiments.

Disclosed herein are processes for producing a metal from a metal ore. FIG. 6 provides an exemplary illustration of such processes. The processes can comprise:
providing a biomass feedstock;
pyrolyzing the biomass feedstock, thereby generating a biogenic reagent, wherein the biogenic reagent comprises carbon;
obtaining a metal ore, wherein the metal ore comprises a metal oxide, wherein the metal ore is in particulate form;
combining the carbon with the metal ore, thereby generating a carbon-metal ore particulate;
pelletizing the carbon-metal ore particulate, thereby generating a carbon-metal ore pellet;
introducing the carbon-metal ore pellet into a chemical-reduction furnace;
oxidizing the carbon comprised within the carbon-metal ore particulate, thereby generating heat and carbon monoxide, wherein the oxidizing is achieved by introducing air or oxygen into the chemical-reduction furnace;
chemically reducing, within the chemical-reduction furnace, the metal oxide comprised within the carbon-metal ore pellet, thereby generating a metal, wherein the chemically reducing is achieved using the carbon monoxide; and
recovering the metal.

FIG. 6 illustrates process 600 for producing metal 625 from metal ore 608 utilizing biogenic reagent 604. Biomass feedstock 601 is fed into pyrolysis reactor 603. Biomass feedstock 601 is pyrolyzed in the presence of heat 602 and under conditions detailed further herein below. Pyrolysis of biomass feedstock 501 generates biogenic reagent 604 and pyrolysis off-gas 606. Biogenic reagent 604, comprising carbon, and metal ore 608 are fed into carbon-metal ore mixing unit 607 to produce carbon-metal ore particulates. Additive 609 can be added to carbon-metal ore mixing unit 607 to be combined with biogenic reagent 604 and metal ore 608. The carbon-metal ore particulates produced by carbon-metal ore mixing unit 607 are introduced to carbon-metal ore briquetting unit 622, thereby generating carbon-metal ore briquettes 624. Additive 623 can be added to carbon-metal ore briquetting unit 622 to be incorporated into carbon-metal ore briquettes 624. Carbon-metal ore briquettes 624 are introduced to chemical reduction reactor 613. Pyrolysis off-gas 606, from pyrolysis reactor 603, can be introduced to chemical reduction reactor 613. In chemical reduction reactor 613, metal oxide, which is present in metal ore 608 of carbon-metal ore briquettes 624, is reduced. Biogenic reagent 604 can be introduced as injected carbon 605 to chemical reduction reactor 613. $O_2$ or air 614 can also be introduced into chemical reduction reactor 613. The chemical reduction reaction in chemical reduction reactor 613 produces metal 625, slag 626, and reduction off-gas 615.

In some embodiments, a portion of the biogenic reagent is co-fed directly into the chemical-reduction furnace.

In some embodiments, pyrolysis off-gases can be introduced into the chemical-reduction furnace in addition to the carbon-metal ore particulates or in addition to the biogenic reagent. For example, in embodiments in which it is co-fed along with the pellets.

Disclosed herein are additional processes for producing a metal from a metal ore. The processes can comprise:
providing a biomass feedstock;
pyrolyzing the biomass feedstock, thereby generating a biogenic reagent and a pyrolysis off-gas, wherein the biogenic reagent comprises carbon, wherein the pyrolysis off-gas comprises carbon monoxide or hydrogen;
obtaining a metal ore, wherein the metal ore comprises a metal oxide, wherein the metal ore is in particulate form;
combining the carbon with the metal ore, thereby generating a carbon-metal ore particulate;
introducing the carbon-metal ore particulate into a chemical-reduction furnace;
oxidizing the carbon, thereby generating heat and carbon monoxide or carbon dioxide, wherein the oxidizing is achieved by introducing air or oxygen into the chemical-reduction furnace;
chemically reducing, within the chemical-reduction furnace, the metal oxide comprised within the carbon-metal ore pellet, thereby generating a metal, wherein the chemically reducing is achieved using carbon monoxide; and
recovering the metal.

In some embodiments, after generating a carbon-metal ore particulate, the process further comprises pelletizing the carbon-metal ore particulate, thereby generating a carbon-metal ore pellet. In such embodiments, the carbon-metal ore pellet is introduced into the chemical-reduction furnace.

In some embodiments, the process further comprises introducing the biogenic reagent, or a portion thereof, into the chemical-reduction furnace.

The carbon that is oxidized in the chemical-reduction furnace can be comprised within the carbon metal-ore particulate or the carbon that is oxidized in the chemical-reduction furnace can be comprised within the biogenic reagent.

In some embodiments, the process further comprises introducing the pyrolysis off-gas, or a portion thereof, into the chemical-reduction furnace.

The carbon monoxide that is used to achieve the chemical reducing of the metal oxide can be a product of the oxidation of the biogenic reagent, can be a product of the oxidation of the carbon comprised within the carbon-metal ore particulate, or can be comprised within the pyrolysis off-gas.

Disclosed herein are further processes for producing a metal from a metal ore. The processes can comprise:
providing a biomass feedstock;
pyrolyzing the biomass feedstock, thereby generating a biogenic reagent and a pyrolysis off-gas, wherein the biogenic reagent comprises carbon, wherein the pyrolysis off-gas comprises hydrogen;

obtaining a metal ore, wherein the metal ore comprises a metal oxide, wherein the metal ore is in particulate form;

combining the carbon with the metal ore, thereby generating a carbon-metal ore particulate;

introducing the carbon-metal ore pellet into a chemical-reduction furnace;

oxidizing the carbon, thereby generating heat and carbon monoxide or carbon dioxide, wherein the oxidizing is achieved by introducing air or oxygen into the chemical-reduction furnace;

chemically reducing, within the chemical-reduction furnace, the metal oxide comprised within the carbon-metal ore pellets, thereby generating a metal, wherein the chemically reducing is achieved using carbon monoxide or using hydrogen; and recovering the metal.

In some embodiments, after generating a carbon-metal ore particulate, the process further comprises pelletizing the carbon-metal ore particulate, thereby generating a carbon-metal ore pellet. In such embodiments, the carbon-metal ore pellet can be introduced into the chemical-reduction furnace.

In some embodiments, the process further comprises introducing the biogenic reagent, or a portion thereof, into the chemical-reduction furnace.

The carbon that is oxidized in the chemical-reduction furnace can be comprised within the carbon metal-ore particulate or the carbon that is oxidized in the chemical-reduction furnace can be comprised within the biogenic reagent.

In some embodiments, the process further comprises introducing the pyrolysis off-gas, or a portion thereof, into the chemical-reduction furnace.

The carbon monoxide that can be used to achieve the chemical reducing of the metal oxide can be a product of the oxidation of the biogenic reagent or can be a product of the oxidation of the carbon comprised within the carbon-metal ore particulate. The hydrogen that can be used to achieve the chemical reducing of the metal oxide can be comprised within the pyrolysis off-gas.

Process Parameters

The process parameters provided in this section apply to the processes described herein; for example, processes for reducing a metal ore; processes for treating a metal ore; processes for producing carbon-metal ore pellets; processes for producing metal nuggets; and processes for producing a metal from a metal ore.

In some embodiments, the chemically reducing co-utilizes a reducing gas obtained from gasification, partial oxidation, or steam reforming of the biogenic reagent or a portion thereof. The reducing gas can comprise at least one of CO and $H_2$, and typically comprises syngas, which is both CO and $H_2$. Other components such as $CH_4$, $CO_2$, and $H_2O$ can be present in the reducing gas.

In some embodiments, the chemically reducing co-utilizes a reducing gas obtained from gasification, partial oxidation, or steam reforming of light hydrocarbons.

The chemically reducing can be conducted in a metal ore furnace, such as a blast furnace, a direct reduced metal furnace, open-hearth furnace, or another type of furnace. Alternatively, or additionally, the chemically reducing can be conducted upstream of a metal ore furnace.

In some embodiments, the chemically reducing utilizes internal heat produced by combustion or partial oxidation of the carbon. In these or other embodiments, the chemically reducing can utilize external heat separately produced by combustion or partial oxidation of the carbon.

The process can be co-located at a metal ore mine, at a metal ore processing plant, or at a metal mine that is itself co-located with a metal ore processing plant.

In some embodiments, the processes comprise pelletizing the carbon-metal ore particulate, thereby generating a carbon-metal ore pellet. In some embodiments, the metal oxide is comprised within the carbon-metal ore pellet.

In some embodiments, the biomass feedstock is softwood chips, hardwood chips, timber harvesting residues, tree branches, tree stumps, leaves, bark, sawdust, corn, corn stover, wheat, wheat straw, rice, rice straw, sugarcane, sugarcane bagasse, sugarcane straw, energy cane, sugar beets, sugar beet pulp, sunflowers, sorghum, canola, algae, miscanthus, alfalfa, switchgrass, fruits, fruit shells, fruit stalks, fruit peels, fruit pits, vegetables, vegetable shells, vegetable stalks, vegetable peels, vegetable pits, grape pumice, almond shells, pecan shells, coconut shells, coffee grounds, food waste, commercial waste, grass pellets, hay pellets, wood pellets, cardboard, paper, paper pulp, paper packaging, paper trimmings, food packaging, construction or demolition waste, lignin, animal manure, municipal solid waste, municipal sewage, or a combination thereof.

The biogenic reagent produced by the pyrolysis step herein can comprise at least about 50 wt %, at least about 75 wt %, or at least about 90 wt % total carbon. In various embodiments, the biogenic reagent comprises about, at least about, or at most about 50, 55, 60, 65, 70, 75, 80, 85, 90, 95, or 99 wt % total carbon. The total carbon is fixed carbon plus non-fixed carbon that is present in volatile matter. In some embodiments, component weight percentages are on an absolute basis, which is assumed unless stated otherwise. In other embodiments, component weight percentages are on a moisture-free and ash-free basis.

The biogenic reagent produced by the pyrolysis step can comprise at least about 50 wt %, at least about 75 wt %, or at least about 90 wt % total carbon. In various embodiments, the biogenic reagent comprises about 50, 55, 60, 65, 70, 75, 80, 85, 90, 95, or 99 wt % total carbon, including the intervening ranges (for example, about 70 to about 99 wt % total carbon).

The biogenic reagent produced in the pyrolyzing can comprise at least about 50 wt %, at least about 75 wt %, or at least about 90 wt % fixed carbon. In various embodiments, the biogenic reagent contains about, at least about, or at most about 50, 55, 60, 65, 70, 75, 80, 85, 90, 95, or 99 wt % fixed carbon, including the intervening ranges (for example, about 70 to about 99 wt % fixed carbon).

The carbon comprised within the biogenic reagent can be at least about 50 wt %, at least about 75 wt %, or at least about 90 wt % fixed carbon, for example, with the remainder of the carbon being volatile carbon. In various embodiments, the carbon contains about, at least about, or at most about 50, 55, 60, 65, 70, 75, 80, 85, 90, 95, 99, or 100 wt % fixed carbon, including the intervening ranges (for example, about 70 to about 99 wt % fixed carbon).

The conditions of the pyrolyzing can vary, depending on the desired compositions for the biogenic reagent and pyrolysis off-gas, the starting feedstock, the type of metal oxide, the reactor configuration, and other factors, which are described herein. The pyrolysis temperature is an important parameter and should be controlled. Generally speaking, higher pyrolysis temperatures, for example about 600° C. to about 850° C., generate more hydrogen in the pyrolysis off-gas, leaving less hydrogen in the biogenic reagent. This can be advantageous in embodiments that utilize hydrogen in the off-gas for reduction of metal oxides (in other words, the removal of oxygen). Lower pyrolysis temperatures, for example about 400° C. to about 600° C., leave more hydrogen in the biogenic reagent and therefore less hydrogen in the off-gas. This can be advantageous in certain embodiments, such as self-reducing pellets or injection of biogenic carbon into a metal-reduction furnace, that utilize hydrogen in the biogenic reagent for reduction of metal oxides. In either scenario, hydrogen can be utilized for metal oxide reduction, which is desirable because it avoids direct $CO_2$ generation, thereby improving the environmental footprint due to reduced carbon intensity.

In some embodiments, the metal ore is iron ore, copper ore, nickel ore, magnesium ore, manganese ore, aluminum ore, tin ore, zinc ore, cobalt ore, chromium ore, tungsten ore, molybdenum ore, or a combination thereof. In some embodiments, the metal ore is iron ore, for example an iron ore selected from hematite, magnetite, limonite, taconite, or a combination thereof.

The metal ore can be a beneficiated metal ore, in other words, a metal ore that was processed in one or more beneficiation units.

In some embodiments, the particulate form is a powdered form of the metal ore.

The carbon-metal ore particulates can be carbon-metal ore fines (for example, a powder), carbon-metal ore lumps, or another type of particulate. When pellets are generated, a wide variety of pellet geometries can be produced. The pellet geometry is not limited to spherical or approximately spherical. The pellet geometry can be spherical (round or ball shape), cube (squared), octagon, hexagon, honeycomb/beehive shape, oval shape, egg shape, column shape, bar shape, bread shape, pillow shape, random, or a combination thereof.

The carbon-metal ore particulates can comprise at least about 0.1 wt % to at most about 50 wt % carbon, such as at least about 1 wt % to at most about 10 wt % carbon. In certain embodiments, such as those employed in relation to a typical blast furnace, the carbon-metal ore particulates comprise at least about 3 wt % to at most about 6 wt % carbon.

In certain embodiments, the carbon-metal ore pellets consist essentially of the carbon and the metal ore.

The carbon-metal ore pellets can comprise an additive, such as a binder. The binder can comprise inorganic bentonite clay, limestone, starch, cellulose, lignin, or acrylamides. When lignin is used as a binder (or as a general additive), the lignin can be obtained from the same biomass feedstock as used in the pyrolysis process. For example, a starting biomass feedstock can be subjected to a lignin-extraction step, removing a quantity of lignin for use as a binder. The remaining solids can then be fed to the pyrolysis process.

The additive can comprise a fluxing agent, such as an inorganic chloride, inorganic fluoride, or lime.

In some embodiments, an additive is an acid, base, or salt or derivative thereof. In some embodiments, the additive is a metal, a metal oxide, a metal hydroxide, a metal halide, or a combination or a derivative thereof. An additive can be sodium hydroxide, potassium hydroxide, magnesium oxide, hydrogen bromide, hydrogen chloride, sodium silicate, potassium permanganate, magnesium, manganese, aluminum, nickel, chromium, silicon, boron, cerium, molybdenum, phosphorus, tungsten, vanadium, iron halide, iron chloride, iron bromide, dolomite, dolomitic lime, fluorite, fluorospar, bentonite, calcium oxide, lime, or a combination or a derivative thereof.

An additive can be added before, during, or after any one or more steps of the process, including into the feedstock itself at any time, before or after it is harvested. When during the process the additive is incorporated will depend on the desired product. For example, a derivative can be the pyrolysis product of an additive with the feedstock, where the additive is added before or during pyrolysis. In such embodiments, the derivative is an additive. There are embodiments in which the additive will not materially react with the feedstock during pyrolysis.

In the chemically reducing, "utilizing" the pyrolysis off-gas to chemically reduce the metal oxide indicates that CO, $H_2$, or both CO and $H_2$ are chemically reacted with metal oxide in chemical reactions that reduce the metal oxide (for example, $Fe_3O_4$) to the corresponding metal (for example, Fe) or to a less-reduced metal oxide (for example, FeO is less reduced than $Fe_2O_3$). Utilizing the pyrolysis off-gas to chemically reduce the metal oxide can also refer to utilizing at least some of the sensible heat contained within the pyrolysis off-gas to cause or allow endothermic reactions to take place, whether thermodynamically, kinetically, or both. Hot pyrolysis off-gas is useful for an endothermic reaction that requires heat. While not bound by theory, the hot off-gas can be heat-exchanged with another stream prior to injection to a furnace or reactor, in which case CO or $H_2$ are chemically utilized, though reaction heat can be obtained from a source different than the pyrolysis off-gas. In some embodiments, pyrolysis off-gas, even though hot, is at a lower temperature than a reaction zone of a furnace into which the off-gas is injected. In such embodiments, the off-gas can be regarded as actually being heated itself, rather than providing heat—the contents of the furnace will not cool as much as would happen with cool-gas injection, such that endothermic chemistry is still favored at a relatively low overall energy usage compared to conventional approaches.

In some embodiments, the chemically reducing directly utilizes at least a portion of the pyrolysis off-gas. Alternatively, or additionally, the chemically reducing can indirectly utilize pyrolysis off-gas by first partially oxidizing the pyrolysis off-gas, thereby generating a reducing gas, and then utilizing the reducing gas to chemically reduce the metal oxide, which can be comprised within the carbon-metal ore particulate or the carbon-metal ore pellet.

In some embodiments, heat is generated from partial oxidation but not complete oxidation (combustion) of pyrolysis off-gas, thereby producing a reducing gas comprising CO or $H_2$ rather than a combustion gas comprising primarily $CO_2$ and $H_2O$. The heat can be used to increase the temperature of pyrolysis or for other process uses. While less heat is generated in partial oxidation versus complete oxidation, more reducing gas is generated, which is useful for the chemically reducing.

In some embodiments, the chemically reducing co-utilizes a reducing gas obtained from gasification, partial oxidation, or steam reforming of the biogenic reagent or a portion thereof. The reducing gas can comprise at least one of CO and Hz, and typically comprises syngas, which is both CO and Hz. Other components such as $CH_4$, $CO_2$, and $H_2O$ can be present in the reducing gas.

In some embodiments, the biogenic reagent or a portion thereof includes heavy hydrocarbons obtained during the pyrolyzing, wherein the heavy hydrocarbons are converted to at least some of the reducing gas. The heavy hydrocarbons can be derived from the pyrolysis off-gas or from volatile carbon remaining in the biogenic reagent. Heavy hydrocarbons can include hydrocarbons with at least 5 carbon atoms (for example, n-hexane or toluene).

In some embodiments, the chemically reducing co-utilizes a reducing gas obtained from gasification, partial oxidation, or steam reforming of light hydrocarbons. The light hydrocarbons can be derived from the pyrolysis off-gas, in other words, obtained during the pyrolyzing. Alternatively, or additionally, light hydrocarbons can be diverted from the feed to a combustion chamber that heats up the pyrolysis reactor. Light hydrocarbons can include hydrocarbons having from 1 to 4 carbon atoms (for example, methane or n-butane).

The pyrolysis off-gas can comprise at least 1 mol % hydrogen, such as at least 10 mol % hydrogen. The pyrolysis off-gas can comprise at least 1 mol % carbon monoxide, such as at least 10 mol % carbon monoxide.

The reducing gas can comprise at least 10 mol % hydrogen, such as at least 15 mol %, 20 mol %, 25 mol %, 30 mol %, 35 mol %, 40 mol %, 45 mol %, or 50 mol % hydrogen. The reducing gas can comprise at least 10 mol % carbon monoxide, such as at least 15 mol %, 20 mol %, 25 mol %, 30 mol %, 35 mol %, 40 mol %, 45 mol %, or 50 mol % carbon monoxide.

The chemically reducing can be conducted in a metal ore furnace, such as a blast furnace, a direct reduced metal furnace, open-hearth furnace, or another type of furnace. Alternatively, or additionally, the chemically reducing can be conducted upstream of a metal ore furnace.

In some embodiments, the chemically reducing utilizes internal heat produced by combustion or partial oxidation of the carbon. In these or other embodiments, the chemically reducing can utilize external heat separately produced by combustion or partial oxidation of the carbon.

The process can be co-located at a metal ore mine, at a metal ore processing plant, or at a metal mine that is itself co-located with a metal ore processing plant.

In some embodiments, the pyrolyzing and the chemically reducing are conducted at the same site. In other embodiments, the pyrolyzing and the chemically reducing are conducted at different sites.

Embodiments Utilizing a Metal Ore Furnace or a Chemical-Reduction Furnace

A metal ore furnace or a chemical-reduction furnace can be a blast furnace, a top-gas recycling blast furnace, a shaft furnace, a reverberatory furnace (also known as an air furnace), a crucible furnace, a muffling furnace, a retort furnace, a flash furnace, a Tecnored furnace, an Ausmelt furnace, an ISASMELT furnace, a puddling furnace, a Bogie hearth furnace, a continuous chain furnace, a pusher furnace, a rotary hearth furnace, a walking beam furnace, an electric arc furnace, an induction furnace, a basic oxygen furnace, a puddling furnace, a Bessemer furnace, a direct-reduced-metal furnace, or a combination thereof.

A metal ore furnace or a chemical-reduction furnace can be arranged horizontally, vertically, or inclined. The flow of solids or fluids (or liquids or gases) can be cocurrent or countercurrent. The solids within a furnace can be in a fixed bed or a fluidized bed. A metal ore furnace or a chemical-reduction furnace can be operated at a variety of process conditions of temperature, pressure, and residence time.

Some embodiments utilize a blast furnace. A blast furnace is a type of metallurgical furnace used for smelting to produce industrial metals, such as iron or copper. Blast furnaces are utilized in smelting iron ore to produce pig iron, an intermediate material used in the production of commercial iron and steel. Blast furnaces are also used in combination with sinter plants in base metals smelting, for example.

The term "blast" in "blast furnace" refers to the combustion air being forced or supplied above atmospheric pressure. In a blast furnace, metal ores, carbon (for example, a biogenic reagent), and usually flux (for example, limestone) are continuously supplied through the top of the furnace, while a hot blast of air (which can be with oxygen enrichment) is blown into the lower section of the furnace through a series of pipes termed tuyeres. The chemical reduction reactions take place throughout the furnace as the material falls downward. The end products are usually molten metal and slag phases tapped from the bottom, and waste gases (reduction off-gas) exiting from the top of the furnace. The downward flow of the metal ore along with the flux in countercurrent contact with an upflow of hot, CO-rich gases allows for an efficient chemical reaction to reduce the metal ore to metal.

Air furnaces (such as reverberatory furnaces) are naturally aspirated, usually by the convection of hot gases in a chimney flue. According to this broad definition, bloomeries for iron, blowing houses for tin, and smelt mills for lead would be classified as blast furnaces.

The blast furnace remains an important part of modern iron production. Modern furnaces are highly efficient, including Cowper stoves which preheat incoming blast air with waste heat from flue gas, and recovery systems to extract the heat from the hot gases exiting the furnace. A blast furnace is typically built in the form of a tall structure, lined with refractory brick, and profiled to allow for expansion of the feed materials as they heat during their descent, and subsequent reduction in size as melting starts to occur.

In some embodiments pertaining to iron production, a biogenic reagent comprising renewable carbon, iron ore (iron oxide), and limestone flux are charged into the top of the blast furnace. The blast furnace can be configured to allow the hot, dirty gas high in carbon monoxide content to exit the furnace throat, while bleeder valves can protect the top of the furnace from sudden gas pressure surges. The coarse particles in the exhaust gas settle and can be disposed, while the gas can flow through a venturi scrubber or electrostatic precipitator or a gas cooler to reduce the temperature of the cleaned gas. A casthouse at the bottom of the furnace contains equipment for casting the liquid iron and slag. A taphole can be drilled through a refractory plug, so that liquid iron and slag flow down a trough through an opening, separating the iron and slag. Once the pig iron and slag has been tapped, the taphole can be plugged with refractory clay. Nozzles, called tuyeres, are used to implement a hot blast to increase the efficiency of the blast furnace. The hot blast is directed into the furnace through cooled tuyeres near the base. The hot blast temperature can be from at least about 900° C. to at most about 1300° C. (air temperature), for example. The temperature within the blast furnace can be at least about 2000° C. Other carbonaceous materials or oxygen can also be injected into the furnace at the tuyere level to combine with the carbon (from the biogenic reagent) to release additional energy and increase the percentage of reducing gases present, which increases productivity.

Blast furnaces operate on the principle of chemical reduction whereby carbon monoxide, having a stronger affinity for the oxygen in metal ore (for example, iron ore) than the corresponding metal does, reduces the metal to its elemental form. Blast furnaces differ from bloomeries and reverberatory furnaces in that in a blast furnace, flue gas is in direct contact with the ore and metal, allowing carbon monoxide to diffuse into the ore and reduce the metal oxide to elemental metal mixed with carbon. The blast furnace usually operates as a continuous, countercurrent exchange process.

Silica usually is removed from the pig iron. Silica reacts with calcium oxide and forms a silicate that floats to the surface of the molten pig iron as slag. The downward-moving column of metal ore, flux, carbon, and reaction products must be porous enough for the flue gas to pass through. This requires the biogenic reagent carbon to be in large enough particles to be permeable. Therefore, the biogenic reagent (which can comprise additives) must be strong enough such that it will not be crushed by the weight of the material above it. The carbon is physically strong, in addition to being low in sulfur, phosphorus, and ash.

Chemical Reactions of the Blast Furnace

Many chemical reactions take place in a blast furnace. The chemistry can be understood with reference to hematite ($Fe_2O_3$) as the starting metal oxide. This form of iron oxide is common in iron ore processing, either in the initial feedstock or as produced within the blast furnace. Other forms of iron ore (for example, taconite) will have various concentrations of different iron oxides ($Fe_3O_4$, $Fe_2O_3$, FeO, etc.).

The general chemical reaction for the production of molten iron in a blast furnace is an endothermic reaction:

$$Fe_2O_3 + 3CO \rightarrow 2Fe + 3CO_2$$

This reaction occurs over many steps, with the first being that preheated blast air blown into the furnace reacts with carbon (for example, from a biogenic reagent) to produce carbon monoxide and heat:

$$2C + O_2 \rightarrow 2CO$$

The hot carbon monoxide is the reducing agent for the iron ore and reacts with the iron oxide to produce molten iron and carbon dioxide. Depending on the temperature in the different parts of the furnace (typically highest at the bottom), the iron is reduced in several steps. At the top, where the temperature usually is in the range of 200-700° C., the iron oxide is partially reduced to iron (II,III) oxide, $Fe_3O_4$:

$$3Fe_2O_3 + CO \rightarrow 2Fe_3O_4 + CO_2$$

At temperatures around 850° C., further down in the furnace, the iron(II,III) is reduced further to iron(II) oxide, FeO:

$$Fe_3O_4 + CO \rightarrow 3FeO + CO_2$$

Hot carbon dioxide, unreacted carbon monoxide, and nitrogen from the air pass up through the furnace as fresh feed material travels down into the reaction zone. As the material travels downward, countercurrent gases both preheat the feed charge and decompose the limestone (when employed) to calcium oxide and carbon dioxide:

$$CaCO_3 \rightarrow CaO + CO_2$$

The calcium oxide formed by decomposition reacts with various acidic impurities in the iron (notably silica) to form a slag which is primarily calcium silicate, $CaSiO_3$:

$$SiO_2 + CaO \rightarrow CaSiO_3$$

As the FeO moves down to the region with higher temperatures, ranging up to 1200° C., FeO is reduced further to iron metal, again with carbon monoxide as reactant:

$$FeO + CO \rightarrow Fe + CO_2$$

The carbon dioxide formed in this process can be converted back to carbon monoxide by reacting with the biogenic reagent by the reverse Boudouard reaction:

$$C + CO_2 \rightarrow 2CO$$

In the chemical reactions shown above, it is noted that carbon monoxide can alternatively or additionally be directly introduced into the blast furnace, rather than being an in-situ product of carbon oxidation. According to the present disclosure, the CO can be a pyrolysis off-gas that is introduced to the furnace. The pyrolysis off-gas can also contain $CO_2$ that produces more CO via the reverse Boudouard reaction.

In conventional blast furnaces, there is no hydrogen available for causing metal oxide reduction. In the present disclosure, a pyrolysis off-gas containing hydrogen can be injected into the blast furnace. Alternatively, or additionally, hydrogen can be available within the biogenic reagent that is fed to the blast furnace, when the biogenic reagent contains volatile carbon that is associated with hydrogen (for example, heavy tar components). The hydrogen can cause additional reduction reactions that are similar to those above, but replacing CO with $H_2$:

$$3Fe_2O_3 + H_2 \rightarrow 2Fe_3O_4 + H_2O$$

$$Fe_3O_4 + 4H_2 \rightarrow 3Fe + 4H_2O$$

These reactions occur in parallel to the reduction reactions with CO. The hydrogen can also react with carbon dioxide to generate more CO, in the reverse water-gas shift reaction.

The "pig iron" produced by the blast furnace typically has a relatively high carbon content of around 3-6 wt %. Pig iron can be used to make cast iron. Pig iron produced by blast furnaces normally undergoes further processing to reduce the carbon and sulfur content and produce various grades of steel used commercially. In a further process step referred to as basic oxygen steelmaking, the carbon is oxidized by blowing oxygen onto the liquid pig iron to form crude steel.

Desulfurization conventionally is performed during the transport of the liquid iron to the steelworks, by adding calcium oxide, which reacts with iron sulfide contained in the pig iron to form calcium sulfide. In some embodiments, desulfurization can also take place within a furnace or downstream of a furnace, by reacting a metal sulfide with CO (from pyrolysis off-gas) to form a metal and carbonyl sulfide, CSO.

Other types of furnaces can employ other chemical reactions. It will be understood that in the chemical conversion of a metal oxide into a metal, which employs carbon or a carbon-containing gas (such as CO) in the conversion, that carbon can be renewable carbon. This disclosure provides renewable carbon in biogenic reagents produced via pyrolysis of biomass. In certain embodiments, some carbon utilized in the furnace is not renewable carbon. In various embodiments, of the total carbon that is consumed in the metal ore furnace, that percentage of that carbon that is renewable can be at least about 20%, 30%, 40%, 50%, 60%, 70%, 80%, 90%, 95%, 99%, or 100%.

In some embodiments, a Tecnored furnace, or modification thereof, is utilized. The Tecnored process was originally developed by Tecnored Desenvolvimento Tecnológico S.A. of Brazil and is based on a low-pressure moving-bed reduction furnace which reduces cold-bonded, carbon-bearing, self-fluxing, and self-reducing pellets. Reduction is carried out in a short-height shaft furnace at typical reduction temperatures. The process produces hot metal (typically liquid iron) at high efficiency.

Tecnored technology was developed to be a coke-less ironmaking process, thus avoiding the investment and operation of environmentally harmful coke ovens besides significantly reducing greenhouse gas emissions in the production of hot metal. The Tecnored process uses a combination of hot and cold blasts and requires no additional oxygen. It eliminates the need for coke plants, sinter plants, and tonnage oxygen plants. Hence, the process has much lower operating and investment costs than those of traditional ironmaking routes.

In the present disclosure, the Tecnored process can be adapted for use with biogenic reagents in various ways. Some embodiments provide cold-bonded, self-reducing agglomerates (for example, pellets or briquettes), produced from iron ore fines or iron-bearing residues, plus biogenic reagent. These materials, mixed with fluxing and binding agents, are agglomerated and thermally cured, producing briquettes/pellets which have sufficient strength for the physical and metallurgical demands of the Tecnored process. The agglomerates produced are then smelted in a Tecnored furnace. The fuel for the Tecnored furnace can itself be a high-carbon biogenic reagent as well.

By combining fine particles of iron oxide and the reductant within the briquette, both the surface area of the oxide in contact with reductant and, consequently, the reaction kinetics are increased dramatically. The self-reducing briquettes can be designed to contain sufficient reductant to allow full reduction of the iron-bearing feed contained. In some embodiments, with fluxes to provide the desired slag chemistry. The self-reducing briquettes are cured at low temperatures prior to feeding to the furnace. The heat required to drive the reaction within the self-reducing briquettes is provided by a bed of solid fuel, which can also be in the form of briquettes, onto which the self-reducing briquettes are fed within the furnace.

A Tecnored furnace has three zones: (i) upper shaft zone; (ii) melting zone; and (iii) lower shaft zone. In the upper shaft zone, solid fuel (biogenic reagent) is charged. In this zone, the Boudouard reaction (C+$CO_2$→2CO) is prevented which saves energy. Post-combustion in this zone of the furnace burns CO which provides energy for preheating and reduction of the charge. Inside the pellets, the following reactions take place at a very fast rate:

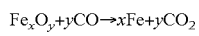

$Fe_xO_y + yCO \rightarrow xFe + yCO_2$

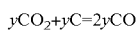

$yCO_2 + yC = 2yCO$ where x is from 1 to typically 5 and y is from 1 to typically 7.

In the melting zone, reoxidation is prevented because of the reducing atmosphere in the charge. The melting of the charge takes place under reducing atmosphere. In the lower shaft zone, solid fuel is charged. The solid fuel can comprise or consist essentially of high-carbon biogenic reagent. In this zone, further reduction of residual iron oxides and slagging reactions of gangue materials and fuel ash takes place in the liquid state. Also, superheating of metal and slag droplets take place. These superheated metal and slag droplets sink due to gravity to the furnace hearth and accumulate there.

This modified Tecnored process employs two different inputs of carbon units—namely the reductant and the solid fuel. The reducing agent is conventionally coal fines, but in this disclosure, the reducing agent is or includes a biogenic reagent in the form of carbon fines. The biogenic reagent is added into the mixture from which the self-reducing agglomerates (pellets or briquettes) are produced. The quantity of carbon fines required is established by a C/F (carbon to ore fines) ratio, which can be selected to achieve full reduction of the metal oxides.

The solid fuel (biogenic reagent) need not be in the form of fines. For example, the solid fuel can be in the form of lumps, such as about 40-80 mm in size to handle the physical and thermal needs required from the solid fuels in the Tecnored process. The solid fuel is charged through side feeders (to avoid the endothermic Boudouard reaction in the upper shaft) and provides most of the energy demanded by the process. This energy is formed by the primary blast (C+$O_2$→$CO_2$) and by the secondary blast, where the upstream CO, generated by the gasification of the solid fuel at the hearth, is burned (2CO+$O_2$→2$CO_2$).

In certain exemplary embodiments, a modified-Tecnored process comprises pelletizing iron ore fines with a size less than 140 mesh, biogenic-reagent fines with a size less than 200 mesh, and a flux such as hydrated lime of size less than 140 mesh using cement as the binder. The pellets are cured and dried at 200° C. before they are fed to the top of the Tecnored furnace. The total residence time of the charge in the furnace is around 30-40 minutes. Biogenic reagent in the form of solid fuel of size ranging from 40 mm to 80 mm is fed in the furnace below the hot pellet area using side feeders. Hot blast air at around 1150° C. is blown in through tuyeres located in the side of the furnace to provide combustion air for the biogenic carbon. A small amount of furnace gas is allowed to flow through the side feeders to use for the solid fuel drying and preheating. Cold blast air is blown in at a higher point to promote post-combustion of CO in the upper shaft. The hot metal produced is tapped into a ladle on a ladle car, which can tilt the ladle for de-slagging. The liquid iron can be desulfurized in the ladle, and the slag can be raked into a slag pot. The hot metal typically contains about 3-5 wt % carbon.

Conventionally, external CO or $H_2$ does not play a significant role in the self-reduction process using a Tecnored furnace. However, in the context of the present disclosure, external CO or $H_2$ (for example, from pyrolysis off-gas) can assist the overall chemistry by increasing the rate or conversion of iron oxides in the above reaction ($Fe_xO_y$+ $yCO \rightarrow xFe + yCO_2$) or in a reaction with hydrogen as reactant ($Fe_xO_y + yH_2 \rightarrow xFe + yH_2O$). The reduction chemistry can be assisted at least at the surface of the pellets or briquettes, and possibly within the bulk phase of the pellets or briquettes since mass transfer of hot carbon monoxide is fast. In some embodiments in which a fully self-reducing pellet or briquette is desired, there is no introduction of external CO, $H_2$, or syngas. Some embodiments of this disclosure combine aspects of a blast furnace with aspects of a Tecnored furnace, so that a self-reducing pellet or briquette is utilized, in addition to the use of pyrolysis off-gases within the furnace.

As stated previously, there are a large number of possible furnace configurations for metal ore processing. This specification will not describe in detail the various conditions and chemistry that can take place in all possible furnaces, but it will be understood by one skilled in the art that the principles of this disclosure can be applied to essentially any furnace or process that uses carbon somewhere in the process of making a metal from a metal ore.

It will also be observed that some processes utilize solid carbon, some processes utilize gaseous carbon monoxide, and some processes utilize both solid carbon and gaseous carbon monoxide. As described herein, the pyrolysis processes provided herein produce both a solid carbon (biogenic reagent) as well as a pyrolysis off-gas containing at least carbon monoxide. In some embodiments, only the solid biogenic reagent is employed in a metal ore conversion process. In other embodiments, only the pyrolysis off-gas is employed in a metal ore conversion process. In still other embodiments, both the solid biogenic reagent and the pyrolysis off-gas are employed in a metal ore conversion process. In these embodiments employing both sources of renewable carbon, the percentage of overall carbon usage in the metal ore conversion from the solid biogenic reagent can be about, at least about, or at most about 5%, 10%, 20%, 30%, 40%, 50%, 60%, 70%, 80%, 90%, 95%, or 100%. The other carbon usage can be from the pyrolysis off-gas. Alternatively, some or all of the other carbon usage can be from conventional carbon inputs, such as coal fines.

Compositions of the Processes, Systems, and Methods

Also disclosed herein are compositions produced according to the processes disclosed herein. For example, processes for reducing a metal ore; processes for treating a metal ore; processes for producing carbon-metal ore pellets; processes for producing metal nuggets; and processes for producing a metal from a metal ore.

Disclosed herein are compositions for reducing a metal ore, the composition comprising a carbon-metal ore particulate, wherein the carbon-metal ore particulate comprises at least about 0.1 wt % to at most about 50 wt % fixed carbon on a moisture-free and ash-free basis, and wherein the fixed carbon is at least 50% renewable carbon as determined from a measurement of the $^{14}C/^{12}C$ isotopic ratio of the carbon.

Disclosed herein are additional compositions for reducing a metal ore, the composition comprising a carbon-metal ore particulate, wherein the carbon-metal ore particulate comprises at least about 0.1 wt % to at most about 50 wt % total carbon on a moisture-free and ash-free basis, and wherein the total carbon is at least 50% renewable carbon as determined from a measurement of the $^{14}C/^{12}C$ isotopic ratio of the carbon.

In some embodiments, the measurement of the $^{14}C/^{12}C$ isotopic ratio of the fixed carbon utilizes ASTM D6866.

The metal ore can be selected from iron ore, copper ore, nickel ore, magnesium ore, manganese ore, aluminum ore, tin ore, zinc ore, cobalt ore, chromium ore, tungsten ore, molybdenum ore, or a combination thereof. For example, the metal ore can be iron ore, such as one selected from hematite, magnetite, limonite, taconite, or a combination thereof. In certain embodiments, the metal ore is a combination of copper ore and nickel ore.

The composition can be in the form of objects selected from fines, lumps, pellets, nuggets, or a combination thereof, for example.

In some embodiments, the carbon-metal ore particulate comprises at least about 0.5 wt % to at most about 25 wt % fixed carbon on a moisture-free and ash-free basis. In some embodiments, the carbon-metal ore particulate comprises at least about 1 wt % to at most about 15 wt % fixed carbon on a moisture-free and ash-free basis. In some embodiments, the carbon-metal ore particulate comprises at least about 2 wt % to at most about 10 wt % fixed carbon on a moisture-free and ash-free basis. In some embodiments, the carbon-metal ore particulate comprises at least about 3 wt % to at most about 6 wt % fixed carbon on a moisture-free and ash-free basis.

In some embodiments, the fixed carbon is at least 90, 91, 92, 93, 94, 95, 96, 97, 98, 99, or 100% renewable carbon as determined from measuring the $^{14}C/^{12}C$ isotopic ratio of the carbon.

In some embodiments, the carbon-metal ore pellet consists essentially of the fixed carbon and the metal ore. In some embodiments, the carbon-metal ore pellet consists essentially of carbon and the metal ore, wherein the carbon comprises the fixed carbon; the carbon can also comprise volatile carbon.

The carbon-metal ore pellet can comprise an additive, such as a binder. The binder can comprise inorganic bentonite clay, limestone, starch, lignin, cellulose, acrylamides, or a combination thereof.

In some embodiments, the fixed carbon is characterized by a BET surface area of at least about 400 $m^2/g$, such as at least about 800 $m^2/g$.

In some embodiments, the fixed carbon is characterized by a mesopore volume of at least about 0.5 $cm^3/g$, such as at least about 1 $cm^3/g$.

Pyrolysis Processes and Systems

Processes and systems suitable for pyrolyzing a biomass feedstock to generate a biogenic reagent comprising carbon will now be further described in detail. The processes and systems can be co-located with a site of metal ore mining or metal ore processing, but the disclosure is not limited to such co-location.

Exemplary changes that can occur during pyrolysis include any of the following: (i) heat transfer from a heat source increases the temperature inside the feedstock; (ii) the initiation of primary pyrolysis reactions at this higher temperature releases volatiles and forms a char; (iii) the flow of hot volatiles toward cooler solids results in heat transfer between hot volatiles and cooler unpyrolyzed feedstock; (iv) condensation of some of the volatiles in the cooler parts of the feedstock, followed by secondary reactions, can produce tar; (v) autocatalytic secondary pyrolysis reactions proceed while primary pyrolytic reactions simultaneously occur in competition; and (vi) further thermal decomposition, reforming, water-gas shift reactions, free-radical recombination, or dehydrations can also occur, which are a function of the residence time, temperature, and pressure profile.

Pyrolysis can at least partially dehydrate a starting feedstock (e.g., lignocellulosic biomass). In various embodiments, pyrolysis removes greater than about 50%, 75%, 90%, 95%, 99%, or more of the water from the starting feedstock.

In some embodiments, multiple reactor zones are designed and operated in a way that optimizes carbon yield and product quality from pyrolysis, while maintaining flexibility and adjustability for feedstock variations and product requirements.

In some non-limiting embodiments, the temperatures and residence times are preferably selected to achieve relatively slow pyrolysis chemistry. The benefit is potentially the substantial preservation of cell walls contained in the biomass structure, which means the final product can retain some, most, or all of the shape and strength of the starting biomass. In order to maximize this potential benefit, it is preferred to utilize apparatus that does not mechanically destroy the cell walls or otherwise convert the biomass particles into small fines. Certain reactor configurations are discussed following the process description below.

Additionally, if the feedstock is a milled or sized feedstock, such as wood chips or pellets, it can be desirable for the feedstock to be carefully milled or sized. Careful initial treatment will tend to preserve the strength and cell-wall integrity that is present in the native feedstock source (e.g., trees). This can also be important when the final product should retain some, most, or all of the shape and strength of the starting biomass.

In some embodiments, a first zone of a pyrolysis reactor is configured for feeding biomass (or another carbon-containing feedstock) in a manner that does not "shock" the biomass, which would rupture the cell walls and initiate fast decomposition of the solid phase into vapors and gases. This first zone can be thought of as mild pyrolysis.

In some embodiments, a second zone of a pyrolysis reactor is configured as the primary reaction zone, in which preheated biomass undergoes pyrolysis chemistry to release gases and condensable vapors, leaving a significant amount of solid material which is a high-carbon reaction intermediate. Biomass components (primarily cellulose, hemicellulose, and lignin) decompose and create vapors, which escape by penetrating through pores or creating new nanopores. The latter effect contributes to the creation of porosity and surface area.

In some embodiments, a third zone of a pyrolysis reactor is configured for receiving the high-carbon reaction intermediate and cooling down the solids to some extent. Typically, the third zone will be a lower temperature than the second zone. In the third zone, the chemistry and mass transport can be surprisingly complex. Without being limited by any particular theory or proposed mechanisms, it is believed that secondary reactions can occur in the third zone. In basic terms, carbon-containing components that are in the gas phase can decompose to form additional fixed carbon or become adsorbed onto the carbon. Therefore, while, in some embodiments, the final carbonaceous material is the solid, devolatilized residue of the processing steps, there are other embodiments in which the final carbonaceous material further comprises additional carbon that has been deposited from the gas phase, such as by decomposition of organic vapors (e.g., tars) that form carbon.

Certain embodiments extend the concept of additional carbon formation by including a separate unit in which cooled carbon is subjected to an environment including carbon-containing species, to enhance the carbon content of the final product. When the temperature of this unit is below pyrolysis temperatures, the additional carbon is expected to be in the form of adsorbed carbonaceous species, rather than additional fixed carbon.

There are a large number of options as to intermediate input and output (purge or probe) streams of one or more phases present in any particular zone, various mass and energy recycle schemes, various additives that can be introduced anywhere in the process, adjustability of process conditions including both reaction and separation conditions in order to tailor product distributions, and so on. Zone-specific input and output streams enable good process monitoring and control, such as through FTIR sampling and dynamic process adjustments.

Some embodiments do not employ fast pyrolysis, and some embodiments do not employ slow pyrolysis. Surprisingly high-quality carbon materials, including compositions with very high fractions of fixed carbon, can be obtained from the disclosed processes and systems.

In some embodiments, a pyrolysis process for producing a high-carbon biogenic reagent comprises:
  providing a carbon-containing feedstock comprising biomass;
  pyrolyzing the feedstock in the presence of a substantially inert gas phase for at least 10 minutes and with a temperature selected from at least about 250° C. to at most about 700° C., thereby generating hot pyrolyzed solids, condensable vapors, and non-condensable gases;
  separating the condensable vapors and the non-condensable gases from the hot pyrolyzed solids;
  cooling the hot pyrolyzed solids, thereby generating cooled pyrolyzed solids; and
  recovering a high-carbon biogenic reagent comprising at least a portion of the cooled pyrolyzed solids.

The process can further comprise drying, before pyrolyzing, the feedstock, thereby removing moisture comprised within the feedstock. The process can further comprise deaerating, before pyrolyzing, the feedstock, thereby removing interstitial oxygen comprised within the feedstock.

Biomass includes, for example, plant and plant-derived material, vegetation, agricultural waste, forestry waste, wood waste, paper waste, animal-derived waste, poultry-derived waste, and municipal solid waste. In various embodiments utilizing biomass, the biomass feedstock can include one or more materials selected from: timber harvesting residues, softwood chips, hardwood chips, tree branches, tree stumps, knots, leaves, bark, sawdust, off-spec paper pulp, cellulose, corn, corn stover, wheat straw, rice straw, sugarcane bagasse, switchgrass, miscanthus, animal manure, municipal garbage, municipal sewage, commercial waste, grape pumice, almond shells, pecan shells, coconut shells, coffee grounds, grass pellets, hay pellets, wood pellets, cardboard, paper, carbohydrates, plastic, or cloth. A person of ordinary skill in the art will readily appreciate that the feedstock options are virtually unlimited.

The processes herein can also be used for carbon-containing feedstocks other than biomass, such as a fossil fuel (e.g., coal or petroleum coke), or any mixtures of biomass and fossil fuels (such as biomass/coal blends). Any method, apparatus, or system described herein can be used with any carbonaceous feedstock. While the fossil fuels are not "biomass," non-biomass, or non-biogenic, feedstocks can be utilized in the processes. However, utilizing non-biomass, or non-biogenic, feedstocks will not result in the desirable biogenic product. Feedstocks can include waste tires, recycled plastics, recycled paper, construction waste, deconstruction waste, and other waste or recycled materials. Carbon-containing feedstocks can be transportable by any known means, such as by truck, train, ship, barge, tractor trailer, or any other vehicle or means of conveyance.

Selection of a particular feedstock can be carried out in a manner that favors an economical process. Typically, regardless of the feedstocks chosen, there can be (in some embodiments) screening to remove undesirable materials.

The feedstock employed can be provided or processed into a wide variety of particle sizes or shapes. For example, the feed material can be a fine powder, or a mixture of fine and coarse particles. The feed material can be in the form of large pieces of material, such as wood chips or other forms of wood (e.g., round, cylindrical, square, etc.). In some embodiments, the feed material comprises pellets or other agglomerated forms of particles that have been pressed together or otherwise bound, such as with a binder.

Size reduction can be a costly and energy-intensive process. Pyrolyzed material can be sized with significantly less energy input—that is, it can be preferred to reduce the particle size of the product, not the feedstock. This is an option in the present disclosure because the process does not require a fine starting material, and there is not necessarily any significant particle-size reduction during processing. The ability to process very large pieces of feedstock is a significant economic advantage of this disclosure. Notably, some commercial applications of the high-carbon product require large sizes (e.g., on the order of centimeters), such that in some embodiments, large pieces are fed, produced, and sold.

When it is desired to produce a final carbonaceous biogenic reagent that has structural integrity, such as in the form of cylinders, the material produced from the process can be collected and then further process mechanically into the desired form. For example, the product can be pressed or pelletized, with a binder. Alternatively, or additionally, the feed materials that generally possess the desired size or shape for the final product can be used, and processing steps that do not destroy the basic structure of the feed material can be employed. In some embodiments, the feed and product have similar geometrical shapes, such as spheres, cylinders, or cubes.

The ability to maintain the approximate size of feed material throughout the process is beneficial when product strength is important. Also, this avoids the difficulty and cost of pelletizing high fixed-carbon materials.

The starting feed material can be provided with a range of moisture levels, as will be appreciated. In some embodiments, the feed material can already be sufficiently dry that it need not be further dried before pyrolysis. Typically, it will be desirable to utilize commercial sources of biomass which will usually contain moisture, and feed the biomass through a drying step before introduction into the pyrolysis reactor. However, in some embodiments a dried feedstock can be utilized.

It is desirable to provide a low-oxygen environment in the pyrolysis reactor, such as about, or at most about, 10 mol %, 5 mol %, 4 mol %, 3 mol %, 2 mol %, 1.5 mol %, 1 mol %, 0.5 mol %, 0.2 mol %, 0.1 mol %, 0.05 mol %, 0.02 mol %, or 0.01 mol % $O_2$ in the gas phase. First, uncontrolled combustion should be avoided in the pyrolysis reactor, for safety reasons. Some amount of total carbon oxidation to $CO_2$ can occur, and the heat released from the exothermic oxidation can assist the endothermic pyrolysis chemistry. For example, large amounts of oxidation of carbon, including partial oxidation to syngas, will reduce the carbon yield to solids.

Practically speaking, it can be difficult to achieve a strictly oxygen-free environment in the reactor. However, this limit can be approached and, in some embodiments, the reactor is substantially free of molecular oxygen in the gas phase. To ensure that little or no oxygen is present in the pyrolysis reactor, interstitial air is removed from the feed material before it is introduced to the reactor. There are various ways to remove or reduce air in the feedstock.

In some embodiments, a deaeration unit is utilized in which feedstock, before or after drying, is conveyed in the presence of another gas which can remove adsorbed oxygen and penetrate the feedstock pores to remove oxygen from the pores. Essentially any gas that has lower than 21 vol % $O_2$ can be employed, at varying effectiveness. In some embodiments, nitrogen is employed. In some embodiments, CO or $CO_2$ is employed. Mixtures can be used, such as a mixture of nitrogen and a small amount of oxygen. Steam can be present in the deaeration gas, although adding significant moisture back to the feed should be avoided. The effluent from the deaeration unit can be purged (to the atmosphere or to an emissions treatment unit) or recycled.

In principle, the effluent (or a portion thereof) from the deaeration unit could be introduced into the pyrolysis reactor itself since the oxygen removed from the solids will now be highly diluted. In this embodiment, it can be advantageous to introduce the deaeration effluent gas to the last zone of the reactor, when it is operated in a countercurrent configuration.

Various types of deaeration units can be employed. If drying it to be performed, it can be preferable to dry and then deaerate since it can be inefficient to scrub soluble oxygen out of the moisture present. In certain embodiments, the drying and deaerating steps are combined into a single unit, or some amount of deaeration is achieved during drying, and so on.

The dried and deaerated feed material is introduced to a pyrolysis reactor or multiple reactors in series or parallel. The feed material can be introduced using any known means, including screw feeders or lock hoppers, for example. In some embodiments, a material feed system incorporates an air knife.

When a single reactor is employed, preferably multiple zones are present. Multiple zones, such as two, three, four, or more zones, can allow for the separate control of temperature, solids residence time, gas residence time, gas composition, flow pattern, or pressure in order to adjust the overall process performance.

References to "zones" shall be broadly construed to include regions of space within a single physical unit, physically separate units, or any combination thereof. For a continuous reactor, the demarcation of zones can relate to structure, such as the presence of flights within the reactor or distinct heating elements to provide heat to separate zones. Alternatively, or additionally, the demarcation of zones in a continuous reactor can relate to function, such as distinct temperatures, fluid flow patterns, solid flow patterns, extent of reaction, and so on. In a single batch reactor, "zones" are operating regimes in time, rather than in space. Multiple batch reactors can also be used.

It will be appreciated that there are not necessarily abrupt transitions from one zone to another zone. For example, the boundary between the preheating zone and pyrolysis zone can be somewhat arbitrary; some amount of pyrolysis can take place in a portion of the preheating zone, and some amount of "preheating" can continue to take place in the pyrolysis zone. The temperature profile in the reactor is typically continuous, including at zone boundaries within the reactor.

Some embodiments employ a first zone that is operated under conditions of preheating or mild pyrolysis. The temperature of the first zone can be selected from about 150° C. to about 500° C., such as about 300° C. to about 400° C. The temperature of the first zone is preferably not so high as to shock the biomass material which ruptures the cell walls and initiates fast decomposition of the solid phase into vapors and gases.

All references to zone temperatures in this specification should be construed in a non-limiting way to include temperatures that can apply to the bulk solids present, or the gas phase, or the reactor walls (on the process side). It will be understood that there will be a temperature gradient in each zone, both axially and radially, as well as temporally (i.e., following start-up or due to transients). Thus, references to zone temperatures can be references to average temperatures or other effective temperatures that can influence the actual kinetics. Temperatures can be directly measured by thermocouples or other temperature probes, or indirectly measured or estimated by other means.

The second zone, or in general the primary pyrolysis zone, is operated under conditions of pyrolysis or carbonization. The temperature of the second zone can be selected from about 250° C. to about 700° C., such as about, or at least about, or at most about 300° C., 350° C., 400° C., 450° C., 500° C., 550° C., 600° C., or 650° C. Within this zone, preheated biomass undergoes pyrolysis chemistry to release gases and condensable vapors, leaving a significant amount of solid material as a high-carbon reaction intermediate. Biomass components (primarily cellulose, hemicellulose, and lignin) decompose and create vapors, which escape by penetrating through pores or creating new pores. The preferred temperature will at least depend on the residence time of the second zone, as well as the nature of the feedstock and desired product properties.

The third zone, or cooling zone, is operated to cool down the high-carbon reaction intermediate to varying degrees. At a minimum, the temperature of the third zone should be a lower temperature than that of the second zone. The temperature of the third zone can be selected from about 100° C. to about 550° C., such as about 150° C. to about 350° C.

Chemical reactions can continue to occur in the cooling zone. Without being limited by any particular theory, it is believed that secondary pyrolysis reactions can be initiated in the third zone. Carbon-containing components that are in the gas phase can condense (due to the reduced temperature of the third zone). The temperature remains sufficiently high, however, to promote reactions that can form additional fixed carbon from the condensed liquids (secondary pyrolysis) or at least form bonds between adsorbed species and the fixed carbon. One exemplary reaction that can take place is the Boudouard reaction for conversion of carbon monoxide to carbon dioxide plus fixed carbon.

The residence times of the reactor zones can vary. There is an interplay of time and temperature, so that for a desired amount of pyrolysis, higher temperatures can allow for lower reaction times, and vice versa. The residence time in a continuous reactor (zone) is the volume divided by the volumetric flow rate. The residence time in a batch reactor is the batch reaction time, following heating to reaction temperature.

It should be recognized that in multiphase reactors, there are multiple residence times. In the present context, in each zone, there will be a residence time (and residence-time distribution) of both the solids phase and the vapor phase. For a given apparatus employing multiple zones, and with a given throughput, the residence times across the zones will generally be coupled on the solids side, but residence times can be uncoupled on the vapor side when multiple inlet and outlet ports are utilized in individual zones. The solids and vapor residence times are uncoupled.

The solids residence time of the preheating zone can be selected from about 5 min to about 60 min, such as about 10, 20, 30, 40, or 50 min. Depending on the temperature, sufficient time is desired to allow the biomass to reach a desired preheat temperature. The heat-transfer rate, which will depend on the particle type and size, the physical apparatus, and on the heating parameters, will dictate the minimum residence time necessary to allow the solids to reach a desired preheat temperature. Additional time is likely undesirable as it would contribute to higher capital cost, unless some amount of mild pyrolysis is intended in the preheating zone.

The solids residence time of the pyrolysis zone can be selected from about 10 min to about 120 min, such as about 20, 30, 40, 50, 60, 70, 80, 90, or 100 min. Depending on the pyrolysis temperature in this zone, there should be sufficient time to allow the carbonization chemistry to take place, following the necessary heat transfer. For times below about 10 min, in order to remove high quantities of non-carbon elements, the temperature would need to be quite high, such as above 700° C. This temperature would promote fast pyrolysis and its generation of vapors and gases derived from the carbon itself, which is to be avoided when the intended product is solid carbon.

In a static system, there would be an equilibrium conversion that could be substantially reached at a certain time. When, as in certain embodiments, vapor is continuously flowing over solids with continuous volatiles removal, the equilibrium constraint can be removed to allow for pyrolysis and devolatilization to continue until reaction rates approach zero. Longer times would not tend to substantially alter the remaining recalcitrant solids.

The solids residence time of the cooling zone can be selected from about 5 min to about 60 min, such as about 10, 20, 30, 40, or 50 min. Depending on the cooling temperature in this zone, there should be sufficient time to allow the carbon solids to cool to the desired temperature. The cooling rate and temperature will dictate the minimum residence time necessary to allow the carbon to be cooled. Additional time is likely undesirable, unless some amount of secondary pyrolysis is desired.

As discussed above, the residence time of the vapor phase can be separately selected and controlled. The vapor residence time of the preheating zone can be selected from about 0.1 min to about 15 min, such as about 0.5, 1, 2, 3, 4, 5, 6, 7, 8, 9, or 10 min. The vapor residence time of the pyrolysis zone can be selected from about 0.1 min to about 20 min, such as about 0.5, 1, 2, 3, 4, 5, 6, 7, 8, 9, 10, 11, 12, 13, 14, or 15 min. The vapor residence time of the cooling zone can be selected from about 0.1 min to about 15 min, such as about 0.5, 1, 2, 3, 4, 5, 6, 7, 8, 9, or 10 min. Short vapor residence times promote fast sweeping of volatiles out of the system, while longer vapor residence times promote reactions of components in the vapor phase with the solid phase.

The mode of operation for the reactor, and overall system, can be continuous, semi-continuous, batch, or any combination or variation of these. In some embodiments, the reactor is a continuous, countercurrent reactor in which solids and vapor flow substantially in opposite directions. The reactor can also be operated in batch but with simulated countercurrent flow of vapors, such as by periodically introducing and removing gas phases from the batch vessel.

Various flow patterns can be desired or observed. With chemical reactions and simultaneous separations involving multiple phases in multiple reactor zones, the fluid dynamics can be quite complex. Typically, the flow of solids can approach plug flow (well-mixed in the radial dimension) while the flow of vapor can approach fully mixed flow (fast transport in both radial and axial dimensions). Multiple inlet and outlet ports for vapor can contribute to overall mixing.

The pressure in each zone can be separately selected and controlled. The pressure of each zone can be independently selected from about 1 kPa to about 3000 kPa, such as about 101.3 kPa (normal atmospheric pressure). Independent zone control of pressure is possible when multiple gas inlets and outlets are used, including vacuum ports to withdraw gas when a zone pressure less than atmospheric is desired.

The process can conveniently be operated at atmospheric pressure, in some embodiments. There are many advantages associated with operation at atmospheric pressure, ranging from mechanical simplicity to enhanced safety. In certain embodiments, the pyrolysis zone is operated at a pressure of about 90 kPa, 95 kPa, 100 kPa, 101 kPa, 102 kPa, 105 kPa, or 110 kPa (absolute pressures).

Vacuum operation (e.g., 10-100 kPa) would promote fast sweeping of volatiles out of the system. Higher pressures (e.g., 100-1000 kPa) can be useful when the off-gases will be fed to a high-pressure operation. Elevated pressures can also be useful to promote heat transfer, chemistry, or separations.

The step of separating at least a portion of the condensable vapors and at least a portion of the non-condensable gases from the hot pyrolyzed solids can be accomplished in the reactor itself, or using a distinct separation unit. A substantially inert sweep gas can be introduced into one or more of the zones. Condensable vapors and non-condensable gases are then carried away from the zone(s) in the sweep gas, and out of the reactor.

The sweep gas can be $N_2$, Ar, CO, $CO_2$, $H_2$, $H_2O$, $CH_4$, other light hydrocarbons, or combinations thereof, for example. The sweep gas can first be preheated prior to introduction, or possibly cooled if it is obtained from a heated source.

The sweep gas more thoroughly removes volatile components, by getting them out of the system before they can condense or further react. The sweep gas allows volatiles to be removed at higher rates than would be attained merely from volatilization at a given process temperature. Or, use of the sweep gas allows milder temperatures to be used to remove a certain quantity of volatiles. The reason the sweep gas improves the volatiles removal is that the mechanism of separation is not merely relative volatility but rather liquid/vapor phase disengagement assisted by the sweep gas. The sweep gas can both reduce mass-transfer limitations of volatilization as well as reduce thermodynamic limitations by continuously depleting a given volatile species, to cause more of it to vaporize to attain thermodynamic equilibrium.

Some embodiments remove gases laden with volatile organic carbon from subsequent processing stages, in order to produce a product with high fixed carbon. Without removal, the volatile carbon can adsorb or absorb onto the pyrolyzed solids, thereby requiring additional energy (cost) to achieve a purer form of carbon which can be desired. By removing vapors quickly, it is also speculated that porosity can be enhanced in the pyrolyzing solids. Higher porosity is desirable for some products.

In certain embodiments, the sweep gas in conjunction with a relatively low process pressure, such as atmospheric pressure, provides for fast vapor removal without large amounts of inert gas necessary.

In some embodiments, the sweep gas flows countercurrent to the flow direction of feedstock. In other embodiments, the sweep gas flows cocurrent to the flow direction of feedstock. In some embodiments, the flow pattern of solids approaches plug flow while the flow pattern of the sweep gas, and gas phase generally, approaches fully mixed flow in one or more zones.

The sweep can be performed in any one or more of the reactor zones. In some embodiments, the sweep gas is introduced into the cooling zone and extracted (along with volatiles produced) from the cooling or pyrolysis zones. In some embodiments, the sweep gas is introduced into the pyrolysis zone and extracted from the pyrolysis or preheating zones. In some embodiments, the sweep gas is introduced into the preheating zone and extracted from the pyrolysis zone. In these or other embodiments, the sweep gas can be introduced into each of the preheating, pyrolysis, and cooling zones and also extracted from each of the zones.

In some embodiments, the zone or zones in which separation is carried out is a physically separate unit from the reactor. The separation unit or zone can be disposed between reactor zones, if desired. For example, there can be a separation unit placed between pyrolysis and cooling units.

The sweep gas can be introduced continuously, especially when the solids flow is continuous. When the pyrolysis reaction is operated as a batch process, the sweep gas can be introduced after a certain amount of time, or periodically, to remove volatiles. Even when the pyrolysis reaction is operated continuously, the sweep gas can be introduced semi-continuously or periodically, if desired, with suitable valves and controls.

The volatiles-containing sweep gas can exit from the one or more reactor zones, and can be combined if obtained from multiple zones. The resulting gas stream, containing various vapors, can then be fed to a thermal oxidizer for control of air emissions. Any known thermal-oxidation unit can be employed. In some embodiments, the thermal oxidizer is fed with natural gas and air, to reach sufficient temperatures for substantial destruction of volatiles contained therein.

The effluent of the thermal oxidizer will be a hot gas stream comprising water, carbon dioxide, and nitrogen. This effluent stream can be purged directly to air emissions, if desired. Preferably, the energy content of the thermal oxidizer effluent is recovered, such as in a waste-heat recovery unit. The energy content can also be recovered by heat exchange with another stream (such as the sweep gas). The energy content can be utilized by directly or indirectly heating, or assisting with heating, a unit elsewhere in the process, such as the dryer or the reactor. In some embodiments, essentially all of the thermal oxidizer effluent is employed for indirect heating (utility side) of the dryer. The thermal oxidizer can employ other fuels than natural gas.

The yield of carbonaceous material can vary, depending on the above-described factors including type of feedstock and process conditions. In some embodiments, the net yield of solids as a percentage of the starting feedstock, on a dry basis, is at least 25%, 30%, 35%, 40%, 45%, 50%, or higher. The remainder will be split between condensable vapors, such as terpenes, tars, alcohols, acids, aldehydes, or ketones; and non-condensable gases, such as carbon monoxide, hydrogen, carbon dioxide, and methane. The relative amounts of condensable vapors compared to non-condensable gases will also depend on process conditions, including the water present.

In terms of the carbon balance, in some embodiments the net yield of carbon as a percentage of starting carbon in the feedstock is at least 25%, 30%, 40%, 50%, 60%, 65%, 70%, 75%, 80%, or higher. For example, the in some embodiments the carbonaceous material contains between about 40% and about 70% of the carbon contained in the starting feedstock. The rest of the carbon results in the formation of methane, carbon monoxide, carbon dioxide, light hydrocarbons, aromatics, tars, terpenes, alcohols, acids, aldehydes, or ketones, to varying extents.

In alternative embodiments, some portion of these compounds is combined with the carbon-rich solids to enrich the carbon and energy content of the product. In these embodiments, some or all of the resulting gas stream from the reactor, containing various vapors, can be condensed, at least in part, and then passed over cooled pyrolyzed solids derived from the cooling zone or from the separate cooling unit. These embodiments are described in more detail below.

Following the reaction and cooling within the cooling zone (if present), the carbonaceous solids can be introduced into a distinct cooling unit. In some embodiments, solids are collected and simply allowed to cool at slow rates. If the carbonaceous solids are reactive or unstable in air, it can be desirable to maintain an inert atmosphere or rapidly cool the solids to, for example, a temperature less than 40° C., such as ambient temperature. In some embodiments, a water quench is employed for rapid cooling. In some embodiments, a fluidized-bed cooler is employed. A "cooling unit" should be broadly construed to also include containers, tanks, pipes, or portions thereof.

In some embodiments, the process further comprises operating the cooling unit to cool the warm pyrolyzed solids with steam, thereby generating the cool pyrolyzed solids and superheated steam; wherein the drying is carried out, at least in part, with the superheated steam derived from the cooling unit. Optionally, the cooling unit can be operated to first cool the warm pyrolyzed solids with steam to reach a first cooling-unit temperature, and then with air to reach a second cooling-unit temperature, wherein the second cooling-unit temperature is lower than the first cooling-unit temperature and is associated with a reduced combustion risk for the warm pyrolyzed solids in the presence of the air.

Following cooling to ambient conditions, the carbonaceous solids can be recovered and stored, conveyed to another site operation, transported to another site, or otherwise disposed, traded, or sold. The solids can be fed to a unit to reduce particle size. A variety of size-reduction units are known in the art, including crushers, shredders, grinders, pulverizers, jet mills, pin mills, and ball mills.

Screening or some other means for separation based on particle size can be included. The grinding can be upstream or downstream of grinding, if present. A portion of the screened material (e.g., large chunks) can be returned to the grinding unit. The small and large particles can be recovered for separate downstream uses. In some embodiments, cooled pyrolyzed solids are ground into a fine powder, such as a pulverized carbon or activated carbon product.

Various additives can be introduced throughout the process, before, during, or after any step disclosed herein. The additives can be broadly classified as process additives, selected to improve process performance such as carbon yield or pyrolysis time/temperature to achieve a desired carbon purity; and product additives, selected to improve one or more properties of the high-carbon biogenic reagent, or a downstream product incorporating the reagent. Certain additives can provide enhanced process and product (biogenic reagents or products containing biogenic reagents) characteristics.

Additives can be added before, during, or after any one or more steps of the process, including into the feedstock itself at any time, before or after it is harvested. Additive treatment can be incorporated prior to, during, or after feedstock sizing, drying, or other preparation. Additives can be incorporated at or on feedstock supply facilities, transport trucks, unloading equipment, storage bins, conveyors (including open or closed conveyors), dryers, process heaters, or any other units. Additives can be added anywhere into the pyrolysis process itself, using suitable means for introducing additives. Additives can be added after carbonization, or even after pulverization, if desired.

In some embodiments, an additive is a metal, a metal oxide, a metal hydroxide, or a combination thereof. For example, an additive can be selected from, but is by no means limited to, magnesium, manganese, aluminum, nickel, chromium, silicon, boron, cerium, molybdenum, phosphorus, tungsten, vanadium, iron chloride, iron bromide, magnesium oxide, dolomite, dolomitic lime, fluorite, fluorospar, bentonite, calcium oxide, lime, or a combination thereof.

In some embodiments, an additive is an acid, a base, or a salt thereof. For example, an additive can be selected from, but is by no means limited to, sodium hydroxide, potassium hydroxide, magnesium oxide, hydrogen bromide, hydrogen chloride, sodium silicate, potassium permanganate, or a combination thereof.

In some embodiments, an additive is a metal halide. Metal halides are compounds between metals and halogens (fluorine, chlorine, bromine, iodine, and astatine). The halogens can form many compounds with metals. Metal halides are generally obtained by direct combination, or more commonly, neutralization of basic metal salt with a hydrohalic acid. In some embodiments, an additive is iron chloride ($FeCl_2$ or $FeCl_3$), iron bromide ($FeBr_2$ or $FeBr_3$), or hydrates thereof, and any combinations thereof.

Additives can result in a final product with higher energy content (energy density). An increase in energy content can result from an increase in total carbon, fixed carbon, volatile carbon, or even hydrogen. Alternatively, or additionally, the increase in energy content can result from removal of non-combustible matter or of material having lower energy density than carbon. In some embodiments, additives reduce the extent of liquid formation, in favor of solid and gas formation, or in favor of solid formation.

Without being limited to any particular hypothesis, additives can chemically modify the starting biomass, or treated biomass prior to pyrolysis, to reduce rupture of cell walls for greater strength/integrity. In some embodiments, additives can increase fixed carbon content of biomass feedstock prior to pyrolysis.

Additives can result in a biogenic reagent with improved mechanical properties, such as yield strength, compressive strength, tensile strength, fatigue strength, impact strength, elastic modulus, bulk modulus, or shear modulus. Additives can improve mechanical properties by simply being present (e.g., the additive itself imparts strength to the mixture) or due to some transformation that takes place within the additive phase or within the resulting mixture. For example, reactions such as vitrification can occur within a portion of the biogenic reagent that includes the additive, thereby improving the final strength.

Chemical additives can be applied to wet or dry biomass feedstocks. The additives can be applied as a solid powder, a spray, a mist, a liquid, or a vapor. In some embodiments, additives can be introduced through spraying of a liquid solution (such as an aqueous solution or in a solvent), or by soaking in tanks, bins, bags, or other containers.

In certain embodiments, dip pretreatment is employed wherein the solid feedstock is dipped into a bath comprising the additive, either batchwise or continuously, for a time sufficient to allow penetration of the additive into the solid feed material.

In some embodiments, additives applied to the feedstock can reduce energy requirements for the pyrolysis, or increase the yield of the carbonaceous product. In these or other embodiments, additives applied to the feedstock can provide functionality that is desired for the intended use of the carbonaceous product.

The throughput, or process capacity, can vary widely from small laboratory-scale units to full operations, including any pilot, demonstration, or semi-commercial scale. In various embodiments, the process capacity (for feedstocks, products, or both) is at least about 1 kg/day, 10 kg/day, 100 kg/day, 1 ton/day (all tons are metric tons), 10 tons/day, 100 tons/day, 500 tons/day, 1000 tons/day, 2000 tons/day, or higher.

In some embodiments, a portion of solids produced can be recycled to the front end of the process, i.e. to the drying or deaeration unit or directly to the reactor. By returning to the front end and passing through the process again, treated solids can become higher in fixed carbon. Solid, liquid, and gas streams produced or existing within the process can be independently recycled, passed to subsequent steps, or removed/purged from the process at any point.

In some embodiments, pyrolyzed material is recovered and then fed to a separate unit for further pyrolysis, to create a product with higher carbon purity. In some embodiments, the secondary process can be conducted in a simple container, such as a steel drum, in which heated inert gas (such as heated $N_2$) is passed through. Other containers useful for this purpose include process tanks, barrels, bins, totes, sacks, and roll-offs. This secondary sweep gas with volatiles can be sent to the thermal oxidizer, or back to the main process reactor, for example. To cool the final product, another stream of inert gas, which is initially at ambient temperature for example, can be passed through the solids to cool the solids, and then returned to an inert gas preheat system.

Some variations of the disclosure utilize a high-carbon biogenic reagent production system comprising:
 a feeder configured to introduce a carbon-containing feedstock;
 a multiple-zone reactor, disposed in operable communication with the dryer, wherein the multiple-zone reactor comprises a pyrolysis zone disposed in operable communication with a spatially separated cooling zone, and wherein the multiple-zone reactor is configured with an outlet to remove condensable vapors and non-condensable gases from solids;
 a solids cooler, disposed in operable communication with the multiple-zone reactor; and
 a high-carbon biogenic reagent recovery unit, disposed in operable communication with the solids cooler.

In some embodiments, the system further comprises a dryer, disposed in operable communication with the feeder, configured to remove moisture comprised within the carbon-containing feedstock.

Some variations utilize a high-carbon biogenic reagent production system comprising:
 a feeder configured to introduce a carbon-containing feedstock;
 an optional dryer, disposed in operable communication with the feeder, configured to remove moisture contained within a carbon-containing feedstock;
 an optional preheater, disposed in operable communication with the dryer, configured to heat or mildly pyrolyze the feedstock;
 a pyrolysis reactor, disposed in operable communication with the preheater, configured to pyrolyze the feedstock;
 a cooler, disposed in operable communication with the pyrolysis reactor, configured to cool pyrolyzed solids; and
 a high-carbon biogenic reagent recovery unit, disposed in operable communication with the cooler,
 wherein the system is configured with at least one gas outlet to remove condensable vapors and non-condensable gases from solids.

The feeder can be physically integrated with the multiple-zone reactor, such as through the use of a screw feeder or auger mechanism to introduce feed solids into the first reaction zone.

In some embodiments, the system further comprises a preheating zone, disposed in operable communication with the pyrolysis zone. Each of the pyrolysis zone, cooling zone, and preheating zone (it present) can be located within a single unit, or can be located in separate units.

Optionally, the dryer can be configured as a drying zone within the multiple-zone reactor. Optionally, the solids cooler can be disposed within the multiple-zone reactor (i.e., configured as an additional cooling zone or integrated with the main cooling zone).

The system can include a purging means for removing oxygen from the system. For example, the purging means can comprise one or more inlets to introduce a substantially inert gas, and one or more outlets to remove the substantially inert gas and displaced oxygen from the system. In some embodiments, the purging means is a deaerater disposed in operable communication between the dryer and the multiple-zone reactor.

The multiple-zone reactor is preferably configured with at least a first gas inlet and a first gas outlet. The first gas inlet and the first gas outlet can be disposed in communication with different zones, or with the same zone.

In some embodiments, the multiple-zone reactor is configured with a second gas inlet or a second gas outlet. In some embodiments, the multiple-zone reactor is configured with a third gas inlet or a third gas outlet. In some embodiments, the multiple-zone reactor is configured with a fourth gas inlet or a fourth gas outlet. In some embodiments, each zone present in the multiple-zone reactor is configured with a gas inlet and a gas outlet.

Gas inlets and outlets allow not only introduction and withdrawal of vapor, but gas outlets (probes) in particular allow precise process monitoring and control across various stages of the process, up to and potentially including all stages of the process. Precise process monitoring would be expected to result in yield and efficiency improvements, both dynamically as well as over a period of time when operational history can be utilized to adjust process conditions.

In preferred embodiments, a reaction gas probe is disposed in operable communication with the pyrolysis zone. Such a reaction gas probe can be useful to extract gases and analyze them, in order to determine extent of reaction, pyrolysis selectivity, or other process monitoring. Then, based on the measurement, the process can be controlled or adjusted in any number of ways, such as by adjusting feed rate, rate of inert gas sweep, temperature (of one or more zones), pressure (of one or more zones), additives, and so on.

As intended herein, "monitor and control" via reaction gas probes includes any one or more sample extractions via reaction gas probes, and optionally making process or equipment adjustments based on the measurements, if deemed necessary or desirable, using well-known principles of process control (feedback, feedforward, proportional-integral-derivative logic, etc.).

A reaction gas probe can be configured to withdraw gas samples in a number of ways. For example, a sampling line can have a lower pressure than the pyrolysis reactor pressure, so that when the sampling line is opened an amount of gas can readily be withdrawn from pyrolysis zone. The sampling line can be under vacuum, such as when the pyrolysis zone is near atmospheric pressure. Typically, a reaction gas probe will be associated with one gas output, or a portion thereof (e.g., a line split from a gas output line).

In some embodiments, both a gas input and a gas output are utilized as a reaction gas probe by periodically introducing an inert gas into a zone, and pulling the inert gas with a process sample out of the gas output ("sample sweep"). Such an arrangement could be used in a zone that does not otherwise have a gas inlet/outlet for the substantially inert gas for processing, or, the reaction gas probe could be associated with a separate gas inlet/outlet that is in addition to process inlets and outlets. A sampling inert gas that is introduced and withdrawn periodically for sampling (in embodiments that utilize sample sweeps) could even be different than the process inert gas, if desired, either for reasons of accuracy in analysis or to introduce an analytical tracer.

For example, acetic acid concentration in the gas phase of the pyrolysis zone can be measured using a gas probe to extract a sample, which is then analyzed using a suitable technique (such as gas chromatography, GC; mass spectroscopy, MS; GC-MS, or Fourier-Transform Infrared Spectroscopy, FTIR). CO or $CO_2$ concentration in the gas phase could be measured and used as an indication of the pyrolysis selectivity toward gases/vapors, for example. Turpene concentration in the gas phase could be measured and used as an indication of the pyrolysis selectivity toward liquids, for example.

In some embodiments, the system further comprises at least one additional gas probe disposed in operable communication with the cooling zone, or with the drying zone (if present) or the preheating zone (if present).

A gas probe for the cooling zone could be useful to determine the extent of any additional chemistry taking place in the cooling zone, for example. A gas probe in the cooling zone could also be useful as an independent measurement of temperature (in addition, for example, to a thermocouple disposed in the cooling zone). This independent measurement can be a correlation of cooling temperature with a measured amount of a certain species. The correlation could be separately developed, or could be established after some period of process operation.

A gas probe for the drying zone could be useful to determine the extent of drying, by measuring water content, for example. A gas probe in the preheating zone could be useful to determine the extent of any mild pyrolysis taking place, for example.

In certain embodiments, the cooling zone is configured with a gas inlet, and the pyrolysis zone is configured with a gas outlet, to generate substantially countercurrent flow of the gas phase relative to the solid phase. Alternatively, or additionally, the preheating zone (when it is present) can be configured with a gas outlet, to generate substantially countercurrent flow of the gas phase relative to the solid phase. Alternatively, or additionally, the drying zone can be configured with a gas outlet, to generate substantially countercurrent flow.

The pyrolysis reactor or reactors can be selected from any suitable reactor configuration that is capable of carrying out the pyrolysis process. Exemplary reactor configurations include, but are not limited to, fixed-bed reactors, fluidized-bed reactors, entrained-flow reactors, augers, ablative reactors, rotating cones, rotary drum kilns, calciners, roasters, moving-bed reactors, transport-bed reactors, ablative reactors, rotating cones, or microwave-assisted pyrolysis reactors.

In some embodiments in which an auger is used, sand or another heat carrier can optionally be employed. For example, the feedstock and sand can be fed at one end of a screw. The screw mixes the sand and feedstock and conveys them through the reactor. The screw can provide good control of the feedstock residence time and does not dilute the pyrolyzed products with a carrier or fluidizing gas. The sand can be reheated in a separate vessel.

In some embodiments in which an ablative process is used, the feedstock is moved at a high speed against a hot metal surface. Ablation of any char forming at surfaces can maintain a high rate of heat transfer. Such apparatus can prevent dilution of products. As an alternative, the feedstock particles can be suspended in a carrier gas and introduced at a high speed through a cyclone whose wall is heated.

In some embodiments in which a fluidized-bed reactor is used, the feedstock can be introduced into a bed of hot sand fluidized by a gas, which is typically a recirculated product gas. Reference herein to "sand" shall also include similar, substantially inert materials, such as glass particles, recovered ash particles, and the like. High heat-transfer rates from fluidized sand can result in rapid heating of the feedstock. There can be some ablation by attrition with the sand particles. Heat is usually provided by heat-exchanger tubes through which hot combustion gas flows.

Circulating fluidized-bed reactors can be employed, wherein gas, sand, and feedstock move together. Exemplary transport gases include recirculated product gases and combustion gases. High heat-transfer rates from the sand ensure rapid heating of the feedstock, and ablation is expected to be stronger than with regular fluidized beds. A separator can be employed to separate the product gases from the sand and char particles. The sand particles can be reheated in a fluidized burner vessel and recycled to the reactor.

In some embodiments, a multiple-zone reactor is a continuous reactor comprising a feedstock inlet, a plurality of spatially separated reaction zones configured for separately controlling the temperature and mixing within each of the reaction zones, and a carbonaceous-solids outlet, wherein one of the reaction zones is configured with a first gas inlet for introducing a substantially inert gas into the reactor, and wherein one of the reaction zones is configured with a first gas outlet.

In various embodiments the reactor includes at least two, three, four, or more reaction zones. Each of the reaction zones is disposed in communication with separately adjustable heating means independently selected from electrical heat transfer, steam heat transfer, hot-oil heat transfer, phase-change heat transfer, waste heat transfer, or a combination thereof. In some embodiments, at least one reactor zone is heated with an effluent stream from the thermal oxidizer, if present.

The reactor can be configured for separately adjusting gas-phase composition and gas-phase residence time of at least two reaction zones, up to and including all reaction zones present in the reactor.

The reactor can be equipped with a second gas inlet or a second gas outlet. In some embodiments, the reactor is configured with a gas inlet in each reaction zone. In these or other embodiments, the reactor is configured with a gas outlet in each reaction zone. The reactor can be a cocurrent or countercurrent reactor.

In some embodiments, the feedstock inlet comprises a screw or auger feed mechanism. In some embodiments, the carbonaceous-solids outlet comprises a screw or auger output mechanism.

Certain embodiments utilize a rotating calciner with a screw feeder. In these embodiments, the reactor is axially rotatable, i.e. it spins about its centerline axis. The speed of rotation will impact the solid flow pattern, and heat and mass transport. Each of the reaction zones can be configured with flights disposed on internal walls, to provide agitation of solids. The flights can be separately adjustable in each of the reaction zones.

Other means of agitating solids can be employed, such as augers, screws, or paddle conveyors. In some embodiments, the reactor includes a single, continuous auger disposed throughout each of the reaction zones. In other embodiments, the reactor includes twin screws disposed throughout each of the reaction zones.

Some systems are designed specifically with the capability to maintain the approximate size of feed material throughout the process—that is, to process the biomass feedstock without destroying or significantly damaging its structure. In some embodiments, the pyrolysis zone does not contain augers, screws, or rakes that would tend to greatly reduce the size of feed material being pyrolyzed.

In some embodiments of the disclosure, the system further includes a thermal oxidizer disposed in operable communication with the outlet at which condensable vapors and non-condensable gases are removed. The thermal oxidizer is preferably configured to receive a separate fuel (such as natural gas) and an oxidant (such as air) into a combustion chamber, adapted for combustion of the fuel and at least a portion of the condensable vapors. Certain non-condensable gases can also be oxidized, such as CO or $CH_4$, to $CO_2$.

When a thermal oxidizer is employed, the system can include a heat exchanger disposed between the thermal oxidizer and the dryer, configured to utilize at least some of the heat of the combustion for the dryer. This embodiment can contribute significantly to the overall energy efficiency of the process.

In some embodiments, the system further comprises a carbon-enhancement unit, disposed in operable communication with the solids cooler, configured for combining condensable vapors, in at least partially condensed form, with the solids. The carbon-enhancement unit can increase the carbon content of the high-carbon biogenic reagent obtained from the recovery unit.

The system can further include a separate pyrolysis unit adapted to further pyrolyze the high-carbon biogenic reagent to further increase its carbon content. The separate pyrolysis unit can be a relatively simply container, unit, or device, such as a tank, barrel, bin, drum, tote, sack, or roll-off.

The overall system can be at a fixed location, or it can be distributed at several locations. The system can be constructed using modules which can be simply duplicated for practical scale-up. The system can also be constructed using economy-of-scale principles, as is well-known in the process industries.

Some variations relating to carbon enhancement of solids will now be further described. In some embodiments, a process for producing a high-carbon biogenic reagent comprises:

(a) providing a carbon-containing feedstock comprising biomass;
(b) optionally drying the feedstock to remove at least a portion of moisture contained within the feedstock;
(c) optionally deaerating the feedstock to remove at least a portion of interstitial oxygen, if any, contained with the feedstock;
(d) in a pyrolysis zone, pyrolyzing the feedstock in the presence of a substantially inert gas for at least 10 minutes and with a pyrolysis temperature selected from about 250° C. to about 700° C., to generate hot pyrolyzed solids, condensable vapors, and non-condensable gases;
(e) separating at least a portion of the condensable vapors and at least a portion of the non-condensable gases from the hot pyrolyzed solids;
(f) in a cooling zone, cooling the hot pyrolyzed solids, in the presence of the substantially inert gas for at least 5 minutes and with a cooling temperature less than the pyrolysis temperature, to generate warm pyrolyzed solids;
(g) optionally cooling the warm pyrolyzed solids to generate cool pyrolyzed solids;
(h) subsequently passing at least a portion of the condensable vapors or at least a portion of the non-condensable gases from step (e) across the warm pyrolyzed solids or the cool pyrolyzed solids, to form enhanced pyrolyzed solids with increased carbon content; and
(i) recovering a high-carbon biogenic reagent comprising at least a portion of the enhanced pyrolyzed solids.

In some embodiments, step (h) includes passing at least a portion of the condensable vapors from step (e), in vapor or condensed form, across the warm pyrolyzed solids, to produce enhanced pyrolyzed solids with increased carbon content. In some embodiments, step (h) includes passing at least a portion of the non-condensable gases from step (e) across the warm pyrolyzed solids, to produce enhanced pyrolyzed solids with increased carbon content.

Alternatively, or additionally, vapors or gases can be contacted with the cool pyrolyzed solids. In some embodiments, step (h) includes passing at least a portion of the condensable vapors from step (e), in vapor or condensed form, across the cool pyrolyzed solids, to produce enhanced pyrolyzed solids with increased carbon content. In some embodiments, step (h) includes passing at least a portion of the non-condensable gases from step (e) across the cool pyrolyzed solids, to produce enhanced pyrolyzed solids with increased carbon content.

In certain embodiments, step (h) includes passing substantially all of the condensable vapors from step (e), in vapor or condensed form, across the cool pyrolyzed solids, to produce enhanced pyrolyzed solids with increased carbon content. In certain embodiments, step (h) includes passing substantially all of the non-condensable gases from step (e) across the cool pyrolyzed solids, to produce enhanced pyrolyzed solids with increased carbon content.

The process can include various methods of treating or separating the vapors or gases prior to using them for carbon enhancement. For example, an intermediate feed stream consisting of at least a portion of the condensable vapors and at least a portion of the non-condensable gases, obtained from step (e), can be fed to a separation unit configured to generate at least first and second output streams. In certain embodiments, the intermediate feed stream comprises all of the condensable vapors, all of the non-condensable gases, or both.

Separation techniques can include or use distillation columns, flash vessels, centrifuges, cyclones, membranes, filters, packed beds, capillary columns, and so on. Separation can be principally based, for example, on distillation, absorption, adsorption, or diffusion, and can utilize differences in vapor pressure, activity, molecular weight, density, viscosity, polarity, chemical functionality, affinity to a stationary phase, and any combinations thereof.

In some embodiments, the first and second output streams are separated from the intermediate feed stream based on relative volatility. For example, the separation unit can be a distillation column, a flash tank, or a condenser.

Thus in some embodiments, the first output stream comprises the condensable vapors, and the second output stream comprises the non-condensable gases. The condensable vapors can include at least one carbon-containing compound selected from terpenes, alcohols, acids, aldehydes, or ketones. The vapors from pyrolysis can include aromatic compounds such as benzene, toluene, ethylbenzene, and xylenes. Heavier aromatic compounds, such as refractory tars, can be present in the vapor. The non-condensable gases can include at least one carbon-containing molecule selected from carbon monoxide, carbon dioxide, and methane.

In some embodiments, the first and second output streams are separated intermediate feed stream based on relative polarity. For example, the separation unit can be a stripping column, a packed bed, a chromatography column, or membranes.

Thus in some embodiments, the first output stream comprises polar compounds, and the second output stream comprises non-polar compounds. The polar compounds can include at least one carbon-containing molecule selected from methanol, furfural, and acetic acid. The non-polar compounds can include at least one carbon-containing molecule selected from carbon monoxide, carbon dioxide, methane, a turpene, and a turpene derivative.

Step (h) can increase the total carbon content of the high-carbon biogenic reagent, relative to an otherwise-identical process without step (h). The extent of increase in carbon content can be, for example, about 1%, 2%, 5%, 10%, 15%, 25%, or even higher, in various embodiments.

In some embodiments, step (h) increases the fixed carbon content of the high-carbon biogenic reagent. In these or other embodiments, step (h) increases the volatile carbon content of the high-carbon biogenic reagent. Volatile carbon content is the carbon attributed to volatile matter in the reagent. The volatile matter can be, but is not limited to, hydrocarbons including aliphatic or aromatic compounds (e.g., terpenes); oxygenates including alcohols, aldehydes, or ketones; and various tars. Volatile carbon will typically remain bound or adsorbed to the solids at ambient conditions but upon heating, will be released before the fixed carbon would be oxidized, gasified, or otherwise released as a vapor.

Depending on conditions associated with step (h), it is possible for some amount of volatile carbon to become fixed carbon (e.g., via Boudouard carbon formation from CO). Typically, the volatile matter will enter the micropores of the fixed carbon and will be present as condensed/adsorbed species, but remain relatively volatile. This residual volatility can be more advantageous for fuel applications, compared to product applications requiring high surface area and porosity.

Step (h) can increase the energy content (i.e., energy density) of the high-carbon biogenic reagent. The increase in energy content can result from an increase in total carbon, fixed carbon, volatile carbon, or even hydrogen. The extent of increase in energy content can be, for example, about 1%, 2%, 5%, 10%, 15%, 25%, or even higher, in various embodiments.

Further separations can be employed to recover one or more non-condensable gases or condensable vapors, for use within the process or further processing. For example, further processing can be included to produce refined carbon monoxide or hydrogen.

As another example, separation of acetic acid can be conducted, followed by reduction of the acetic acid into ethanol. The reduction of the acetic acid can be accomplished, at least in part, using hydrogen derived from the non-condensable gases produced.

Condensable vapors can be used for either energy in the process (such as by thermal oxidation) or in carbon enrichment, to increase the carbon content of the high-carbon biogenic reagent. Certain non-condensable gases, such as CO or $CH_4$, can be utilized either for energy in the process, or as part of the substantially inert gas for the pyrolysis step. Combinations of any of the foregoing are also possible.

A potential benefit of including step (h) is that the gas stream is scrubbed, with the resulting gas stream being enriched in CO and $CO_2$. The resulting gas stream can be utilized for energy recovery, recycled for carbon enrichment of solids, or used as an inert gas in the reactor. Similarly, by separating non-condensable gases from condensable vapors, the $CO/CO_2$ stream is prepared for use as the inert gas in the reactor system or in the cooling system, for example.

Other variations are premised on the realization that the principles of the carbon-enhancement step can be applied to any feedstock in which it is desired to add carbon.

In some embodiments, a batch or continuous process for producing a high-carbon biogenic reagent comprises:

(a) providing a solid stream comprising a carbon-containing material;

(b) providing a gas stream comprising condensable carbon-containing vapors, non-condensable carbon-containing gases, or a mixture of condensable carbon-containing vapors and non-condensable carbon-containing gases; and (c) passing the gas stream across the solid stream under suitable conditions to form a carbon-containing product with increased carbon content relative to the carbon-containing material.

In some embodiments, the starting carbon-containing material is pyrolyzed biomass or torrefied biomass. The gas stream can be obtained during an integrated process that provides the carbon-containing material. Or, the gas stream can be obtained from separate processing of the carbon-containing material. The gas stream, or a portion thereof, can be obtained from an external source (e.g., an oven at a lumber mill). Mixtures of gas streams, as well as mixtures of carbon-containing materials, from a variety of sources, are possible.

In some embodiments, the process further comprises recycling or reusing the gas stream for repeating the process to further increase carbon or energy content of the carbon-containing product. In some embodiments, the process further comprises recycling or reusing the gas stream for carrying out the process to increase carbon or energy content of another feedstock different from the carbon-containing material.

In some embodiments, the process further includes introducing the gas stream to a separation unit configured to generate at least first and second output streams, wherein the gas stream comprises a mixture of condensable carbon-containing vapors and non-condensable carbon-containing gases. The first and second output streams can be separated based on relative volatility, relative polarity, or any other property. The gas stream can be obtained from separate processing of the carbon-containing material.

In some embodiments, the process further comprises recycling or reusing the gas stream for repeating the process to further increase carbon content of the carbon-containing product. In some embodiments, the process further comprises recycling or reusing the gas stream for carrying out the process to increase carbon content of another feedstock.

The carbon-containing product can have an increased total carbon content, a higher fixed carbon content, a higher volatile carbon content, a higher energy content, or any combination thereof, relative to the starting carbon-containing material.

In related variations, a high-carbon biogenic reagent production system comprises:

(a) a feeder configured to introduce a carbon-containing feedstock;

(b) an optional dryer, disposed in operable communication with the feeder, configured to remove moisture contained within a carbon-containing feedstock;

(c) a multiple-zone reactor, disposed in operable communication with the dryer, wherein the multiple-zone reactor contains at least a pyrolysis zone disposed in operable communication with a spatially separated cooling zone, and wherein the multiple-zone reactor is configured with an outlet to remove condensable vapors and non-condensable gases from solids;

(d) a solids cooler, disposed in operable communication with the multiple-zone reactor;

(e) a material-enrichment unit, disposed in operable communication with the solids cooler, configured to pass the condensable vapors or the non-condensable gases across the solids, to form enhanced solids with increased carbon content; and (f) a high-carbon biogenic reagent recovery unit, disposed in operable communication with the material-enrichment unit.

The system can further comprise a preheating zone, disposed in operable communication with the pyrolysis zone. In some embodiments, the dryer is configured as a drying zone within the multiple-zone reactor. Each of the zones can be located within a single unit or in separate units. Also, the solids cooler can be disposed within the multiple-zone reactor.

In some embodiments, the cooling zone is configured with a gas inlet, and the pyrolysis zone is configured with a gas outlet, to generate substantially countercurrent flow of the gas phase relative to the solid phase. In these or other embodiments, the preheating zone or the drying zone (or dryer) is configured with a gas outlet, to generate substantially countercurrent flow of the gas phase relative to the solid phase.

In particular embodiments, the system incorporates a material-enrichment unit that comprises:

(i) a housing with an upper portion and a lower portion;
(ii) an inlet at a bottom of the lower portion of the housing configured to carry the condensable vapors and non-condensable gases;
(iii) an outlet at a top of the upper portion of the housing configured to carry a concentrated gas stream derived from the condensable vapors and non-condensable gases;
(iv) a path defined between the upper portion and the lower portion of the housing; and
(v) a transport system following the path, the transport system configured to transport the solids, wherein the housing is shaped such that the solids adsorb at least some of the condensable vapors or at least some of the non-condensable gases.

The present disclosure is capable of producing a variety of compositions useful as high-carbon biogenic reagents, and products incorporating such reagents. In some variations, a high-carbon biogenic reagent is produced by any process disclosed herein, such as a process comprising the steps of:

(a) providing a carbon-containing feedstock comprising biomass;
(b) optionally drying the feedstock to remove at least a portion of moisture contained within the feedstock;
(c) optionally deaerating the feedstock to remove at least a portion of interstitial oxygen, if any, contained with the feedstock;
(d) in a pyrolysis zone, pyrolyzing the feedstock in the presence of a substantially inert gas for at least 10 minutes and with a pyrolysis temperature selected from about 250° C. to about 700° C., to generate hot pyrolyzed solids, condensable vapors, and non-condensable gases;
(e) separating at least a portion of the condensable vapors and at least a portion of the non-condensable gases from the hot pyrolyzed solids;
(f) in a cooling zone, cooling the hot pyrolyzed solids, in the presence of the substantially inert gas for at least 5 minutes and with a cooling temperature less than the pyrolysis temperature, to generate warm pyrolyzed solids;
(g) cooling the warm pyrolyzed solids to generate cool pyrolyzed solids; and
(h) recovering a high-carbon biogenic reagent comprising at least a portion of the cool pyrolyzed solids.

In some embodiments, the reagent comprises about at least 70 wt %, at least 80 wt %, at least 90 wt %, or at least 95 wt % total carbon on a dry basis. The total carbon includes at least fixed carbon, and can further include carbon from volatile matter. In some embodiments, carbon from volatile matter is about at least 5%, at least 10%, at least 25%, or at least 50% of the total carbon present in the high-carbon biogenic reagent. Fixed carbon can be measured using ASTM D3172, while volatile carbon can be measured using ASTM D3175, for example.

The high-carbon biogenic reagent can comprise about 10 wt % or less, such as about 5 wt % or less, hydrogen on a dry basis. The biogenic reagent can comprise about 1 wt % or less, such as about 0.5 wt % or less, nitrogen on a dry basis. The biogenic reagent can comprise about 0.5 wt % or less, such as about 0.2 wt % or less, phosphorus on a dry basis. The biogenic reagent can comprise about 0.2 wt % or less, such as about 0.1 wt % or less, sulfur on a dry basis.

Carbon, hydrogen, and nitrogen can be measured using ASTM D5373 for ultimate analysis, for example. Oxygen can be measured using ASTM D3176, for example. Sulfur can be measured using ASTM D3177, for example.

Certain embodiments provide reagents with little or essentially no hydrogen (except from any moisture that can be present), nitrogen, phosphorus, or sulfur, and are substantially carbon plus any ash and moisture present. Therefore, some embodiments provide a biogenic reagent with up to and including 100% carbon, on a dry/ash-free (DAF) basis.

Biomass feedstocks comprise non-volatile species, including silica and various metals, which are not readily released during pyrolysis. It is of course possible to utilize ash-free feedstocks, in which case there should not be substantial quantities of ash in the pyrolyzed solids. Ash can be measured using ASTM D3174, for example.

Various amounts of non-combustible matter, such as ash, can be present. The high-carbon biogenic reagent can comprise about 10 wt % or less, such as about 5 wt %, about 2 wt %, about 1 wt % or less non-combustible matter on a dry basis. In certain embodiments, the reagent contains little ash, or even essentially no ash or other non-combustible matter. Therefore, some embodiments provide essentially pure carbon, including 100% carbon, on a dry basis.

Various amounts of moisture can be present. On a total mass basis, the high-carbon biogenic reagent can comprise at least 1 wt %, 2 wt %, 5 wt %, 10 wt %, 15 wt %, 25 wt %, 35 wt %, 50 wt %, or more moisture. As intended herein, "moisture" is to be construed as including any form of water present in the biogenic reagent, including absorbed moisture, adsorbed water molecules, chemical hydrates, and physical hydrates. The equilibrium moisture content can vary at least with the local environment, such as the relative humidity. Also, moisture can vary during transportation, preparation for use, and other logistics. Moisture can be measured using ASTM D3173, for example.

The high-carbon biogenic reagent can have various energy contents which for present purposes means the energy density based on the higher heating value associated with total combustion of the bone-dry reagent. For example, the high-carbon biogenic reagent can possess an energy content of about at least 11,000 Btu/lb, at least 12,000 Btu/lb, at least 13,000 Btu/lb, at least 14,000 Btu/lb, or at least 15,000 Btu/lb. In certain embodiments, the energy content is between about 14,000-15,000 Btu/lb. The energy content can be measured using ASTM D5865, for example.

The high-carbon biogenic reagent can be formed into a powder, such as a coarse powder or a fine powder. For example, the reagent can be formed into a powder with an average mesh size of about 200 mesh, about 100 mesh, about 50 mesh, about 10 mesh, about 6 mesh, about 4 mesh, or about 2 mesh, in embodiments.

In some embodiments, the high-carbon biogenic reagent is formed into structural objects comprising pressed, binded, or agglomerated particles. The starting material to form these objects can be a powder form of the reagent, such as an intermediate obtained by particle-size reduction. The objects can be formed by mechanical pressing or other forces, optionally with a binder or other means of agglomerating particles together.

In some embodiments, the high-carbon biogenic reagent is produced in the form of structural objects whose structure substantially derives from the feedstock. For example, feedstock chips can produce product chips of high-carbon biogenic reagent. Or, feedstock cylinders can produce high-carbon biogenic reagent cylinders, which can be somewhat smaller but otherwise maintain the basic structure and geometry of the starting material.

A high-carbon biogenic reagent according to the present disclosure can be produced as, or formed into, an object that has a minimum dimension of at least about 1 cm, 2 cm, 3 cm, 4 cm, 5 cm, 6 cm, 7 cm, 8 cm, 9 cm, 10 cm, or higher. In various embodiments, the minimum dimension or maximum dimension can be a length, width, or diameter.

Other variations of the disclosure relate to the incorporation of additives into the process, into the product, or both. In some embodiments, the high-carbon biogenic reagent includes at least one process additive incorporated during the process. In these or other embodiments, the reagent includes at least one product additive introduced to the reagent following the process.

In some embodiments, a high-carbon biogenic reagent comprises, on a dry basis:
at least about 70 wt % total carbon;
at most about 5 wt % hydrogen;
at most about 1 wt % nitrogen;
at most about 0.5 wt % phosphorus;
at most about 0.2 wt % sulfur; and
an additive selected from a metal, a metal oxide, a metal hydroxide, a metal halide, or a combination thereof.

The additive can be selected from, but is by no means limited to, magnesium, manganese, aluminum, nickel, chromium, silicon, boron, cerium, molybdenum, phosphorus, tungsten, vanadium, iron chloride, iron bromide, magnesium oxide, dolomite, dolomitic lime, fluorite, fluorospar, bentonite, calcium oxide, lime, or a combination thereof.

In some embodiments, a high-carbon biogenic reagent comprises, on a dry basis:
at least about 70 wt % total carbon;
at most about 5 wt % hydrogen;
at most about 1 wt % nitrogen;
at most about 0.5 wt % phosphorus;
at most about 0.2 wt % sulfur; and
an additive selected from an acid, a base, or a salt thereof.

The additive can be selected from, but is by no means limited to, sodium hydroxide, potassium hydroxide, magnesium oxide, hydrogen bromide, hydrogen chloride, sodium silicate, potassium permanganate, or combinations thereof.

In certain embodiments, a high-carbon biogenic reagent comprises, on a dry basis:
at most about 70 wt % total carbon;
at most about 5 wt % hydrogen;
at most about 1 wt % nitrogen;
at most about 0.5 wt % phosphorus;
at most about 0.2 wt % sulfur;
a first additive selected from a metal, metal oxide, metal hydroxide, a metal halide, or a combination thereof; and
a second additive selected from an acid, a base, or a salt thereof,
wherein the first additive is different from the second additive.

The first additive can be selected from magnesium, manganese, aluminum, nickel, chromium, silicon, boron, cerium, molybdenum, phosphorus, tungsten, vanadium, iron chloride, iron bromide, magnesium oxide, dolomite, dolomitic lime, fluorite, fluorospar, bentonite, calcium oxide, lime, or a combination thereof, while the second additive can be independently selected from sodium hydroxide, potassium hydroxide, magnesium oxide, hydrogen bromide, hydrogen chloride, sodium silicate, potassium permanganate, or combinations thereof.

A certain high-carbon biogenic reagent consists essentially of, on a dry basis, carbon, hydrogen, nitrogen, phosphorus, sulfur, non-combustible matter, and an additive selected from magnesium, manganese, aluminum, nickel, chromium, silicon, boron, cerium, molybdenum, phosphorus, tungsten, vanadium, iron chloride, iron bromide, magnesium oxide, dolomite, dolomitic lime, fluorite, fluorospar, bentonite, calcium oxide, lime, or a combination thereof.

A certain high-carbon biogenic reagent consists essentially of, on a dry basis, carbon, hydrogen, nitrogen, phosphorus, sulfur, non-combustible matter, and an additive selected from sodium hydroxide, potassium hydroxide, magnesium oxide, hydrogen bromide, hydrogen chloride, sodium silicate, or a combination thereof.

The amount of additive (or total additives) can vary widely, such as from about 0.01 wt % to about 25 wt %, including about 0.1 wt %, about 1 wt %, about 5 wt %, about 10 wt %, or about 20 wt %. It will be appreciated then when relatively large amounts of additives are incorporated, such as higher than about 1 wt %, there will be a reduction in energy content calculated on the basis of the total reagent weight (inclusive of additives). Still, in various embodiments, the high-carbon biogenic reagent with additive(s) can possess an energy content of about at least 11,000 Btu/lb, at least 12,000 Btu/lb, at least 13,000 Btu/lb, at least 14,000 Btu/lb, or at least 15,000 Btu/lb.

The above discussion regarding product form applies also to embodiments that incorporate additives. In fact, certain embodiments incorporate additives as binding agents, fluxing agents, or other modifiers to enhance final properties for a particular application.

In preferred embodiments, the majority of carbon contained in the high-carbon biogenic reagent is classified as renewable carbon. In some embodiments, substantially all of the carbon is classified as renewable carbon. There can be certain market mechanisms (e.g., Renewable Identification Numbers, tax credits, etc.) wherein value is attributed to the renewable carbon content within the high-carbon biogenic reagent.

In certain embodiments, the fixed carbon can be classified as non-renewable carbon (e.g., from coal) while the volatile carbon, which can be added separately, can be renewable carbon to increase not only energy content but also renewable carbon value.

The high-carbon biogenic reagents produced as described herein is useful for a wide variety of carbonaceous products. The high-carbon biogenic reagent can be a desirable market product itself. High-carbon biogenic reagents as provided herein are associated with lower levels of impurities, reduced process emissions, and improved sustainability (including higher renewable carbon content) compared to the state of the art.

In variations, a product includes any of the high-carbon biogenic reagents that can be obtained by the disclosed processes, or that are described in the compositions set forth herein, or any portions, combinations, or derivatives thereof.

Generally speaking, the high-carbon biogenic reagents can be combusted to produce energy (including electricity and heat); partially oxidized, gasified, or steam-reformed to produce syngas; utilized for their adsorptive or absorptive properties; utilized for their reactive properties during metal refining (such as reduction of metal oxides, such as according to the present disclosure) or other industrial processing; or utilized for their material properties in carbon steel and various other metal alloys. Essentially, the high-carbon biogenic reagents can be utilized for any market application of carbon-based commodities or advanced materials, including specialty uses to be developed.

Prior to suitability or actual use in any product applications, the disclosed high-carbon biogenic reagents can be analyzed, measured, and optionally modified (such as through additives) in various ways. Some properties of potential interest, other than chemical composition and energy content, include density, particle size, surface area, microporosity, absorptivity, adsorptivity, binding capacity, reactivity, desulfurization activity, and basicity, to name a few properties.

Products or materials that can incorporate these high-carbon biogenic reagents include, but are by no means limited to, carbon-based blast furnace addition products, carbon-based taconite pellet addition products, ladle addition carbon-based products, met coke carbon-based products, coal replacement products, carbon-based coking products, carbon breeze products, fluidized-bed carbon-based feedstocks, carbon-based furnace addition products, injectable carbon-based products, pulverized carbon-based products, stoker carbon-based products, carbon electrodes, or activated carbon products.

Use of the disclosed high-carbon biogenic reagents in metals production can reduce slag, increase overall efficiency, and reduce lifecycle environmental impacts. Therefore, embodiments of this disclosure are particularly well-suited for metal processing and manufacturing.

Some variations of the disclosure utilize the high-carbon biogenic reagents as carbon-based blast furnace addition products. A blast furnace is a type of metallurgical furnace used for smelting to produce industrial metals, such as (but not limited to) iron. Smelting is a form of extractive metallurgy; its main use is to produce a metal from its ore. Smelting uses heat and a chemical reducing agent to decompose the ore. The carbon or the carbon monoxide derived from the carbon removes oxygen from the ore, leaving behind elemental metal.

The reducing agent can consist of, or comprise, a high-carbon biogenic reagent. In a blast furnace, high-carbon biogenic reagent, ore, and typically limestone can be continuously supplied through the top of the furnace, while air (optionally with oxygen enrichment) is blown into the bottom of the chamber, so that the chemical reactions take place throughout the furnace as the material moves downward. The end products are usually molten metal and slag phases tapped from the bottom, and flue gases exiting from the top of the furnace. The downward flow of the ore in contact with an upflow of hot, carbon monoxide-rich gases is a countercurrent process.

Carbon quality in the blast furnace is measured by its resistance to degradation. The role of the carbon as a permeable medium is crucial in economic blast furnace operation. The degradation of the carbon varies with the position in the blast furnace and involves the combination of reaction with $CO_2$, $H_2O$, or $O_2$ and the abrasion of carbon particles against each other and other components of the burden. Degraded carbon particles can cause plugging and poor performance.

The Coke Reactivity test is a highly regarded measure of the performance of carbon in a blast furnace. This test has two components: the Coke Reactivity Index (CRI) and the Coke Strength after Reaction (CSR). A carbon-based material with a low CRI value (high reactivity) and a high CSR value is preferable for better blast furnace performance. CRI can be determined according to any suitable method known in the art, for example by ASTM Method DS341 on an as-received basis.

In some embodiments, the high-carbon biogenic reagent provides a carbon product having suitable properties for introduction directly into a blast furnace.

The strength of the high-carbon biogenic reagent can be determined by any suitable method known in the art, for example by a drop-shatter test, or a CSR test. In some embodiments, the high-carbon biogenic reagent, optionally when blended with another source of carbon, provides a final carbon product having CSR of at least about 50%, 60%, or 70%. A combination product can also provide a final coke product having a suitable reactivity for combustion in a blast furnace. In some embodiments, the product has a CRI such that the high-carbon biogenic reagent is suitable for use as an additive or replacement for met coal, met coke, coke breeze, foundry coke, or injectable coal.

Some embodiments employ one or more additives in an amount sufficient to provide a high-carbon biogenic reagent that, when added to another carbon source (e.g., coke) having a CRI or CSR insufficient for use as a blast furnace product, provides a composite product with a CRI or CSR sufficient for use in a blast furnace. In some embodiments, one or more additives are present in an amount sufficient to provide a high-carbon biogenic reagent having a CRI of not more than about 40%, 30%, or 20%.

In some embodiments, one or more additives selected from the alkaline earth metals, or oxides or carbonates thereof, are introduced during or after the process of producing a high-carbon biogenic reagent. For example, calcium, calcium oxide, calcium carbonate, magnesium oxide, or magnesium carbonate can be introduced as additives. The addition of these compounds before, during, or after pyrolysis can increase the reactivity of the high-carbon biogenic reagent in a blast furnace. These compounds can lead to stronger materials, i.e. higher CSR, thereby improving blast-furnace efficiency. In addition, additives such as those selected from the alkaline earth metals, or oxides or carbonates thereof, can lead to lower emissions (e.g., $SO_2$).

In some embodiments, a high-carbon biogenic reagent contains not only a high fixed-carbon content but also a fairly high fraction of volatile carbon, as described above. The volatile matter can be desirable for metal oxide reduction because it is expected to have better mass transport into the metal oxide at lower temperatures. Compared to fossil-fuel based products such as coke, high-carbon biogenic reagents can have sufficient strength and more fixed and volatile carbon, which leads to greater reactivity.

In some embodiments, a blast furnace replacement product is a high-carbon biogenic reagent according to the present disclosure comprising at least about 55 wt % carbon, not more than about 0.5 wt % sulfur, not more than about 8 wt % non-combustible material, and a heat value of at least about 11,000 Btu per pound. In some embodiments, the blast furnace replacement product further comprises not more than about 0.035 wt % phosphorous, about 0.5 wt % to about 50 wt % volatile matter, and optionally one or more additives. In some embodiments, the blast furnace replacement product comprises about 2 wt % to about 15 wt % dolomite, about 2 wt % to about 15 wt % dolomitic lime, about 2 wt % to about 15 wt % bentonite, or about 2 wt % to about 15 wt % calcium oxide. In some embodiments, the blast furnace replacement product has dimensions substantially in the range of about 1 cm to about 10 cm.

In some embodiments, a high-carbon biogenic reagent according to the present disclosure is useful as a foundry coke replacement product. Foundry coke is generally characterized as having a carbon content of at least about 85 wt %, a sulfur content of about 0.6 wt %, not more than about 1.5 wt % volatile matter, not more than about 13 wt % ash, not more than about 8 wt % moisture, about 0.035 wt % phosphorus, a CRI value of about 30, and dimensions ranging from about 5 cm to about 25 cm.

Some variations of the disclosure utilize the high-carbon biogenic reagents as carbon-based taconite pellet addition products. The ores used in making iron and steel are iron oxides. Major iron oxide ores include hematite, limonite (also called brown ore), taconite, and magnetite, a black ore. Taconite is a low-grade but important ore, which contains both magnetite and hematite. The iron content of taconite is generally 25 wt % to 30 wt %. Blast furnaces typically require at least a 50 wt % iron content ore for efficient operation. Iron ores can undergo beneficiation including crushing, screening, tumbling, flotation, and magnetic separation. The refined ore is enriched to over 60% iron and is often formed into pellets before shipping.

For example, taconite can be ground into a fine powder and combined with a binder such as bentonite clay and limestone. Pellets about one centimeter in diameter can be formed, containing approximately 65 wt % iron, for example. The pellets are fired, oxidizing magnetite to hematite. The pellets are durable which ensures that the blast furnace charge remains porous enough to allow heated gas to pass through and react with the pelletized ore.

The taconite pellets can be fed to a blast furnace to produce iron, as described above with reference to blast furnace addition products. In some embodiments, a high-carbon biogenic reagent is introduced to the blast furnace. In these or other embodiments, a high-carbon biogenic reagent is incorporated into the taconite pellet itself. For example, taconite ore powder, after beneficiation, can be mixed with a high-carbon biogenic reagent and a binder and rolled into small objects, then baked to hardness. In such embodiments, taconite-carbon pellets with the appropriate composition can conveniently be introduced into a blast furnace without the need for a separate source of carbon.

Some variations of the disclosure utilize the high-carbon biogenic reagents as ladle addition carbon-based products. A ladle is a vessel used to transport and pour out molten metals. Casting ladles are used to pour molten metal into molds to produce the casting. Transfers ladle are used to transfer a large amount of molten metal from one process to another. Treatment ladles are used for a process to take place within the ladle to change some aspect of the molten metal, such as the conversion of cast iron to ductile iron by the addition of various elements into the ladle.

High-carbon biogenic reagents can be introduced to any type of ladle, but typically carbon will be added to treatment ladles in suitable amounts based on the target carbon content. Carbon injected into ladles can be in the form of fine powder, for good mass transport of the carbon into the final composition. In some embodiments, a high-carbon biogenic reagent according to the present disclosure, when used as a ladle addition product, has a minimum dimension of about 0.5 cm, such as about 0.75 cm, about 1 cm, about 1.5 cm, or higher.

In some embodiments, a high carbon biogenic reagent according to the present disclosure is useful as a ladle addition carbon additive at, for example, basic oxygen furnace or electric arc furnace facilities wherever ladle addition of carbon would be used (e.g., added to ladle carbon during steel manufacturing).

In some embodiments, the ladle addition carbon additive additionally comprises up to about 5 wt % manganese, up to about 5 wt % calcium oxide, or up to about 5 wt % dolomitic lime.

Direct-reduced iron (DRI), also called sponge iron, is produced from direct reduction of iron ore (in the form of lumps, pellets, or fines) by a reducing gas conventionally produced from natural gas or coal. The reducing gas is typically syngas, a mixture of hydrogen and carbon monoxide which acts as reducing agent. The high-carbon biogenic reagent as provided herein can be converted into a gas stream comprising CO, to act as a reducing agent to produce direct-reduced iron.

Iron nuggets are a high-quality steelmaking and iron-casting feed material. Iron nuggets are essentially all iron and carbon, with almost no gangue (slag) and low levels of metal residuals. They are a premium grade pig iron product with superior shipping and handling characteristics. The carbon contained in iron nuggets, or any portion thereof, can be the high-carbon biogenic reagent provided herein. Iron nuggets can be produced through the reduction of iron ore in a rotary hearth furnace, using a high-carbon biogenic reagent as the reductant and energy source.

Some variations of the disclosure utilize the high-carbon biogenic reagents as metallurgical coke carbon-based products. Metallurgical coke, also known as "met" coke, is a carbon material normally manufactured by the destructive distillation of various blends of bituminous coal. The final solid is a non-melting carbon called metallurgical coke. As a result of the loss of volatile gases and of partial melting, met coke has an open, porous morphology. Met coke has a very low volatile content. However, the ash constituents, that were part of the original bituminous coal feedstock, remain encapsulated in the resultant coke. Met coke feedstocks are available in a wide range of sizes from fine powder to basketball-sized lumps. Typical purities range from 86-92 wt % fixed carbon.

Metallurgical coke is used where a high-quality, tough, resilient, wearing carbon is required. Applications include, but are not limited to, conductive flooring, friction materials (e.g., carbon linings), foundry coatings, foundry carbon raiser, corrosion materials, drilling applications, reducing agents, heat-treatment agents, ceramic packing media, electrolytic processes, and oxygen exclusion.

Met coke can be characterized as having a heat value of about 10,000 to 14,000 Btu per pound and an ash content of about 10 wt % or greater. Thus, in some embodiments, a met coke replacement product comprises a high-carbon biogenic reagent according to the present disclosure comprising at least about 80 wt %, 85 wt %, or 90 wt % carbon, not more than about 0.8 wt % sulfur, not more than about 3 wt % volatile matter, not more than about 15 wt % ash, not more than about 13 wt % moisture, and not more than about 0.035 wt % phosphorus. A high-carbon biogenic reagent according to the present disclosure, when used as a met coke replacement product, can have a size range from about 2 cm to about 15 cm, for example.

In some embodiments, the met coke replacement product further comprises an additive such as chromium, nickel, manganese, magnesium oxide, silicon, aluminum, dolomite, fluorospar, calcium oxide, lime, dolomitic lime, bentonite or a combination thereof.

Some variations of the disclosure utilize the high-carbon biogenic reagents as coal replacement products. Any process or system using coal can in principle be adapted to use a high-carbon biogenic reagent.

In some embodiments, a high-carbon biogenic reagent is combined with one or more coal-based products to form a composite product having a higher rank than the coal-based product(s) or having fewer emissions, when burned, than the pure coal-based product.

For example, a low-rank coal such as sub-bituminous coal can be used in applications normally calling for a higher-rank coal product, such as bituminous coal, by combining a selected amount of a high-carbon biogenic reagent according to the present disclosure with the low-rank coal product. In other embodiments, the rank of a mixed coal product (e.g., a combination of a plurality of coals of different rank) can be improved by combining the mixed coal with some amount of high-carbon biogenic reagent. The amount of a high-carbon biogenic reagent to be mixed with the coal product(s) can vary depending on the rank of the coal product(s), the characteristics of the high-carbon biogenic reagent (e.g., carbon content, heat value, etc.) and the desired rank of the final combined product.

For example, anthracite coal is generally characterized as having at least about 80 wt % carbon, about 0.6 wt % sulfur, about 5 wt % volatile matter, up to about 15 wt % ash, up to about 10 wt % moisture, and a heat value of about 12,494 Btu/lb. In some embodiments, an anthracite coal replacement product is a high-carbon biogenic reagent comprising at least about 80 wt % carbon, not more than about 0.6 wt % sulfur, not more than about 15 wt % ash, and a heat value of at least about 12,000 Btu/lb.

In some embodiments, a high-carbon biogenic reagent is useful as a thermal coal replacement product. Thermal coal products are generally characterized as having high sulfur levels, high phosphorus levels, high ash content, and heat values of up to about 15,000 Btu/lb. In some embodiments, a thermal coal replacement product is a high-carbon biogenic reagent comprising not more than about 0.5 wt % sulfur, not more than about 4 wt % ash, and a heat value of at least about 12,000 Btu/lb.

Some variations of the disclosure utilize the high-carbon biogenic reagents as carbon-based coking products. Any coking process or system can be adapted to use high-carbon biogenic reagents to produce coke, or use it as a coke feedstock.

In some embodiments, a high-carbon biogenic reagent is useful as a thermal coal or coke replacement product. For example, a thermal coal or coke replacement product can consist of a high-carbon biogenic reagent comprising at least about 50 wt % carbon, not more than about 8 wt % ash, not more than about 0.5 wt % sulfur, and a heat value of at least about 11,000 Btu/lb. In other embodiments, the thermal coke replacement product further comprises about 0.5 wt % to about 50 wt % volatile matter. The thermal coal or coke replacement product can include about 0.4 wt % to about 15 wt % moisture.

In some embodiments, a high-carbon biogenic reagent is useful as a petroleum (pet) coke or calcine pet coke replacement product. Calcine pet coke is generally characterized as having at least about 66 wt % carbon, up to 4.6 wt % sulfur, up to about 5.5 wt % volatile matter, up to about 19.5 wt % ash, and up to about 2 wt % moisture, and is typically sized at about 3 mesh or less. In some embodiments, the calcine pet coke replacement product is a high-carbon biogenic reagent comprising at least about 66 wt % carbon, not more than about 4.6 wt % sulfur, not more than about 19.5 wt % ash, not more than about 2 wt % moisture, and is sized at about 3 mesh or less.

In some embodiments, a high-carbon biogenic reagent is useful as a coking carbon replacement carbon (e.g., co-fired with metallurgical coal in a coking furnace). In one embodiment, a coking carbon replacement product is a high-carbon biogenic reagent comprising at least about 55 wt % carbon, not more than about 0.5 wt % sulfur, not more than about 8 wt % non-combustible material, and a heat value of at least about 11,000 Btu per pound. In some embodiments, the coking carbon replacement product comprises about 0.5 wt % to about 50 wt % volatile matter, or one or more additives.

Some variations of the disclosure utilize the high-carbon biogenic reagents as carbon breeze products, which typically have very fine particle sizes such as 6 mm, 3 mm, 2 mm, 1 mm, or smaller. In some embodiments, a high-carbon biogenic reagent according to the present disclosure is useful as a coke breeze replacement product. Coke breeze is generally characterized as having a maximum dimension of not more than about 6 mm, a carbon content of at least about 80 wt %, 0.6 to 0.8 wt % sulfur, 1% to 20 wt % volatile matter, up to about 13 wt % ash, and up to about 13 wt % moisture. In some embodiments, a coke breeze replacement product is a high-carbon biogenic reagent according to the present disclosure comprising at least about 80 wt % carbon, not more than about 0.8 wt % sulfur, not more than about 20 wt % volatile matter, not more than about 13 wt % ash, not more than about 13 wt % moisture, and a maximum dimension of about 6 mm.

In some embodiments, a high-carbon biogenic reagent is useful as a carbon breeze replacement product during, for example, taconite pellet production or in an iron-making process.

Some variations utilize the high-carbon biogenic reagents as feedstocks for various fluidized beds, or as fluidized-bed carbon-based feedstock replacement products. The carbon can be employed in fluidized beds for total combustion, partial oxidation, gasification, steam reforming, or the like. The carbon can be primarily converted into syngas for various downstream uses, including production of energy (e.g., combined heat and power), or liquid fuels (e.g., methanol or Fischer-Tropsch diesel fuels).

In some embodiments, a high-carbon biogenic reagent according to the present disclosure is useful as a fluidized-bed coal replacement product in, for example, fluidized bed furnaces wherever coal would be used (e.g., for process heat or energy production).

Some variations utilize the high-carbon biogenic reagents as carbon-based furnace addition products. Coal-based carbon furnace addition products are generally characterized as having high sulfur levels, high phosphorus levels, and high ash content, which contribute to degradation of the metal product and create air pollution. In some embodiments, a carbon furnace addition replacement product comprising a high-carbon biogenic reagent comprises not more than about 0.5 wt % sulfur, not more than about 4 wt % ash, not more than about 0.03 wt % phosphorous, and a maximum dimension of about 7.5 cm. In some embodiments, the carbon furnace addition replacement product replacement product comprises about 0.5 wt % to about 50 wt % volatile matter and about 0.4 wt % to about 15 wt % moisture.

In some embodiments, a high-carbon biogenic reagent is useful as a furnace addition carbon additive at, for example, basic oxygen furnace or electric arc furnace facilities wherever furnace addition carbon would be used. For example, furnace addition carbon can be added to scrap steel during steel manufacturing at electric-arc furnace facilities). For electric-arc furnace applications, high-purity carbon is desired so that impurities are not introduced back into the process following earlier removal of impurities.

In some embodiments, a furnace addition carbon additive is a high-carbon biogenic reagent comprising at least about 80 wt % carbon, not more than about 0.5 wt % sulfur, not more than about 8 wt % non-combustible material, and a heat value of at least about 11,000 Btu per pound. In some embodiments, the furnace addition carbon additive further comprises up to about 5 wt % manganese, up to about 5 wt % fluorospar, about 5 wt % to about 10 wt % dolomite, about 5 wt % to about 10 wt % dolomitic lime, or about 5 wt % to about 10 wt % calcium oxide.

Some variations utilize the high-carbon biogenic reagents as stoker furnace carbon-based products. In some embodiments, a high-carbon biogenic reagent according to the present disclosure is useful as a stoker coal replacement product at, for example, stoker furnace facilities wherever coal would be used (e.g., for process heat or energy production).

Some variations utilize the high-carbon biogenic reagents as injectable (e.g., pulverized) carbon-based materials. In some embodiments, a high-carbon biogenic reagent is useful as an injection-grade calcine pet coke replacement product. Injection-grade calcine pet coke is generally characterized as having at least about 66 wt % carbon, about 0.55 to about 3 wt % sulfur, up to about 5.5 wt % volatile matter, up to about 10 wt % ash, up to about 2 wt % moisture, and is sized at about 6 Mesh or less. In some embodiments, a calcine pet coke replacement product is a high-carbon biogenic reagent comprising at least about 66 wt % carbon, not more than about 3 wt % sulfur, not more than about 10 wt % ash, not more than about 2 wt % moisture, and is sized at about 6 mesh or less.

In some embodiments, a high-carbon biogenic reagent is useful as an injectable carbon replacement product at, for example, basic oxygen furnace or electric arc furnace facilities in any application where injectable carbon would be used (e.g., injected into slag or ladle during steel manufacturing).

In some embodiments, a high-carbon biogenic reagent is useful as a pulverized carbon replacement product, for example, wherever pulverized coal would be used (e.g., for process heat or energy production). In some embodiments, the pulverized coal replacement product comprises up to about 10 percent calcium oxide.

Some variations utilize the high-carbon biogenic reagents as carbon addition product for metals production. In some embodiments, a high-carbon biogenic reagent according to the present disclosure is useful as a carbon addition product for production of carbon steel or another metal alloy comprising carbon. Coal-based late-stage carbon addition products are generally characterized as having high sulfur levels, high phosphorous levels, and high ash content, and high mercury levels which degrade metal quality and contribute to air pollution. In some embodiments of this disclosure, the carbon addition product comprises not more than about 0.5 wt % sulfur, not more than about 4 wt % ash, not more than about 0.03 wt % phosphorus, a minimum dimension of about 1 to 5 mm, and a maximum dimension of about 8 to 12 mm.

Some variations utilize the high-carbon biogenic reagents within carbon electrodes. In some embodiments, a high-carbon biogenic reagent is useful as an electrode (e.g. anode) material suitable for use, for example, in aluminum production.

Other uses of the high-carbon biogenic reagent in carbon electrodes include applications in batteries, fuel cells, capacitors, and other energy-storage or energy-delivery devices. For example, in a lithium-ion battery, the high-carbon biogenic reagent can be used on the anode side to intercalate lithium. In these applications, carbon purity and low ash can be very important.

Some variations of the disclosure utilize the high-carbon biogenic reagents as catalyst supports. Carbon is a known catalyst support in a wide range of catalyzed chemical reactions, such as mixed-alcohol synthesis from syngas using sulfided cobalt-molybdenum metal catalysts supported on a carbon phase, or iron-based catalysts supported on carbon for Fischer-Tropsch synthesis of higher hydrocarbons from syngas.

Some variations utilize the high-carbon biogenic reagents as activated carbon products. Activated carbon is used in a wide variety of liquid and gas-phase applications, including water treatment, air purification, solvent vapor recovery, food and beverage processing, and pharmaceuticals. For activated carbon, the porosity and surface area of the material are generally important. The high-carbon biogenic reagent provided herein can provide a superior activated carbon product, in various embodiments, due to (i) greater surface area than fossil-fuel based activated carbon; (ii) carbon renewability; (iii) vascular nature of biomass feedstock in conjunction with additives better allows penetration/distribution of additives that enhance pollutant control; and (iv) less inert material (ash) leads to greater reactivity.

It should be recognized that in the above description of market applications of high-carbon biogenic reagents, the described applications are not exclusive, nor are they exhaustive. Thus a high-carbon biogenic reagent that is described as being suitable for one type of carbon product can be suitable for any other application described, in various embodiments. These applications are exemplary only, and there are other applications of high-carbon biogenic reagents.

In addition, in some embodiments, the same physical material can be used in multiple market processes, either in an integrated way or in sequence. Thus, for example, a high-carbon biogenic reagent that is used as a carbon electrode or an activated carbon can, at the end of its useful life as a performance material, then be introduced to a combustion process for energy value or to a metal-making (e.g., metal ore reduction) process, etc.

Some embodiments can employ a biogenic reagent both for its reactive/adsorptive properties and also as a fuel. For example, a biogenic reagent injected into an emissions stream can be suitable to remove contaminants, followed by combustion of the biogenic reagent particles and possibly the contaminants, to produce energy and thermally destroy or chemically oxidize the contaminants.

Significant environmental and product use advantages can be associated with high-carbon biogenic reagents, compared to conventional fossil-fuel-based products. The high-carbon biogenic reagents can be not only environmentally superior, but also functionally superior from a processing standpoint because of greater purity, for example.

With regard to some embodiments of metals production, production of biogenic reagents with disclosed processes can result in significantly lower emissions of CO, $CO_2$, NON, $SO_2$, and hazardous air pollutants compared to the coking of coal-based products necessary to prepare them for use in metals production.

Use of high-carbon biogenic reagents in place of coal or coke also significantly reduces environmental emissions of $SO_2$, hazardous air pollutants, and mercury.

Also, because of the purity of these high-carbon biogenic reagents (including low ash content), the disclosed biogenic reagents have the potential to reduce slag and increase production capacity in batch metal-making processes.

In this detailed description, reference has been made to multiple embodiments of the disclosure and non-limiting examples relating to how the disclosure can be understood and practiced. Other embodiments that do not provide all of the features and advantages set forth herein can be utilized, without departing from the spirit and scope of the present disclosure. This disclosure incorporates routine experimentation and optimization of the methods and systems described herein. Such modifications and variations are considered to be within the scope of the disclosure defined by the claims.

All publications, patents, and patent applications cited in this specification are herein incorporated by reference in their entirety as if each publication, patent, or patent application were specifically and individually put forth herein.

This disclosure hereby incorporates by reference herein the following publications: U.S. Pat. Nos. 10,174,267; 9,845,440; U.S. Patent App. Pub. No. 2019-0169518; U.S. Patent App. Pub. No. 2015-0144831; U.S. Patent App. Pub. No. 2015-0126362; U.S. Patent App. Pub. No. 2015-0196896; U.S. Patent App. Pub. No. 2016-0280554; and U.S. Patent App. Pub. No. 2016-0114308.

Where methods and steps described above indicate certain events occurring in certain order, those of ordinary skill in the art will recognize that the ordering of certain steps can be modified and that such modifications are in accordance with the variations of the disclosure. Additionally, certain of the steps can be performed concurrently in a parallel process when possible, as well as performed sequentially.

Therefore, to the extent there are variations of the disclosure, which are within the spirit of the disclosure or equivalent to the disclosures found in the appended claims, it is the intent that this patent will cover those variations as well. The present disclosure shall only be limited by what is claimed.

EXAMPLES

Example 1: Reduction of Iron Ore Using Biomass Pyrolysis Off-Gas

Douglas fir (*Pseudotsuga menziesii*) in the form of wood chips is provided as a biomass feedstock. The average size of the wood chips is about 25 millimeters long, about 25 millimeters wide, and about 5 millimeters thick.

Particulated iron ore is provided as a metal ore. The iron ore is in the form of taconite. Taconite is a low-grade siliceous iron ore containing 20-30 wt % magnetite ($Fe_3O_4$). Taconite is mined primarily in the Mesabi Iron Range in Minnesota, USA and in the Marquette Iron Range in Michigan, USA.

The biomass feedstock is pyrolyzed in a continuous pyrolysis reactor at a pyrolysis temperature of about 600° C. at a pyrolysis residence time of about 30 minutes. The pyrolysis pressure is about 1 bar (atmospheric pressure) under an inert gas consisting essentially of $N_2$. There is a solid output and a vapor output from the pyrolysis reactor. The solid output is a biogenic reagent comprising carbon and is collected in a hopper. The vapor output is a pyrolysis off-gas comprising hydrogen and carbon monoxide and may be directed to a cylindrical vessel for storing the pyrolysis off-gas at elevated pressure, such as about 5-10 bar, or compressed and fed directly into the reduction reactor.

The particulated iron ore and the biogenic reagent are combined in a continuous crushing unit to generate carbon-iron ore particulates as a mixture of lumps and fines. The mixture of lumps and fines is then pelletized in a continuous pelletizing unit to generate carbon-iron ore pellets.

The carbon-iron ore pellets are then fed into a continuous reduction reactor, using a solid inlet port. The pyrolysis off-gas, containing $H_2$ and CO, is metered from the cylindrical vessel into the reduction reactor, using a vapor inlet port. The vapor flows co-currently with the solids flow. The reduction reactor is operated at a reduction temperature of about 900° C. and a reduction residence time of about 1 hour. The reduction pressure is about 5 bar (via pressurized pyrolysis off-gas). In the reduction reactor, the $Fe_3O_4$ is reduced by reaction with the $H_2$ and CO, as well as with the solid carbon, to a mixture of FeO and Fe (FeO is a lower oxidation state than $Fe_3O_4$). A vapor output from the reduction reactor contains water and carbon dioxide as reaction co-products from the chemical reduction. A solid output from the reduction reactor contains the mixture of FeO and Fe, and possibly some unreacted carbon. Optionally, this solid output may be recycled and passed through the reduction reactor again, to reduce the FeO to Fe using additional reducing gas or the residual carbon content.

Example 2: Reduction of Iron Ore Using Biomass Pyrolysis Reducing Gas

Douglas fir (*Pseudotsuga menziesii*) in the form of wood chips is provided as a biomass feedstock. The average size of the wood chips is about 25 millimeters long, about 25 millimeters wide, and about 5 millimeters thick.

Particulated iron ore is provided as a metal ore. The iron ore is in the form of taconite. Taconite is a low-grade siliceous iron ore containing 20-30 wt % magnetite ($Fe_3O_4$).

The biomass feedstock is pyrolyzed in a continuous pyrolysis reactor at a pyrolysis temperature of about 500° C. at a pyrolysis residence time of about 40 minutes. The pyrolysis pressure is about 1 bar (atmospheric pressure) under an inert gas consisting essentially of $N_2$. There is a solid output and a vapor output from the pyrolysis reactor. The solid output is a biogenic reagent comprising carbon and is collected in a hopper. The vapor output is a pyrolysis off-gas comprising hydrocarbons and is directed to a vessel for storing the pyrolysis off-gas. The hydrocarbons include light alkanes such as methane, light alcohols such as methanol, light organic acids such as acetic acid, and turpenes.

The particulated iron ore and the biogenic reagent are combined in a continuous crushing unit to generate carbon-iron ore particulates as a mixture of lumps and fines. The mixture of lumps and fines is then pelletized in a continuous pelletizing unit to generate carbon-iron ore pellets.

The pyrolysis off-gas is partially oxidized in a continuous partial-oxidation reactor to generate a reducing gas containing hydrogen and carbon monoxide. The partial-oxidation reactor may utilize a catalyst. The partial oxidation is exothermic and releases some heat, which is heat-integrated with the pyrolysis reactor to provide its endothermic heat requirements. The reducing gas may be directed to a cylindrical vessel for storing the reducing gas at elevated pressure, such as about 5-10 bar, or compressed and fed directly into the reduction reactor.

The carbon-iron ore pellets are then fed into a continuous reduction reactor, using a solid inlet port. The reducing gas, containing $H_2$ and CO, is metered from the cylindrical vessel into the reduction reactor, using a vapor inlet port. The vapor flows co-currently with the solids flow. The reduction reactor is operated at a reduction temperature of about 900° C. and a reduction residence time of about 1 hour. The reduction pressure is about 5 bar (via pressurized reducing gas). In the reduction reactor, the $Fe_3O_4$ is reduced by reaction with the $H_2$ and CO, as well as with the solid carbon, to a mixture of FeO and Fe. A vapor output from the reduction reactor contains water and carbon dioxide as reaction co-products from the chemical reduction. A solid output from the reduction reactor contains the mixture of FeO and Fe, and possibly some unreacted carbon. Optionally, this solid output may be recycled and passed through the reduction reactor again, to reduce the FeO to Fe using additional reducing gas or the residual carbon content.

Example 3: Reduction of Iron Ore Using Biomass Pyrolysis Reducing Gas

Corn (*Zea mays*) stover from Iowa, USA is provided as a biomass feedstock. The corn stover includes leaves, stalks, and cobs and has an average particle length of about 25 millimeters.

Particulated iron ore is provided as a metal ore. The iron ore is in the form of taconite. Taconite is a low-grade siliceous iron ore containing 20-30 wt % magnetite ($Fe_3O_4$).

The biomass feedstock is pyrolyzed in a continuous pyrolysis reactor at a pyrolysis temperature of about 500° C. at a pyrolysis residence time of about 30 minutes. The pyrolysis pressure is about 1 bar (atmospheric pressure) under an inert gas consisting essentially of Ar. There is a solid output and a vapor output from the pyrolysis reactor. The solid output is a biogenic reagent comprising carbon and is collected in a hopper. The vapor output is a pyrolysis off-gas that is combusted for energy production.

The particulated iron ore and a first portion of the biogenic reagent are combined in a continuous crushing unit to generate carbon-iron ore particulates as a mixture of lumps and fines. The mixture of lumps and fines is then pelletized in a continuous pelletizing unit to generate carbon-iron ore pellets.

A second portion of the biogenic reagent is gasified in a gasifier to generate a reducing gas containing hydrogen and carbon monoxide. The gasifier is continuously operated at about 1200° C. using air as an oxidizing medium, resulting in the production of the reducing gas and residual (unreacted) solids containing ash. The reducing gas may be directed to a cylindrical vessel for storing the reducing gas at elevated pressure, such as about 5-10 bar, or compressed and fed directly into the reduction reactor.

The carbon-iron ore pellets are then fed into a continuous reduction reactor, using a solid inlet port. The reducing gas, containing $H_2$ and CO, is metered from the cylindrical vessel into the reduction reactor, using a vapor inlet port. The vapor flows co-currently with the solids flow. The reduction reactor is operated at a reduction temperature of about 1000° C. and a reduction residence time of about 1 hour. The reduction pressure is about 10 bar (via pressurized reducing gas). In the reduction reactor, the $Fe_3O_4$ is reduced by reaction with the $H_2$ and CO, as well as with the solid carbon, to Fe. A vapor output from the reduction reactor contains water and carbon dioxide as reaction co-products from the chemical reduction. A solid output from the reduction reactor contains the Fe, which has been fully reduced from the starting $Fe_3O_4$ in the taconite.

Example 4: Production of Carbon-Iron Ore Pellets

Douglas fir (*Pseudotsuga menziesii*) in the form of wood chips is provided as a biomass feedstock. The average size of the wood chips is about 25 millimeters long, about 25 millimeters wide, and about 5 millimeters thick.

Particulated iron ore is provided as a metal ore. The iron ore is in the form of taconite. Taconite is a low-grade siliceous iron ore containing 20-30 wt % magnetite ($Fe_3O_4$).

The biomass feedstock is pyrolyzed in a continuous pyrolysis reactor at a pyrolysis temperature of about 650° C. at a pyrolysis residence time of about 30 minutes. The pyrolysis pressure is about 1 bar (atmospheric pressure) under an inert gas consisting essentially of $N_2$. There is a solid output and a vapor output from the pyrolysis reactor. The solid output is a biogenic reagent comprising at least 50 wt % fixed carbon and is collected in a hopper. The vapor output is a pyrolysis off-gas which may be stored, combusted for energy generation, or used elsewhere in the process.

The particulated iron ore and the biogenic reagent are combined in a continuous crushing unit to generate carbon-iron ore fines. The fines are then pelletized in a continuous pelletizing unit to generate carbon-iron ore pellets. A binder (e.g., bentonite clay, limestone, or starch) may be used to enhance the binding efficiency. The carbon-iron ore pellets contain about 40 wt % total carbon.

Example 5: Production of Iron Nuggets From Iron Ore and Biomass

Douglas fir (*Pseudotsuga menziesii*) in the form of wood chips is provided as a biomass feedstock. The average size of the wood chips is about 25 millimeters long, about 25 millimeters wide, and about 5 millimeters thick.

Particulated iron ore is provided as a metal ore. The iron ore is in the form of taconite. Taconite is a low-grade siliceous iron ore containing 20-30 wt % magnetite ($Fe_3O_4$).

The biomass feedstock is pyrolyzed in a continuous pyrolysis reactor at a pyrolysis temperature of about 500° C. at a pyrolysis residence time of about 1 hour. The pyrolysis pressure is about 2 bar under an inert gas consisting essentially of $N_2$. There is a solid output and a vapor output from the pyrolysis reactor. The solid output is a biogenic reagent comprising carbon and is collected in a hopper. The vapor output is a pyrolysis off-gas comprising hydrogen and carbon monoxide and may be directed to a cylindrical vessel for storing the pyrolysis off-gas at elevated pressure, such as about 5-10 bar, or compressed and fed directly into the reduction reactor.

The particulated iron ore and the biogenic reagent are combined in a continuous crushing unit to generate carbon-iron ore particulates as a mixture of lumps and fines. The mixture of lumps and fines is then pelletized in a continuous pelletizing unit to generate carbon-iron ore pellets.

The carbon-iron ore pellets are then fed into a rotary hearth furnace as a continuous reduction reactor, using a solid inlet port. The pyrolysis off-gas, containing $H_2$ and CO, is metered from the cylindrical vessel into the reduction reactor, using a vapor inlet port. The vapor flows countercurrently with the solids flow. The reduction reactor is operated at a reduction temperature of about 700° C. and a reduction residence time of about 50 minutes. The reduction pressure is about 10 bar (via pressurized pyrolysis off-gas). In the reduction reactor, the $Fe_3O_4$ is reduced by reaction with the $H_2$ and CO to Fe. The reduction reaction is optimized such that less than all of the solid carbon is reacted with iron oxide. A vapor output from the reduction reactor contains water and carbon dioxide as reaction co-products from the chemical reduction. A solid output from the reduction reactor contains the Fe. The solid output is in the form of iron nuggets, consisting essentially of iron and carbon. Iron nuggets are a high-quality steelmaking and iron-casting feed material. Iron nuggets are a premium pig iron product with superior shipping and handling characteristics.

Example 6: Production of Iron From Iron Ore and Biomass

Douglas fir (*Pseudotsuga menziesii*) in the form of wood chips is provided as a biomass feedstock. The average size of the wood chips is about 25 millimeters long, about 25 millimeters wide, and about 5 millimeters thick.

Particulated iron ore is provided as a metal ore. The iron ore is in the form of taconite. Taconite is a low-grade siliceous iron ore containing 20-30 wt % magnetite ($Fe_3O_4$).

The biomass feedstock is pyrolyzed in a continuous pyrolysis reactor at a pyrolysis temperature of about 700° C. at a pyrolysis residence time of about 20 minutes. The pyrolysis pressure is about 1 bar under an inert gas consisting essentially of $N_2$. There is a solid output and a vapor output from the pyrolysis reactor. The solid output is a biogenic reagent comprising carbon and is collected in a hopper. The vapor output is a pyrolysis off-gas.

The particulated iron ore and at least a portion of the biogenic reagent are combined in a continuous crushing unit to generate carbon-iron ore lumps.

The carbon-iron ore lumps are then fed into a continuous chemical-reduction furnace, using a solid inlet port. The chemical-reduction furnace is operated at a reduction temperature of about 1100° C., a reduction residence time of about 1 hour, and a pressure of about 3 bar. Air in fed into the chemical-reduction furnace to oxidize the carbon contained in the carbon-iron ore lumps, thereby generating heat and carbon monoxide. The $Fe_3O_4$ is reduced by reaction with this CO, as well as with residual C, to Fe. Optionally, some of the biogenic reagent produced from pyrolysis is co-fed directly into the chemical-reduction furnace (not as carbon-iron ore lumps). A solid output from the chemical-reduction furnace contains the Fe, i.e. the iron product.

Example 7: Composition for Reducing Iron Ore

Douglas fir (*Pseudotsuga menziesii*) in the form of wood chips is provided as a biomass feedstock. The average size of the wood chips is about 25 millimeters long, about 25 millimeters wide, and about 5 millimeters thick.

Particulated iron ore is provided as a metal ore. The iron ore is in the form of taconite. Taconite is a low-grade siliceous iron ore containing 20-30 wt % magnetite ($Fe_3O_4$).

The biomass feedstock is pyrolyzed in a continuous pyrolysis reactor at a pyrolysis temperature of about 650° C. at a pyrolysis residence time of about 30 minutes. The pyrolysis pressure is about 1 bar (atmospheric pressure) under an inert gas consisting essentially of $N_2$. There is a solid output and a vapor output from the pyrolysis reactor. The solid output is a biogenic reagent containing about 70 wt % fixed carbon and is collected in a hopper. The vapor output is a pyrolysis off-gas which may be stored, combusted for energy generation, or used elsewhere in the process.

The particulated iron ore and the biogenic reagent are combined in a continuous crushing unit to generate carbon-iron ore fines. The fines are then pelletized in a continuous pelletizing unit to generate carbon-iron ore pellets. Limestone is utilized to enhance the binding efficiency. Limestone contains calcite and aragonite, which are different crystal forms of calcium carbonate, $CaCO_3$.

The final composition comprises a carbon-iron ore pellet, wherein the carbon-iron ore pellet comprises about 30 wt % fixed carbon on a moisture-free and ash-free basis. The fixed carbon slightly less than 100% renewable carbon as determined from a measurement of the $^{14}C/^{12}C$ isotopic ratio of the carbon. The small percentage of non-renewable carbon arises due to carbon contained in the $CaCO_3$ binder.

Example 8: Composition for Reducing Copper-Nickel Ore

Nordic birch (*Betula pendula*) in the form of wood chips is provided as a biomass feedstock. The average size of the wood chips is about 50 millimeters long, about 50 millimeters wide, and about 10 millimeters thick.

Particulated metal ore is provided, containing mixed copper ore and nickel ore.

The biomass feedstock is pyrolyzed in a continuous pyrolysis reactor at a pyrolysis temperature of about 650° C. at a pyrolysis residence time of about 30 minutes. The pyrolysis pressure is about 1 bar (atmospheric pressure) under an inert gas consisting essentially of $N_2$. There is a solid output and a vapor output from the pyrolysis reactor. The solid output is a biogenic reagent containing about 75 wt % fixed carbon and is collected in a hopper. The vapor output is a pyrolysis off-gas which may be stored, combusted for energy generation, or used elsewhere in the process.

The particulated metal ore and the biogenic reagent are combined in a continuous metal milling machine to generate carbon-metal ore fines. The fines are then pelletized in a continuous pelletizing unit to generate carbon-metal ore pellets. Corn starch is utilized to enhance the binding efficiency. The carbon in corn starch is renewable and biogenic.

The final composition comprises a carbon-metal ore pellet, wherein the carbon-metal ore pellet comprises about 35 wt % fixed carbon on a moisture-free and ash-free basis. The fixed carbon is 100% renewable carbon as determined from a measurement of the $^{14}C/^{12}C$ isotopic ratio of the carbon.

What is claimed is:
1. A process for producing carbon-metal ore pellets, the process comprising:
   providing a biomass feedstock;
   pyrolyzing the biomass feedstock, thereby generating a biogenic reagent, wherein the biogenic reagent comprises carbon;
   providing a metal ore, wherein the metal ore comprises a metal oxide, wherein the metal ore is in particulate form;
   combining the carbon with the metal ore, thereby generating a carbon-metal ore particulate; and pelletizing the carbon-metal ore particulate, thereby generating a carbon-metal ore pellet;

wherein the biogenic reagent comprises at least 50 wt % fixed carbon; and wherein the carbon-metal ore particulate comprises at least about 0.1 wt % to at most about 50 wt % total carbon.

2. The process of claim 1, wherein the biogenic reagent comprises at least 75 wt % fixed carbon.

3. The process of claim 1, wherein the metal ore is selected from iron ore, copper ore, nickel ore, magnesium ore, manganese ore, aluminum ore, tin ore, zinc ore, cobalt ore, chromium ore, tungsten ore, molybdenum ore, or a combination thereof.

4. The process of claim 1, wherein the carbon-metal ore particulate is a carbon-metal ore fine or a carbon-metal ore lump.

5. The process of claim 1, wherein the carbon-metal ore pellet consists essentially of the carbon and the metal ore.

6. A process for producing metal nuggets, the process comprising:

providing a biomass feedstock;

pyrolyzing the biomass feedstock, thereby generating a biogenic reagent and a pyrolysis off-gas, wherein the biogenic reagent comprises carbon, wherein the pyrolysis off-gas comprises hydrogen or carbon monoxide;

providing a metal ore, wherein the metal ore comprises a metal oxide, wherein the metal ore is in particulate form;

combining the carbon with the metal ore, thereby generating a carbon-metal ore particulate;

pelletizing the carbon-metal ore particulate, thereby generating a carbon-metal ore pellet;

chemically reducing the metal oxide within the carbon-metal ore pellet, thereby generating a metal nugget, wherein the chemically reducing is achieved utilizing the pyrolysis off-gas; and recovering the metal nugget, wherein the metal nugget comprises a metal, wherein the metal is a reduced form of the metal oxide.

7. The process of claim 6, wherein the metal nugget consists essentially of the metal and the carbon.

8. The process of claim 6, wherein the biogenic reagent comprises at least 50 wt % fixed carbon.

9. The process of claim 6, wherein the metal ore is selected from iron ore, copper ore, nickel ore, magnesium ore, manganese ore, aluminum ore, tin ore, zinc ore, cobalt ore, chromium ore, tungsten ore, molybdenum ore, or a combination thereof.

10. The process of claim 6, wherein the carbon-metal ore particulate is a carbon-metal ore fine or a carbon-metal ore lump.

11. The process of claim 6, wherein the carbon-metal ore pellet consists essentially of the carbon and the metal ore.

12. The process of claim 6, wherein the chemically reducing indirectly utilizes the pyrolysis off-gas by first partially oxidizing the pyrolysis off-gas, thereby generating a reducing gas, and then utilizing the reducing gas to chemically reduce the metal oxide within the carbon-metal ore particulate or within the carbon-metal ore pellet.

13. The process of claim 6, wherein the chemically reducing co-utilizes a reducing gas obtained from gasification, partial oxidation, or steam reforming of the biogenic reagent.

14. The process of claim 6, wherein the chemically reducing co-utilizes a reducing gas, wherein the biogenic reagent comprises heavy hydrocarbons obtained during the pyrolyzing, and wherein the heavy hydrocarbons are converted to at least some of the reducing gas.

15. The process of claim 6, wherein the chemically reducing co-utilizes a reducing gas obtained from gasification, partial oxidation, or steam reforming of light hydrocarbons.

16. The process of claim 6, wherein the process is co-located at a metal ore mine or at a metal ore processing plant.

17. The process of claim 6, wherein the pyrolyzing and the chemically reducing are conducted at the same site.

18. A process for producing a metal from a metal ore, the process comprising:

providing a biomass feedstock;

pyrolyzing the biomass feedstock, thereby generating a biogenic reagent, wherein the biogenic reagent comprises carbon;

providing a metal ore, wherein the metal ore comprises a metal oxide, wherein the metal ore is in particulate form;

combining the carbon with the metal ore, thereby generating a carbon-metal ore particulate;

pelletizing the carbon-metal ore particulate, thereby generating a carbon-metal ore pellet;

introducing the carbon-metal ore pellet into a chemical-reduction furnace;

oxidizing the carbon comprised within the carbon-metal ore particulate, thereby generating heat and carbon monoxide, wherein the oxidizing is achieved by introducing air or oxygen into the chemical-reduction furnace;

chemically reducing, within the chemical-reduction furnace, the metal oxide comprised within the carbon-metal ore pellet, thereby generating a metal, wherein the chemically reducing is achieved using the carbon monoxide; and recovering the metal.

19. The process of claim 18, wherein the biogenic reagent is co-fed directly into the chemical-reduction furnace.

20. The process of 18, wherein the biogenic reagent comprises at least 50 wt % fixed carbon.

21. The process of 18, wherein the metal ore is selected from iron ore, copper ore, nickel ore, magnesium ore, manganese ore, aluminum ore, tin ore, zinc ore, cobalt ore, chromium ore, tungsten ore, molybdenum ore, or a combination thereof.

22. The process of claim 18, wherein the carbon-metal ore particulate is a carbon-metal ore fine or a carbon-metal ore lump.

23. The process of claim 18, wherein the carbon-metal ore pellet comprises an additive.

24. The process of claim 18, wherein the metal is selected from iron, copper, nickel, magnesium, Manganese, aluminum, tin, zinc, cobalt, chromium, tungsten, molybdenum, or a combination thereof.

* * * * *